(12) United States Patent
King et al.

(10) Patent No.: US 12,124,249 B2
(45) Date of Patent: Oct. 22, 2024

(54) MANUFACTURING AND DEVELOPMENT PLATFORM

(71) Applicant: Fast Radius Inc., Chicago, IL (US)

(72) Inventors: William Paul King, Champaign, IL (US); Dan Michael Arwine, Chicago, IL (US); Aaron Vincent Brenzel, Oak Park, IL (US); Kent Green, Chicago, IL (US); Clark Kampfe, Chicago, IL (US); Patrick McCusker, Chicago, IL (US); John William Nanry, Chicago, IL (US); Max Newberger, Chicago, IL (US); David Pick, Chicago, IL (US); Gustavo Pinto, Parkland, FL (US); Louis William Rassey, Chicago, IL (US); Duru Turkoglu, Chicago, IL (US); Matthew Weckel, Miami, FL (US); Charles D. Wood, Highland Park, IL (US); Rory Eugene Hartong-Redden, Chicago, IL (US); Timothy Gossett, Marietta, GA (US)

(73) Assignee: SYBRIDGE DIGITAL SOLUTIONS LLC, Southfield, MI (US)

( * ) Notice: Subject to any disclaimer, the term of this patent is extended or adjusted under 35 U.S.C. 154(b) by 368 days.

(21) Appl. No.: 17/461,058

(22) Filed: Aug. 30, 2021

(65) Prior Publication Data
US 2022/0214667 A1   Jul. 7, 2022

Related U.S. Application Data

(63) Continuation of application No. 17/460,934, filed on Aug. 30, 2021.
(Continued)

(51) Int. Cl.
G05B 19/418     (2006.01)
G06F 30/10      (2020.01)
(Continued)

(52) U.S. Cl.
CPC ..... G05B 19/4188 (2013.01); G05B 19/4183 (2013.01); G05B 19/41885 (2013.01);
(Continued)

(58) Field of Classification Search
None
See application file for complete search history.

(56) References Cited

U.S. PATENT DOCUMENTS 5,552,995 A * 9/1996 Sebastian .............. G06F 30/00
                                                    700/182
6,236,901 B1   5/2001 Goss
(Continued)

OTHER PUBLICATIONS

Shen, Yan, Soh-Khim Ong, and Andrew YC Nee. "Product information visualization and augmentation in collaborative design." Computer-Aided Design 40.9 (2008): 963-974. (Year: 2008).*
(Continued)

Primary Examiner — Carlos R Ortiz Rodriguez
(74) Attorney, Agent, or Firm — Amin, Turocy & Watson, LLP

(57) ABSTRACT

Techniques regarding manufacturing one or more digital product designs are provided. For example, one or more embodiments described herein can include a system, which can comprise a memory that can store computer executable components. The system can also comprise a processor, operably coupled to the memory, and that can execute the computer executable components stored in the memory. The computer executable components can comprise a user interface component that generates a manufacturability report regarding a product design in relation to a manufacturing process. The manufacturability report can indicate whether
(Continued)

a product feature included in the product design is permissible based on a plurality of manufacturing considerations associated with the manufacturing process.

20 Claims, 27 Drawing Sheets

Related U.S. Application Data

(60) Provisional application No. 63/197,683, filed on Jun. 7, 2021, provisional application No. 63/134,661, filed on Jan. 7, 2021.

(51) Int. Cl.
  *G06F 30/20* (2020.01)
  *G06Q 10/0637* (2023.01)
  *G06F 111/20* (2020.01)
  *G06F 119/18* (2020.01)

(52) U.S. Cl.
  CPC .............. *G06F 30/10* (2020.01); *G06F 30/20* (2020.01); *G06Q 10/06375* (2013.01); *G06F 2111/20* (2020.01); *G06F 2119/18* (2020.01)

(56) References Cited

U.S. PATENT DOCUMENTS

| | | | |
|---|---|---|---|
| 6,687,878 B1* | 2/2004 | Eintracht | H04L 51/216 |
| | | | 715/201 |
| 7,299,101 B2 | 11/2007 | Lukis et al. | |
| 7,630,783 B2 | 12/2009 | Walls-Manning et al. | |
| 7,693,596 B2 | 4/2010 | Sauber et al. | |
| 2004/0260714 A1* | 12/2004 | Chatterjee | G06F 16/907 |
| 2005/0165653 A1 | 7/2005 | Meaney et al. | |
| 2018/0285956 A1 | 10/2018 | Chelani et al. | |
| 2020/0225643 A1 | 7/2020 | Tugbo et al. | |
| 2022/0366103 A1 | 11/2022 | B R et al. | |

OTHER PUBLICATIONS

Bidarra, Rafael, et al. "A collaborative framework for integrated part and assembly modeling." Proceedings of the seventh ACM symposium on Solid modeling and applications. 2002. (Year: 2002).*
He, Fan, Soh-Khim Ong, and Andrew YC Nee. "A mobile solution for augmenting a manufacturing environment with user-generated annotations." Information 10.2 (2019): 60. (Year: 2019).*
Kao, Yung-Chou, and Grier CI Lin. "CAD/CAM Collaboration and remote Machining." Computer Integrated Manufacturing Systems 9.3 (1996): 149-160. (Year: 1996).*
Hisarciklilar, Onur, and Jean-François Boujut. "An annotation based approach to support design communication." arXiv preprint arXiv:0711.2486 (2007). (Year: 2007).*
Danesi, Frederic, Nicolas Gardan, and Yvon Gardan. "Collaborative design: from concept to application." Geometric Modeling and Imaging—New Trends (GMAI'06). IEEE, 2006. (Year: 2006).*
Li, Chunlei, Chris Mcmahon, and Linda Newnes. "Annotation in design processes: Classification of approaches." DS 58-8: Proceedings of ICED 09, the 17th International Conference on Engineering Design, vol. 8, Design Information and Knowledge, Palo Alto, CA, USA, Aug. 24-27, 2009. 2009. (Year: 2009).*
Tudorache, Tania, et al. "Supporting collaborative ontology development in Protégé." The Semantic Web-ISWC 2008: 7th International Semantic Web Conference, ISWC 2008, Karlsruhe, Germany, Oct. 26-30, 2008. Proceedings 7. Springer Berlin Heidelberg, 2008. (Year: 2008).*
Li, W. D., et al. "Feature-based design in a distributed and collaborative environment." Computer-Aided Design 36.9 (2004): 775-797. (Year: 2004).*
Ding, Lian, Dannie Davies, and Christopher A. McMahon. "The integration of lightweight representation and annotation for collaborative design representation." Research in Engineering Design 20 (2009): 185-200. (Year: 2009).*
Non-Final Office Action received for U.S. Appl. No. 17/460,934, dated Dec. 7, 2023, 226 pages.
Westkampfer, Dr.hcE., "Manufacturing on Demand in Production Networks", Annals of CIRP, vol. 46, No. 1, 1997, pp. 329-334.
Gunasekaran, Angappa, "Agile Manufacturing: Enablers and An Implementation Framework." International Journal of Production Research, vol. 36, No. 5, May 1998, 26 pages.
Tuck et al., "Rapid Manufacturing: Impact on Supply Chain Methodologies and Practice", International Journal of Services and Operations Management, 2006, 34 pages.
Elmaraghy et al., "Complexity in Engineering Design and Manufacturing" CCIRP Annals Manufacturing Technology, vol. 61, 2012, pp. 793-814.
Mourtzis et al., "A Web-based Platform for Mass Customisation and Personalisation", CIRP Journal of Manufacturing Science and Technology, vol. 7, 2014, pp. 112-128.
Wu et al., "Cloud-based Design and Manufacturing: A New Paradigm in Digital Manufacturing and Design Innovation." Computer-aided Design, vol. 59, 2015, 14 pages.
Kendrick et al., "Strategies to Realize Decentralized Manufacture Through Hybrid Manufacturing Platforms", Robotics and Computer-integrated Manufacturing, vol. 43, 2017, 11 pages.
Zhang et al., "CMfgIA: A Cloud Manufacturing Application Mode For Industry Alliance", The International Journal of Advanced Manufacturing Technology, vol. 98, 2018, 19 pages.
Non-Final Office Action received for U.S. Appl. No. 17/461,148, dated Oct. 26, 2023, 63 pages.
Notice of Allowance received for U.S. Appl. No. 17/460,934 dated Jul. 2, 2024, 60 pages.

* cited by examiner

2402 — RECEIVING, BY A SYSTEM OPERATIVELY COUPLED TO A PROCESSOR, A PRODUCT DESIGN AS AN INPUT DATA

2404 — GENERATING, BY THE SYSTEM A PLURALITY OF MANUFACTURING CHARACTERISTICS FOR SELECTION, WHERE A MANUFACTURING CHARACTERISTIC CAN BE SELECTED FROM THE PLURALITY OF MANUFACTURING CHARACTERISTICS AND ADDED TO THE INPUT DATA

2406 — EXECUTING, BY THE SYSTEM, A MACHINE LEARNING MODEL TO DETERMINE A SIMILARITY SCORE THAT CAN CHARACTERIZE AN AMOUNT OF SIMILARITY BETWEEN THE PRODUCT DESIGN AND A PLURALITY OF PREVIOUSLY MANUFACTURED PRODUCT DESIGNS

2408 — DETERMINING, BY THE SYSTEM, AN AMOUNT OF CARBON EMISSIONS GENERATED BY A MANUFACTURING PROCESS THAT UTILIZES THE MANUFACTURING CHARACTERISTIC TO MANUFACTURE THE PRODUCT DESIGN

2410 — DETERMINING, BY THE SYSTEM, AN AMOUNT OF WATER USED BY THE MANUFACTURING PROCESS BASED ON THE PRODUCT DESIGN AND THE MANUFACTURING CHARACTERISTIC

2412 — DETERMINING, BY THE SYSTEM, AN AMOUNT OF ENERGY USED BY THE MANUFACTURING PROCESS BASED ON THE PRODUCT DESIGN AND THE MANUFACTURING CHARACTERISTIC

2414 — COMPARING, BY THE SYSTEM, THE AMOUNT OF CARBON EMISSIONS, WATER USAGE, AND/OR ENERGY USAGE TO A TARGET ENVIRONMENTAL IMPACT METRIC

2416 — GENERATING, BY THE SYSTEM, AN ALTERNATE MANUFACTURING CHARACTERISTIC BASED ON THE COMPARISON

- 2502: RECEIVING, BY A SYSTEM OPERATIVELY COUPLED TO A PROCESSOR, A PRODUCT DESIGN FROM A FIRST ENTITY FROM A PLURALITY OF ENTITIES AS INPUT DATA
- 2504: RECEIVING, BY THE SYSTEM, AN ANNOTATION FROM A SECOND ENTITY FROM THE PLURALITY OF ENTITIES AS A CONTRIBUTION TO THE INPUT DATA, WHERE THE ANNOTATION IS GENERATED BY THE SECOND ENTITY BASED ON A MANUFACTURING CONSIDERATION ASSOCIATED WITH MANUFACTURING THE PRODUCT DESIGN VIA A DEFINED MANUFACTURING PROCESS
- 2506: GENERATING, BY THE SYSTEM, A DISPLAY OF THE ANNOTATION POSITIONED ONTO A DISPLAY OF THE PRODUCT DESIGN, WHERE THE ANNOTATION CAN REGARD A PRODUCT FEATURE INCLUDED IN THE PRODUCT DESIGN, AND WHERE THE ANNOTATION CAN BE POSITIONED ONTO THE PRODUCT FEATURE PRESENTED IN THE DISPLAY OF THE PRODUCT DESIGN
- 2508: TRACKING, BY THE SYSTEM, ONE OR MORE EDITS MADE TO THE PRODUCT DESIGN BY ONE OR MORE ENTITIES FROM THE PLURALITY OF ENTITIES
- 2510: STORING, BY THE SYSTEM, A VERSION OF THE PRODUCT DESIGN IN A LIBRARY OF HISTORIC PRODUCT DESIGNS ASSOCIATED WITH THE PLURALITY OF ENTITIES
- 2512: ADDING, BY THE SYSTEM, THE PRODUCT DESIGN TO A DIGITAL CATALOG THAT IS PUBLICLY ACCESSIBLE BY ONE OR MORE OTHER THIRD-PARTY ENTITIES VIA AN ELECTRONIC PLATFORM

MANUFACTURING AND DEVELOPMENT PLATFORM

CROSS-REFERENCE TO RELATED APPLICATIONS

This application claims priority to U.S. Provisional Application No. 63/134,661, entitled, "MANUFACTURING AND DEVELOPMENT PLATFORM," which was filed on Jan. 7, 2021, and U.S. Provisional Application No. 63/197,683 entitled, "MANUFACTURING A PRODUCT DESIGN," which was filed on Jun. 7, 2021. This application is a continuation to U.S. application Ser. No. 17/460,934 "MANUFACTURING AND DEVELOPMENT PLATFORM" which was filed on Aug. 30, 2021. The entirety of the aforementioned applications is hereby incorporated herein by reference.

BACKGROUND

The subject disclosure relates to one or more computer apparatuses, systems, and/or methods for manufacturing a product, and more specifically, to leveraging historic manufacturing data to autonomously generate manufacturing recommendations and/or control a manufacturing process for one or more given products.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, apparatuses and/or computer program products that can analyze the manufacturability and/or cost associated with one or more manufacturing quotes are described.

According to an embodiment, a system is provided. The system can comprise a memory that can store computer executable components. The system can also comprise a processor, operably coupled to the memory, that can execute the computer executable components stored in the memory. The computer executable components can comprise a user interface component that can generate a manufacturability report regarding a product design in relation to a manufacturing process. The manufacturability report can indicate whether a product feature included in the product design is permissible based on a plurality of manufacturing considerations associated with the manufacturing process.

According to an embodiment, a computer-implemented method is provided. The computer-implemented method can comprise generating, by a system operatively coupled to a processor, a manufacturability report regarding a product design in relation to a manufacturing process. The manufacturability report can indicate whether a product feature included in the product design is permissible based on a plurality of manufacturing considerations associated with the manufacturing process.

According to an embodiment, a computer program product for analyzing a product design for manufacturing is provided. The computer program product can comprise a computer readable storage medium that can have program instructions embodied therewith. The program instructions can be executable by a processor to cause the processor to: generate, by the processor, a manufacturability report regarding the product design in relation to a manufacturing process. The manufacturability report can indicate whether a product feature included in the product design is permissible based on a plurality of manufacturing considerations associated with the manufacturing process.

BRIEF DESCRIPTION OF THE DRAWINGS

FIG. 2 illustrates a diagram of an example, non-limiting account creation display that can be generated by one or more user interface components to establish a private account associated with one or more entities to generate one or more manufacturing quotes in accordance with one or more embodiments described herein.

FIG. 24 illustrates a flow diagram of an example, non-limiting computer-implemented method regarding an analysis of the manufacturability of one or more digital product designs in conjunction with one or more manufacturing details in accordance with one or more embodiments described herein.

FIG. 25 illustrates a flow diagram of an example, non-limiting computer-implemented method regarding an analysis of the cost of one or more digital product designs in conjunction with one or more manufacturing details in accordance with one or more embodiments described herein.

DETAILED DESCRIPTION

Figure 1:
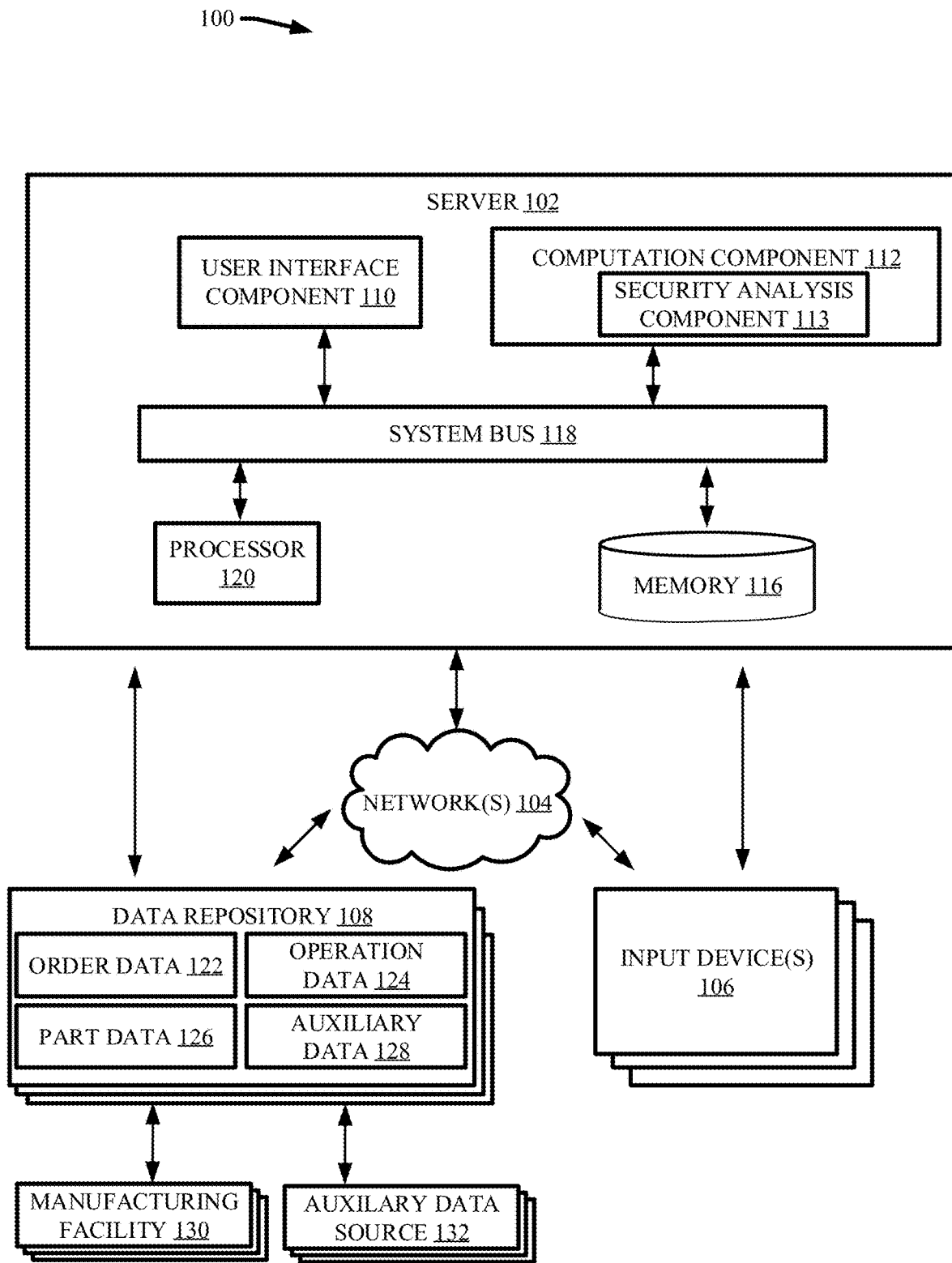
FIG. 1 illustrates a block diagram of an example, non-limiting system that can facilitate the generation of one or more manufacturing quotes regarding one or more digital product designs and/or manufacturing details in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Various embodiments of the present invention can be directed to computer processing systems, computer-implemented methods, apparatus and/or computer program products that facilitate the efficient, effective, and autonomous (e.g., without direct human guidance) product development that can integrate product design, production and/or fulfillment operations. For example, one or more embodiments described herein can analyze the manufacturability of one or more digital product designs in relation to one or more manufacturing details. For instance, various embodiments can characterize the manufacturability of the digital product design via one or more manufacturability reports that can include one or more generated manufacturability warnings, manufacturing recommendations, and/or compatibility metrics. In another example, one or more embodiments described herein can analyze the cost associated with manufacturing one or more digital product designs. For instance, various embodiments can characterize manufacturing cost via one or more cost reports that: can describe how relationships between various details of the manufacturing process can affect the manufacturing cost, and/or can include recommendations to reduce cost and/or prioritize one or more manufacturing objectives. In a further example, one or more embodiments described herein can facilitate collaboration between multiple parties to develop and/or modify one or more digital product designs and/or manufacturing details to initialize a manufacturing quote. For example, various embodiments can facilitate collaboration between multiple entities via one or more interactive collaboration displays that can be employed by members of a defined collaboration group to share files, messages, models, annotations, insights, past experiences, manufacturing details, and/or the like to develop a manufacturing quote regarding a product targeted for production.

The computer processing systems, computer-implemented methods, apparatus and/or computer program products employ hardware and/or software to solve problems that are highly technical in nature (e.g., autonomous development and/or manufacturing of products), that are not abstract and cannot be performed as a set of mental acts by a human. For example, an individual, or a plurality of individuals, cannot readily employ historical data to generate a manufacturability and/or cost analysis regarding a proposed product design. In another example, an individual, or a plurality of individuals, cannot readily find associations or correlations between design and manufacturing data across large number of products or across products manufactured via multiple websites.

FIG. 1 illustrates a block diagram of an example, non-limiting system 100 that can be employed by one or more entities to analyze and/or manufacture a given product design. Repetitive description of like elements employed in other embodiments described herein is omitted for the sake of brevity. Aspects of systems (e.g., system 100 and the like), apparatuses or processes in various embodiments of the present invention can constitute one or more machine-executable components embodied within one or more machines, e.g., embodied in one or more computer readable mediums (or media) associated with one or more machines. Such components, when executed by the one or more machines (e.g., computers, computing devices, virtual machines, a combination thereof, and/or the like) can cause the machines to perform the operations described.

As shown in FIG. 1, the system 100 can comprise one or more servers 102, one or more networks 104, input devices 106 and/or data repositories 108. The server 102 can comprise user interface component 110 and/or computation component 112. Also, the server 102 can comprise or otherwise be associated with at least one memory 116. The server 102 can further comprise a system bus 118 that can couple to various components such as, but not limited to, the user interface component 110, computation component 112, memory 116 and/or a processor 120. While a server 102 is illustrated in FIG. 1, in other embodiments, multiple devices of various types can be associated with or comprise the features shown in FIG. 1. Further, the server 102 can communicate with one or more cloud computing environments.

The one or more networks 104 can comprise wired and wireless networks, including, but not limited to, a cellular network, a wide area network (WAN) (e.g., the Internet) or a local area network (LAN). For example, the server 102 can communicate with the one or more data repositories 108 and/or input devices 106 (and vice versa) using virtually any desired wired or wireless technology including for example, but not limited to: cellular, WAN, wireless fidelity (Wi-Fi), Wi-Max, WLAN, Bluetooth technology, a combination thereof, and/or the like. Further, although in the embodiment shown the user interface component 110 and/or computation component 112 can be provided on the one or more servers 102, it should be appreciated that the architecture of system 100 is not so limited. For example, the user interface component 110 and/or computation component 112, and/or associate components thereof, can be located at another computer device, such as another server device, a client device, and/or the like.

The one or more input devices 106 can comprise one or more computerized devices, which can include, but are not limited to: personal computers, desktop computers, laptop computers, cellular telephones (e.g., smart phones), computerized tablets (e.g., comprising a processor), smart watches, keyboards, touch screens, mice, haptic devices, cameras, machine vision devices, a combination thereof, and/or the like. The one or more input devices 106 can be employed to enter one or more commands and/or inputs into the system 100, thereby sharing (e.g., via a direct connection and/or via the one or more networks 104) said data with the server 102. For example, the one or more input devices 106 can send data to the user interface component 110 and/or computation component 112 (e.g., via a direct connection and/or via the one or more networks 104). Additionally, the one or more input devices 106 can comprise one or more displays that can present one or more outputs generated by the system 100 to a user. For example, the one or more displays can include, but are not limited to: cathode tube display ("CRT"), light-emitting diode display ("LED"), electroluminescent display ("ELD"), plasma display panel ("PDP"), liquid crystal display ("LCD"), organic light-emitting diode display ("OLED"), a combination thereof, and/or the like.

For example, information that can be provided via the one or more input devices 106 can include a digital representation of the part or parts to be made. The digital representation can be in the form of one or more computer aided design ("CAD") files, three-dimensional models, point clouds, two-dimensional graphics or drawings, or other types of information known to those skilled in the art. Also, the information provided via the one or more input devices 106 can also include other types of information about the design or the physical product that is intended to result from the design, such as material type, color, or associations with other types of information related to the design and manufacturing of the part or parts.

In various embodiments, the one or more input devices 106 and/or the one or more networks 104 can be employed to input one or more settings and/or commands into the system 100. For example, in the various embodiments described herein, the one or more input devices 106 can be employed to operate and/or manipulate the server 102 and/or associate components. Additionally, the one or more input devices 106 can be employed to display one or more outputs (e.g., displays, data, visualizations, and/or the like) generated by the server 102 and/or associate components. Further, in one or more embodiments, the one or more input devices 106 can be comprised within, and/or operably coupled to, a cloud computing environment.

In various embodiments, one or more entities may utilize the system 100 to facilitate the manufacturing of one or more given products. The user interface component 110 can generate displays, reports, graphs, charts, quotes, tables, and/or the like to convey manufacturing information, cost information, and/or tracking information to the entities. The computation component 112 can perform one or more computational analyses, security analyses, manufacturing analyses, cost analyses, and/or tracking analyses to generate the data conveyed by the user interface component 110. The one or more input devices 106 can be employed by the entities to interact with the user interface component 110. For example, the one or more input devices 106 can be employed to enter various inputs into the system 100, which can be analyzed by the computation component 112. Also, the one or more input devices 106 can be employed to present and/or interact with one or more outputs of the user interface component 110 (e.g., the displays, reports, graphs, charts, quotes, tables, and/or the like).

The one or more entities can employ the one or more input devices 106 to generate one or more user accounts via the user interface component 110. Each user account can be associated with at least one entity and distinguishable via a unique identifier (e.g., an account number and/or name). Further, the user accounts can be accessible to the entity via a combination of unique credentials (e.g., a username and password). Outputs of the user interface component 110 and/or computation component 112 regarding product manufacturing requests by a given entity can be accessible to the entity via the user account associated with the entity.

Figure 2:
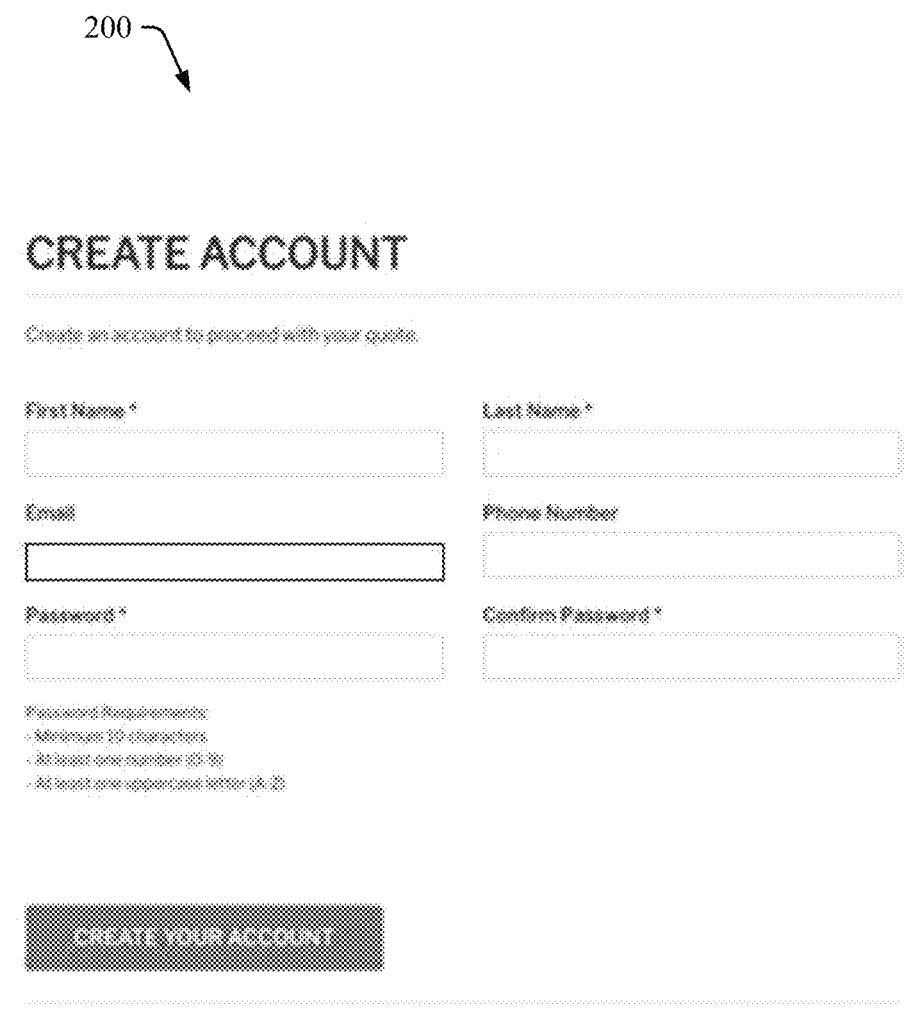

In one or more embodiments, the one or more input devices 106 can be employed to manipulate, and/or otherwise interact with, the user interface component 110. Further, the user interface component 110 can generate one or more user accounts associated with respective entities utilizing the system 100. The user accounts can be accessible via respective credentials (e.g., username and/or password) entered via the one or more input devices 106. For example, the user account can be identifiable by an email address, an individual's name, a company name, a group name, and/or the like. The various features generated by the user interface component 110 can be associated with a given entity via the user account associated with the entity. FIG. 2 illustrates a diagram of an example, non-limiting user account creation display 200 that can be generated by the user interface component 110 to generate a user account. One or more entities employing the system 100 can interact with the account creation display 200 via the one or more input devices 106.

Further, the user interface component 110 can generate one or more home displays associated with the user account. The one or more entities can interact with the one or more home displays to manage past, present, and/or future manufacturing quotes regarding one or more products. For example, the one or more entities can interact with the home display to initiate a manufacturing quote with the user interface 110. In another example, the one or more entities can interact with the home display to track the status of one or more past manufacturing quotes. In a further example, the one or more entities can interact with the home display to view one or more manufacturability reports and/or cost reports associated with one or more manufacturing quotes.

Additionally, the one or more entities can interact with the home display (e.g., via the one or more input devices 106) to enter various inputs into the system 100. The various inputs can be utilized by the user interface component 110 to initialize one or more manufacturing quotes for a given product. Further, the various inputs can be utilized by the computation component 112 to generate manufacturability data, cost data, product data, shipping data, and/or tracking data regarding the one or more manufacturing quotes. The inputs can regard one or more features of the given product targeted for manufacturing. Example inputs can include, but are not limited to: digital models and/or design data, information regarding an intent for the application and/or design of the product, geographical location of the requesting entity, destination of the manufactured product, a target fulfillment date, product quality requirements and/or instructions, billing information, queries to specific product functions and/or decision support tools, a combination thereof, and/or the like. Additionally, the one or more inputs provided by the one or more input devices can define one or more manufacturing details. Example manufacturing details can include, but are not limited to: manufacturing techniques, manufacturing materials, quality inspection requirements, shipping details, surface treatments, color, finish, strength requirements, tolerance requirements, cost objectives, a combination thereof, and/or the like.

Further, the one or more entities can interact with the user interface component 110 to view, and/or otherwise receive, one or more outputs of the server 102. Example outputs can include, but are not limited to: insights regarding the given product design, a manufacturability analysis, an expected tolerance prediction, pre-production information and/or communications, technical information regarding the given part and/or part batches, manufacturing status of the given part, geometric measurements of the given part, three-dimensional ("3D") scans of the given part, historical record of manufacturing requests, historical record of manufactured pards, price and purchase terms, distribution logistics, tracking information, cost analysis, a combination thereof, and/or the like. For example, various embodiments described herein can include one or more server 100 outputs conveyed to the one or more entities via the one or more input devices 106 and/or networks 104.

In various embodiments, the computation component 112 can generate: one or more determinations regarding the manufacturability of an initialized manufacturing quote, and/or one or more cost calculations regarding a cost of the initialized manufacturing quote. In one or more embodiments, the computation component 112, and/or associate components of the computation component 112, can employ one or more machine learning models to perform the various functions described herein. As used herein, the term "machine learning model" and "machine learning models" can refer to a computer model that can be used to facilitate one or more machine learning tasks, wherein the computer model may simulate a number of interconnected processing units that can resemble abstract versions of neurons. For example, the processing units can be arranged in a plurality of layers (e.g., one or more input layers, one or more hidden layers, and/or one or more output layers) connected with by varying connection strengths (e.g., which can be commonly referred to within the art as "weights"). For instance, an example machine learning models can include neural network models, which can learn through training, wherein data with known outcomes is inputted into the computer model, outputs regarding the data are compared to the known outcomes, and/or the weights of the computer model are autonomous adjusted based on the comparison to replicate the known outcomes. Other machine learning models can use probabilistic or statistical tools to find correlations between different types of data. Other machine learning models may use mathematical methods based on Bayesian inference methods. Other machine learning models are known by those skilled in the art. As used herein, the term "training data" can refer to data and/or data sets used to train one or more machine learning models. As a machine learning model trains (e.g., utilizes more training data), the computer model can become increasingly accurate; thus, trained neural machine learning models can accurately analyze data with unknown outcomes, based on lessons learning from training data, to facilitate one or more machine learning tasks. Example machine learning models can include, but are not limited to: perceptron ("P"), feed forward ("FF"), radial basis network ("RBF"), deep feed forward ("DFF"), recurrent neural network ("RNN"), long/short term memory ("LSTM"), gated recurrent unit ("GRU"), auto encoder ("AE"), variational AE ("VAE"), denoising AE ("DAE"), sparse AE ("SAE"), markov chain ("MC"), Hopfield network ("HN"), Boltzmann machine ("BM"), deep belief network ("DBN"), deep convolutional network ("DCN"), deconvolutional network ("DN"), deep convolutional inverse graphics network ("DCIGN"), generative adversarial network ("GAN"), liquid state machine ("LSM"), extreme learning machine ("ELM"), echo state network ("ESN"), deep residual network ("DRN"), kohonen network ("KN"), support vector machine ("SVM"), and/or neural turing machine ("NTM").

As shown in FIG. 1, in various embodiments the computation component 112 can comprise a security analysis component 113. For example, the security analysis component 113 can analyze the files and information provided by an entity (e.g., via one or more input devices 106) to provide a security analysis and take steps to mitigate risks. One or more entities can upload part designs in a variety of file formats. An entity may be unaware that the files being uploaded contain malicious information such as a virus or malware. Alternatively, a malicious entity might upload a file that masquerades as a legitimate design file, but contains a computer virus or malware. To protect against this, the server 102 (e.g., via the user interface component 110 and/or the computation component 112) can accept the upload and store it in a quarantined area (e.g., included in the one or more memories 116). Then the security analysis component 113 can scan the file with a virus scanner that would detect the virus or malware. The server 102 (e.g., via the user interface component 110 and/or computation component 112) can request that the entity try again with a different file, provide the user with a warning or other message, and/or provide possible mitigation steps such as removing the virus. The security analysis component 113 can cause the files and information to be quarantined until mitigation steps are taken by the entity and/or by the system 100. Before moving the file out of quarantine, the security analysis component 113 can check whether the information is usable by attempting to parse it. Malicious actors often find bugs in the code path taken by parsers, so it's prudent to attempt parsing in a safe environment in case the file is crafted to exploit a parser bug that the virus scanner did not detect.

In various embodiments, the security analysis component 113 can parse the file after virus scanning and before moving the file out of quarantine. The parsing may fail because the file is innocuous but invalid, or parsing may fail because the file contained an exploit that caused the parsing program to crash. If parsing the file fails, the security analysis component 113 can flag the file, alert the entity that there was a problem with that file, and either ask them to try again with a different file or suggest other mitigations. If parsing succeeds, then the security analysis component 113 can continue processing the file. The approach here implements a method for detecting malware by using a "sacrificial server" to perform an action that would likely cause the malware to "detonate," and then attempting to detect a detonation. The security analysis component 113 can also lock a user account and/or generate an alert that a security threat exists; whereupon a human counterpart can then investigate further.

In one or more embodiments, the computation component 112 can also determine the acceptability of certain designs and help to protect against illicit designs. There may be certain categories of designs that are manufacturable, but that the system would decline to analyze or manufacture for various reasons. For example, there could be policies in place to reject certain weapons, drug paraphernalia, obscene designs, an/or the like that could be determined to be objectionable for legal or ethical reasons. To check for illicit designs, the computation component 112 can generate two-dimensional or three-dimensional images of the design from one or more different perspectives and run that image through machine-learned models designed to detect images in those unacceptable categories. If the model determines that it has found something matching the criteria for unacceptable designs, the computation component 112 can flag the file for review and have a human exercise judgment about the decision to proceed or not. The computation component 112 can return to the entity a warning about illicit material, ask the entity to upload different designs, and/or lock the account of the user.

The one or more data repositories 108 can store data regarding one or more: manufactured products, manufacturing techniques, manufacturing processes, manufacturing locations, manufacturing equipment, manufacturing instructions, manufacturing environments, manufacturing costs, manufacturing features, manufacturing constraints, manufacturing requirements, manufacturing facilities, manufacturing outcomes, quality assessments of manufactured products, factories, factory operations, materials, a combination thereof, and/or the like. In various embodiments, one or more inputs entered into the system 100 via the one or more input devices 106 can be stored in the one or more data repositories 108. Additionally, one or more outputs of the user interface component 110 and/or computation component 112 can be stored in the one or more data repositories 108. Further, the one or more data repositories 108 can store data collected by one or more manufacturing facilities 130 employed by the system 100 to fulfill one or more manufacturing quotes.

For example, the one or more data repositories 108 can include: order data 126, operation data 124, product data 126, auxiliary data 128, a combination thereof, and/or the like. Example data that can be included in the order data 126 can include, but is not limited to: digital models of product designs (e.g., characterizing the product's size, shape, volume, color, and/or the like), required tolerances for the part or for specific features on the part, surface finish, post processing requirements or instructions, quality requirements, quality reports, process type, process settings, inputs entered into the system 100 via the one or more input devices 106, product material data (e.g., types of materials used in the product along with the physical and/or chemical properties of the materials), functions and/or services accessed by the user (e.g., historical manufacturing requests), pricing and/or cost information, the quantity of products associated with a past manufacturing quote, shipping information (e.g., with regards to one or more manufacturing facilities 130, entity locations, estimated shipping cost, and/or past manufacturing quotes), fulfillment dates, fulfillment locations, a combination thereof, and/or the like.

In various embodiments, one or more manufacturing facilities 130 employed by the system 100 can utilize one or more sensors to collect operation data 124 regarding the manufacturing process of one or more products while the products are being manufactured. Example types of data that can be included in the operation data 124 can include, but are not limited to: manufacturing machine settings, temperature measurements, humidity measurements, pressure measurements, material data (e.g., characterizing one or more raw materials used in the given manufacturing process and/or characterizing materials after processing), electricity consumption, power levels of machines and/or components of those machines, sound recordings, video recordings, photographs, measurements from light detection and ranging ("LIDAR"), measurements from displacement sensors, measurements from three-dimensional scanners, the location of a given product in a given time, a combination thereof, and/or the like.

The product data 126 can include data identifying and/or characterizing one or more properties of one or more products being manufactured. Example types of data that can be included in the part data 126 can include, but are not limited to: product identification numbers, product dimensions, designs for manufacturing checks, quality control data, quality control requirements, inspection statistical analyses on a manufactured product, material type, surface finish, required tolerance, measured tolerance, method of measurement and/or inspection, a combination thereof, and/or the like. Additionally, in one or more embodiments auxiliary data sources 132 can be employed by the system 100 to collect and/or store auxiliary data 128. Example auxiliary data sources 132 can include, but are not limited to: sensors in and/or near the one or more manufacturing facilities 130, information systems from venders, information systems from supplier partners, information systems that can be access over the internet, manufacturing equipment, cameras, microphones, video recording equipment, a combination thereof, and/or the like. The auxiliary data 128 can include additional data related to the manufacturing of one or more products via the system 100. Example types of data that can be included in the auxiliary data 128 can include, but are not limited to: weather data, environmental data, geometric data regarding parts (e.g., manufacturing material) in service and/or sourced from one or more vendors, commodities pricing and/or availability, competitor capabilities and/or benchmarking, supplier data, process requirements, data collected at locations of the manufacturing facilities 130, process data, information and data about the entities processing the order or employed in the manufacturing facilities 130, information that indicates one or more relationships between different parts and/or orders, a combination thereof, and/or the like.

In one or more embodiments, the computation component 112, and/or associate components of the computation component 112, can compare product features and/or manufacturing details of an initialized manufacturing quote to historical data stored in the one or more data repositories 108 to facilitate one or more of the various features described herein. For example, the computation component 112 can reference the one or more data repositories 108 for information regarding previously manufactured products, CAD models of previously manufactured products, geometry information about previously manufactured products, tolerance requirements tolerances achieved, manufacturing conditions, previously executed manufacturing quotes, previously incurred costs, a combination thereof, and/or the like. For instances, the computation component 112 can identify one or more previously manufactured products and/or previously executed manufacturing quotes that are similar to a given manufacturing quote based on one or more shared product features and/or manufacturing details. For instance, the computation component 112 can search the one or more data repositories 108 for similar orders based on product geometry, manufacturing techniques, material, order quantity, quality, and fulfillment/lead time requirements. By identifying similar manufactured products, designs, geometry, manufacturing data, and/or manufacturing quotes, the computation component 112 can leverage one or more insights expected to be shared between similar product features and/or similar manufacturing details. In various embodiments, the computation component 112 can generate a similarity score, which can be calculated based on geometry information, manufacturing process information, and/or the combination of several types of information available in the one or more data repositories 108. For example, a similarity score can be calculated by analyzing one type of information from previously manufactured products and comparing it to another product. In another example, the similarity score can be calculated by analyzing several types of information from previously manufactured products and comparing it to another product. If derived from several types of information, a similarity score can be a weighted average or sum of the similarity scores, where the weight placed on each type of information is determined by the user or by an algorithm executed by the computation component 112 that determines the weights based on how strongly each piece of information correlates with a desired manufacturing outcome. The computation component 112 can also employ a machine learning method that may provide correlations found between different types of historical data to determine the similarity score. In various embodiments, the computation component 112 can determine the similarity score based on: metadata regarding the how parts are produced (e.g., manufacturing process chosen and/or tolerances required); and geometry of the part to be manufactured, which can be compared pointwise to one or more previously manufactured parts. Further, the metadata and/or geometry information can be combined with a weighted average to determine the similarity score.

In one or more embodiments, the computation component 112 can reference data regarding particular manufacturing details and/or particular manufacturing detail combinations. For example, the data included in the one or more data repositories 108 can include past costs associated with one or more manufacturing materials, manufacturing facility 130 operations, labor, and/or shipping. In another example, the data included in the one or more data repositories 108 can include one or more references tables regarding manufacturing conditions (e.g., lead times, energy requirements, machining employed, tolerance values achieved) associated with one or more manufacturing processes and/or techniques. In a further example, one or more reference tables of the data repositories 108 can include chemical and/or physical properties of various manufacturing materials that can be employed by one or more manufacturing processes and/or can be processed by the one or more manufacturing facilities 130. In a further example, one or more reference tables of the data repositories 108 can define compatible combinations of manufacturing techniques and manufacturing materials. In a further example, the one or more reference tables of the data repositories 108 can define compatible combinations of manufacturing materials and surface finishing techniques. In a further example, the one or more reference tables of the data repositories 108 can include one or more operational capacities of respective manufacturing techniques and/or manufacturing machines. For instance, the one or more reference tables can define limits on the size, location, and/or dimensions of one or more product features in association with respective manufacturing techniques and/or manufacturing materials. In a further example, the one or more reference tables of the data repositories 108 can define compatible combinations of geometric features that can be manufactured together, and/or combinations of geometric features and materials that are manufacturable, and/or combinations of manufacturing processes that are mutually compatible, and/or combinations of manufacturing processes and materials that are compatible. In a further example, the one or more reference tables of the data repositories 108 can include attributes related to the cost of a product such as labor cost, machine cost, material usage, material waste, and the like. In a further example, one or more reference tables of the data repositories 108 can define methods to transport manufactured goods, the speed of those methods, and methods for storing parts in warehouses. In a further example, one or more reference tables of the data repositories 108 can define methods to measure the dimensions, surface finish, color, or porosity of a material or manufactured good. In a further example, one or more reference tables of the data repositories 108 can define environmental impact such as emissions, carbon generated, water consumption, or other measures of environmental impact.

In various embodiments, the computation component 112 can further employ one or more machine learning models to identify one or more trends from the data of the one or more data repositories 108. For example, deficiencies in a manufactured product can be recorded via the order data 126 and/or part data 126. The computation component 112 can employ one or more machine learning models to find commonalities between manufacturing quotes that resulted in products with deficiencies. For instance, the commonalities can be one or more relationships between one or more manufacturing details and product features. These commonalities can be searched and discovered using Bayesian methods, neural networks, linear regression models, probabilistic models, a combination thereof, and/or the like.

In one example, the geometry of a product design can be analyzed to create a defined set of points and/or features. These points and/or features can be compared to points and/or features in a set of products stored in the historical database. Further, the computation component 112 can employ one or more machine learning models to compare the geometry of the product with the geometry of other products, along with other manufacturing information for the product and other products. The products that exist in the one or more data repositories 108 may have known deficiencies. By identifying a specific set of points or features and any deficiencies that are associated with those points or features, the computation component 112 can predict manufacturing deficiencies in the product. In another example, machine learning models can be trained on the point clouds that represent a set of products with a labeled result set that represents whether those products had deficiencies. Such a machine learning model can be used by the computation component 112 to predict the probability of deficiencies in a previously unseen product. In a further example, the computation component 112 can generate one or more regression models for aspects of the manufacturing process recorded from order data 126. These regression models can be used to detect deficiencies inherent to the machines or materials requested for a product and to predict the likelihood of deficiencies during manufacturing. Thereby, the computation component 112 can generate one or more manufacturability warnings when a manufacturing quote is initialized with the identified commonalities.

Figure 3:
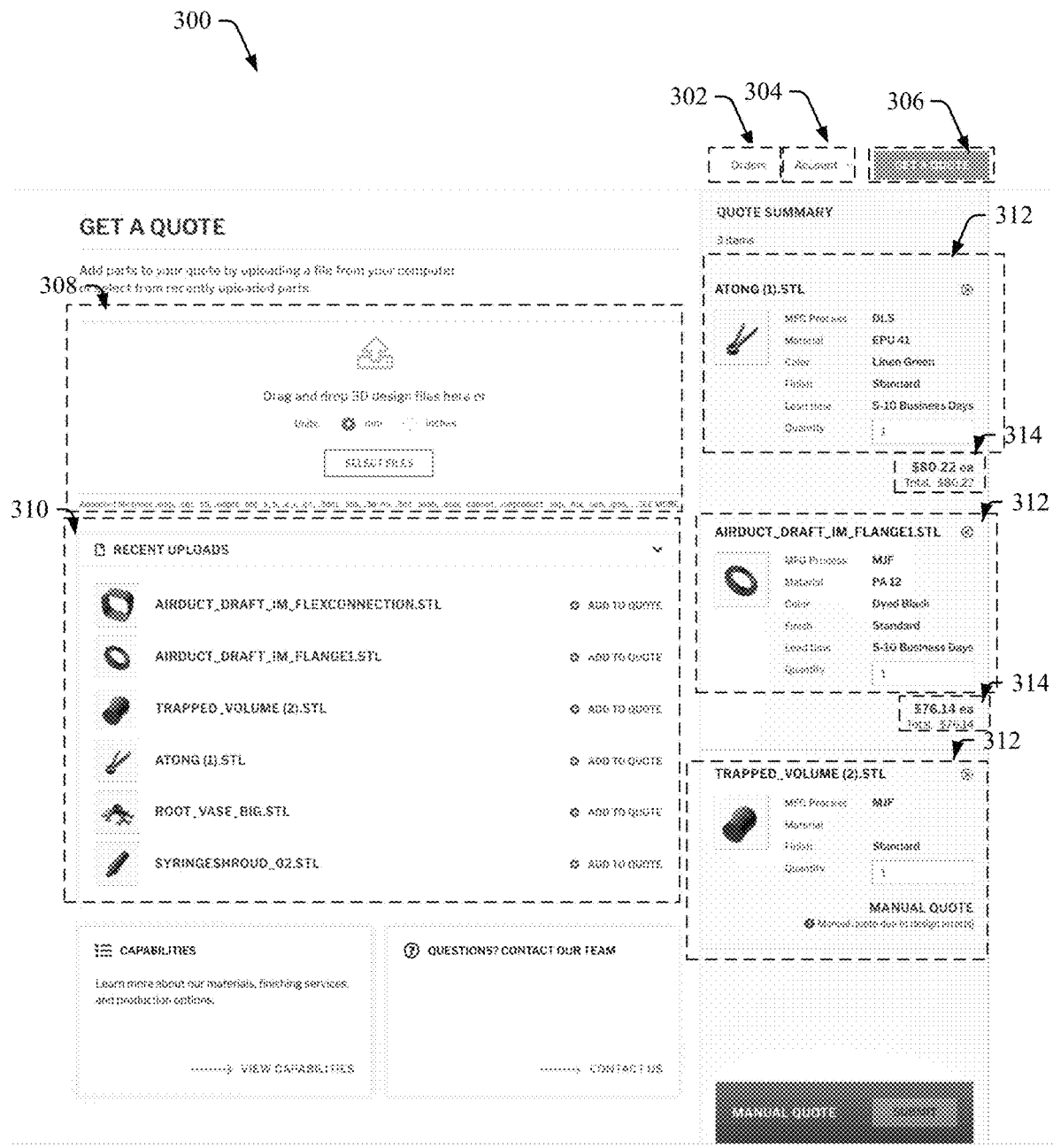
FIG. 3 illustrates a diagram of an example, non-limiting home display that can be generated by one or more user interface components to facilitate the generation of one or more manufacturing quotes regarding one or more digital product designs in accordance with one or more embodiments described herein.

FIG. 3 illustrates an example, non-limiting home display 300 that can be generated by the user interface component 110 in accordance with various embodiments described herein. Repetitive description of like elements employed in other embodiments described herein is omitted for the sake of brevity. In various embodiments, the user interface component 110 can generate the example home display 300 and/or the associate features of the example home display 300. As shown in FIG. 3, the example home display 300 can include: an order history section 302 (e.g., illustrated as an "orders" tab in FIG. 3), an account settings section 304 (e.g., illustrated as an "account" tab in FIG. 3), a manufacturing quote initialization section 306 (e.g., illustrated as "get a quote" tab in FIG. 3), and/or a combination thereof. The example home display 300 shown in FIG. 3 presents an exemplary layout that can be employed for the manufacturing quote initialization section 306. The one or more entities can interact (e.g., via the one or more input devices 106) with the manufacturing quote initialization section 306 to provide, and/or define, one or more digital product designs and/or manufacturing details, which can constitute a manufacturing quote.

In various embodiments, the order history section 302 can display past manufacturing quotes that were previously completed and/or are in progress. Also, in various embodiments the account settings section 304 can present settings and/or preferences associated with the one or more entities managing the given account.

As shown in FIG. 3, the manufacturing quote initialization section 306 can include: a file submission 308, a part history 310, a manufacturability report 312, and/or a cost report 314. The one or more input devices 106 can be employed to interact with the file submission 308 to enter one or more digital product designs into the system 100, where the digital product designs can define one or more products targeted for manufacturing. For example, the one or more input devices 106 can be employed to enter models and/or design data regarding a product targeted for manufacturing. For instance, the models can be three-dimensional ("3D") digital models of a variety of file types, such as computer-aided design models and/or documents. Example digital product design file formats the can be entered into the system 100 via the input device 100 can include, but not limited to: standard for the exchange of product data ("STEP") files (e.g., files having ".step" and/or ".stp" file extensions), stereolithography files (e.g., files having ".stl" file extension), a solidworks part file (e.g., files having a ".sldprt" file extension), a geometric modeling file format (e.g., having a ".obj", ".x_b", ".x_t", ".ipt", ".3dm", ".3ds", ."3dxml", ".3mf", ".asab", ".fbx", or ".asat", file extension), a three-dimensional computer-aided design application file (e.g., having a ".catpart", ".catproduct", or ".iam" file extension), a symbols export file (e.g., having an ".exp" file extension), an initial graphics exchange specification file (e.g., having an ".iges" file extension, and/or the like.

The part history 310 section of the example home display 300 can present digital product designs previous entered into the system 100 in association with the given account and/or entity. As shown in FIG. 3, the previously uploaded digital product designs can be displayed with one or more unique identifiers (e.g., file names) along with a thumbnail image of the associate product. For example, the thumbnail image can be a product model defined by the associate digital product design. When initializing a manufacturing quote, the one or more input devices 106 can be employed to upload a new digital product design via the file submission 308 section and/or select a digital product design from the part history 310 section of the example home display 300.

The manufacturability report 312 can include an analysis regarding the manufacturability associated with one or more manufacturing quotes. For example, the manufacturability report 312 can include a summary of manufacturing details paired with one or more digital product designs. As shown in FIG. 3, the manufacturability report 312 can include manufacturing details such as, for example, the type of manufacturing process, material, color, shipping details, strength requirements, tolerance requirements, size requirements, and/or finish requirements to be employed in manufacturing the given digital product design. In various embodiments, the one or more input devices 106 can be employed to customize the manufacturing details. The cost report 314 can include an analysis regarding the cost associated with one or more manufacturing quotes. The cost report 314 can include one or more cost determinations as a function of the associate digital product design and/or manufacturing details. As shown in FIG. 3, the cost report 314 can include cost details such as, for example, the cost per unit and/or the cost per manufacturing quote. In various embodiments, the home display 300 can present a plurality of manufacturability reports 312 and/or cost reports 314 associated with previously initialized manufacturing quotes. For example, FIG. 3 shows three previously initialized manufacturing quotes with associate manufacturability reports 312 and/or cost reports 314.

Figure 4:
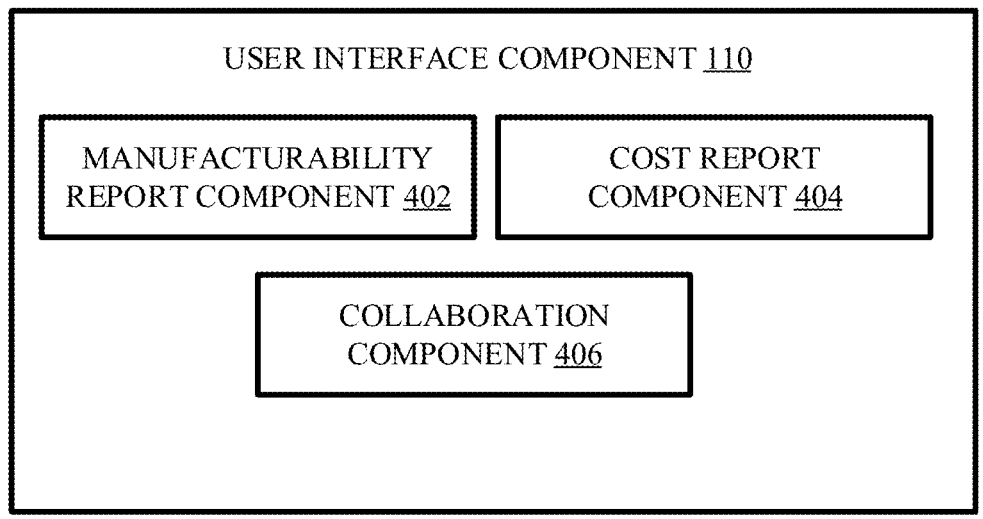
FIG. 4 illustrates a diagram of example, non-limiting user interface components that can be employed to generate manufacturability reports, cost reports, collaboration displays, and/or tracking reports regarding one or more manufacturing quotes in accordance with one or more embodiments described herein.

FIG. 4 illustrates a diagram of the example, non-limiting user interface component 110 further comprising manufacturability report component 402, cost report component 404, and/or collaboration component 406 in accordance with one or more embodiments described herein. Repetitive description of like elements employed in other embodiments described herein is omitted for the sake of brevity.

In various embodiments, the manufacturability report component 402 can generate the one or more manufacturability reports 312 based on one or more determinations by the computation component 112. In one or more embodiments, the one or more manufacturability reports 312 generated by the manufacturability report component 402 can analyze the feasibility of manufacturing one or more digital product designs in conjunction with one or more defined manufacturing details. FIGS. 6-12 depict example manufacturability reports 312 that can be generated by the manufacturability report component 402 and displayed via the user interface component 110.

Figure 13:
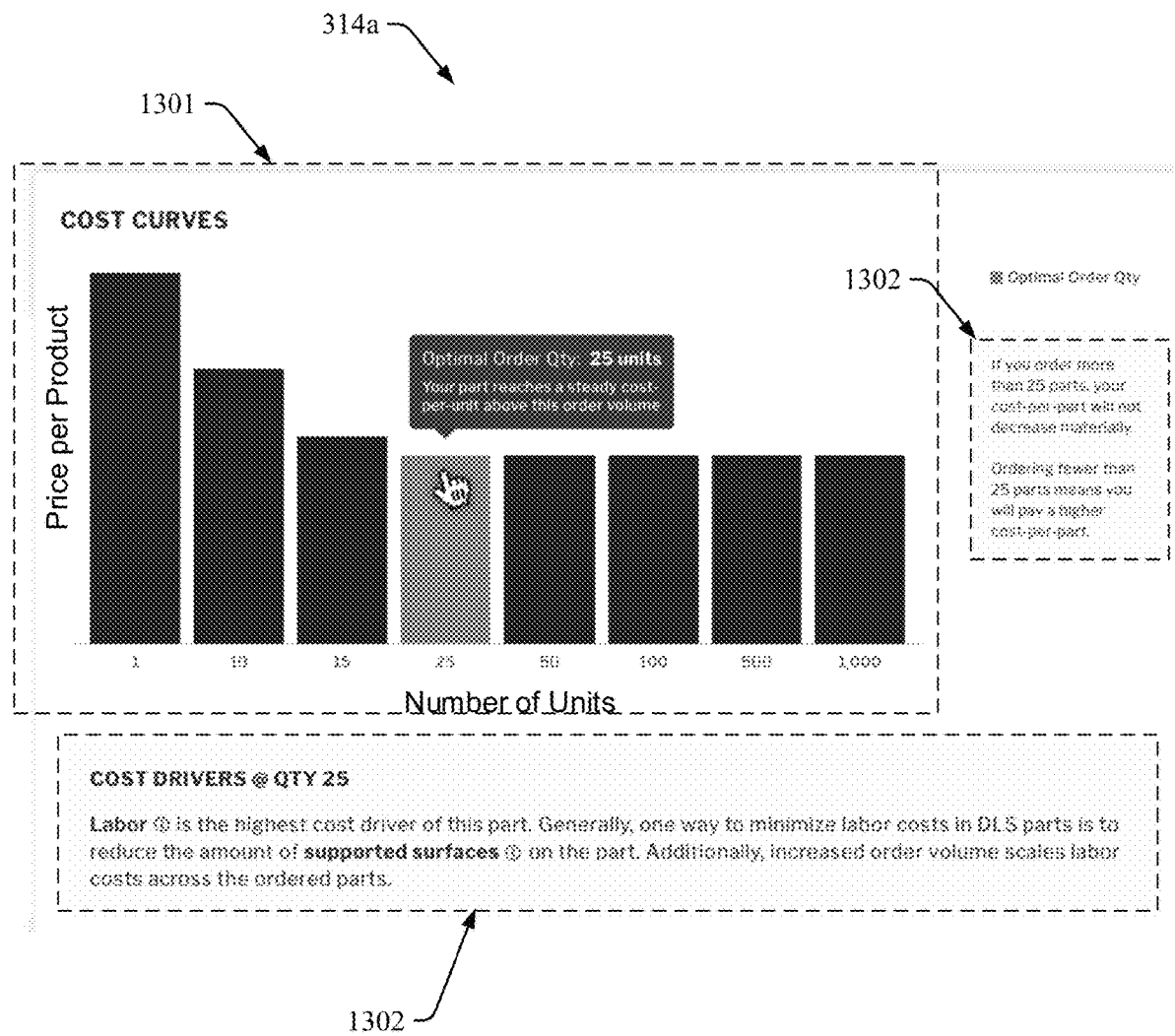
FIGS. 13-15 illustrate diagrams of example, non-limiting cost reports that can be generated by one or more autonomous computer systems to analyze the cost of one or more manufacturing quotes in accordance with one or more embodiments described herein.
Figure 14:
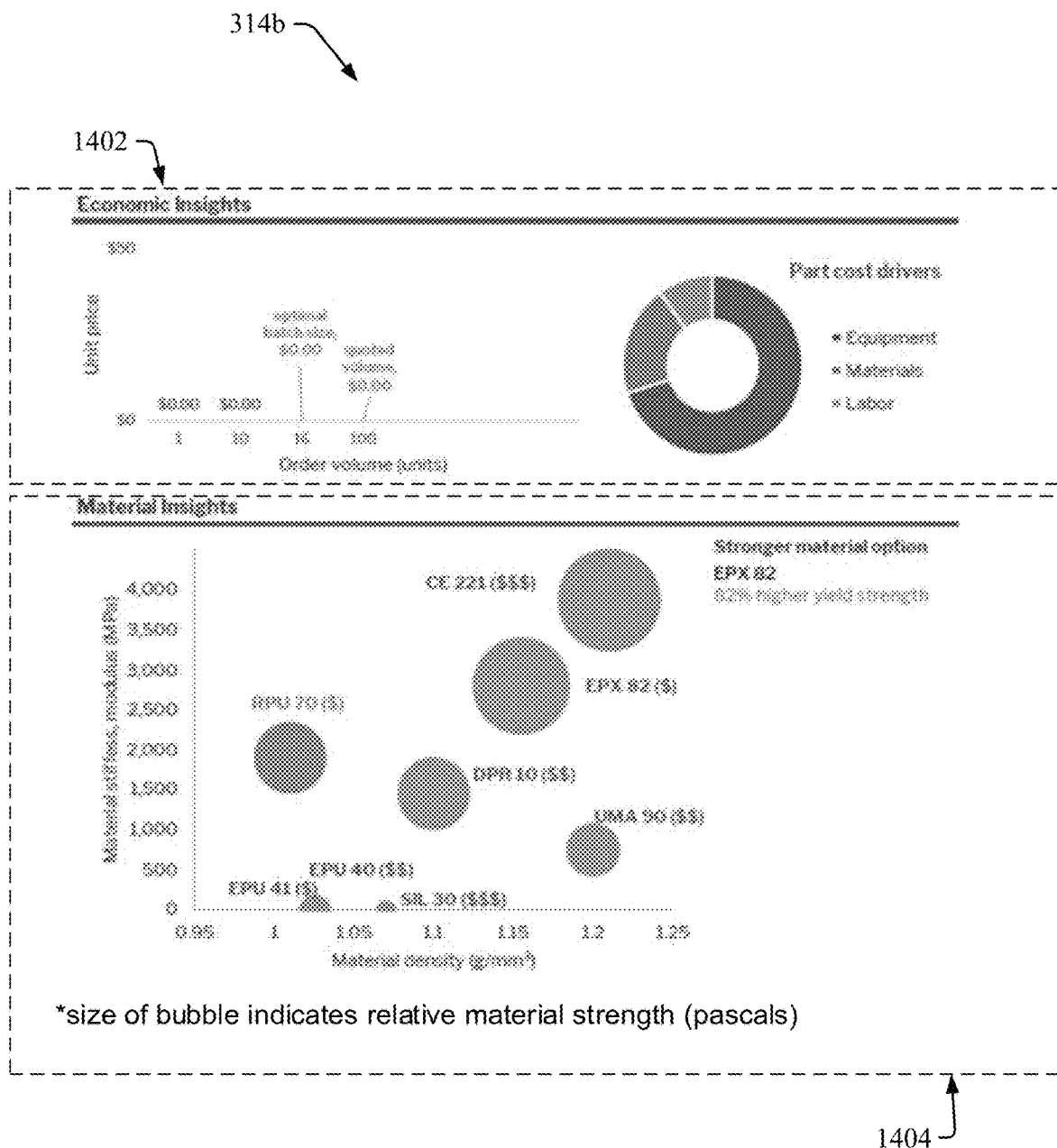
Figure 15:
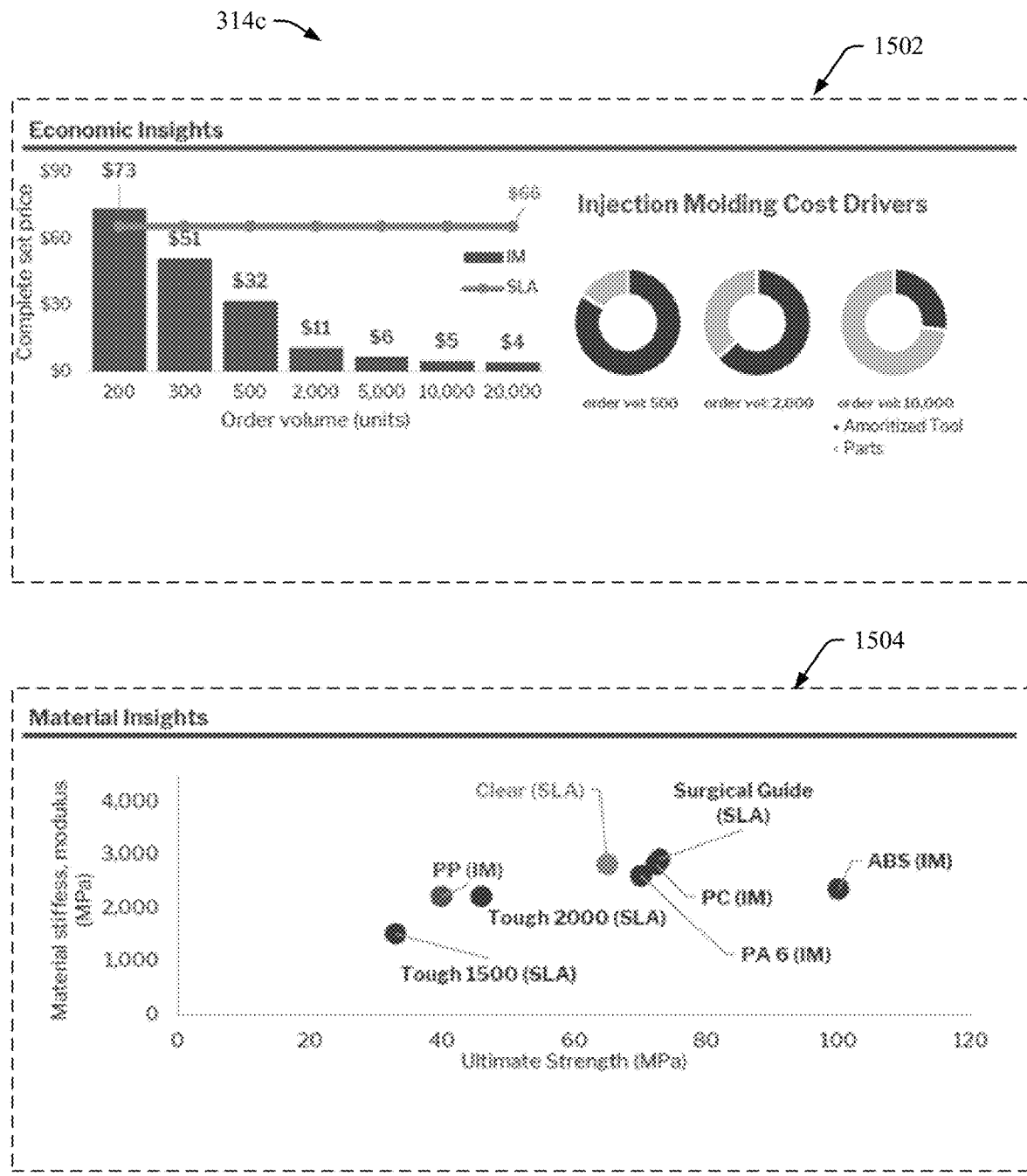

In various embodiments, the cost report component 404 can generate the one or more cost reports 314 based on one or more determinations by the computation component 112. In one or more embodiments, the one or more cost reports 314 generated by the cost report component 404 can be interactive via the one or more input devices 106 to display costs as a function of multiple different manufacturing details. FIGS. 13-15 depict example cost reports 314 that can be generated by the cost report component 404 and displayed via the user interface component 110.

Figure 17:
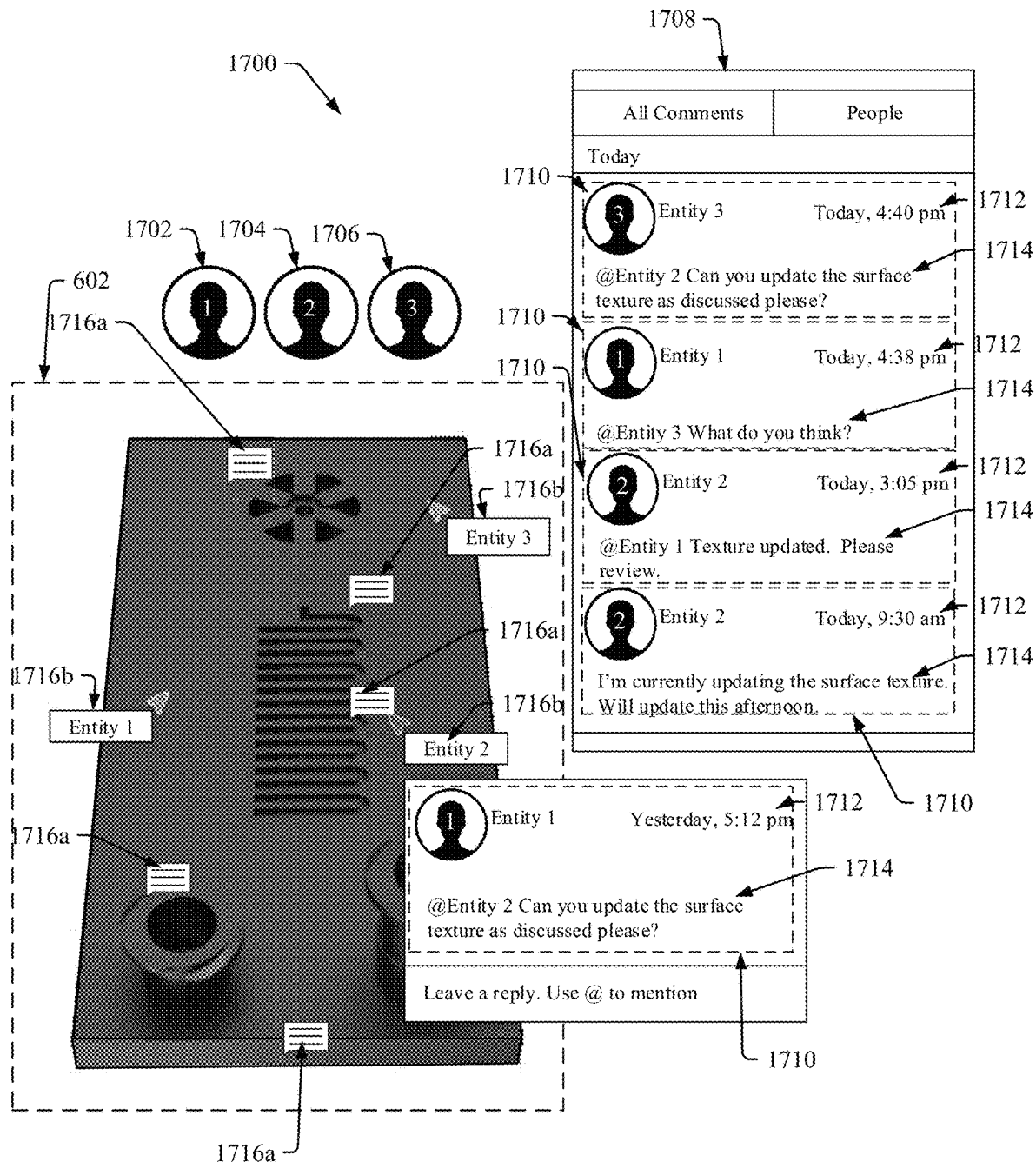
FIG. 17 illustrates a diagram of an example, non-limiting collaboration display that can be viewed concurrently and/or simultaneously by multiple members of a collaboration group to develop one or more manufacturing quotes in accordance with one or more embodiments described herein.

In various embodiments, the collaboration component 406 can generate one or more collaboration displays that can enable multiple entities to initialize a manufacturing quote in conjunction with each other. In one or more embodiments, one or more collaboration tools generated by the collaboration component 406 can enable multiple entities employing the system 100 to mutually revise a digital product design and/or manufacturing details to develop a manufacturing quote as a team. FIG. 17 depicts an example collaboration display 1700 that can be generated by the collaboration component 406 and displayed via the user interface component 110.

Figure 5:
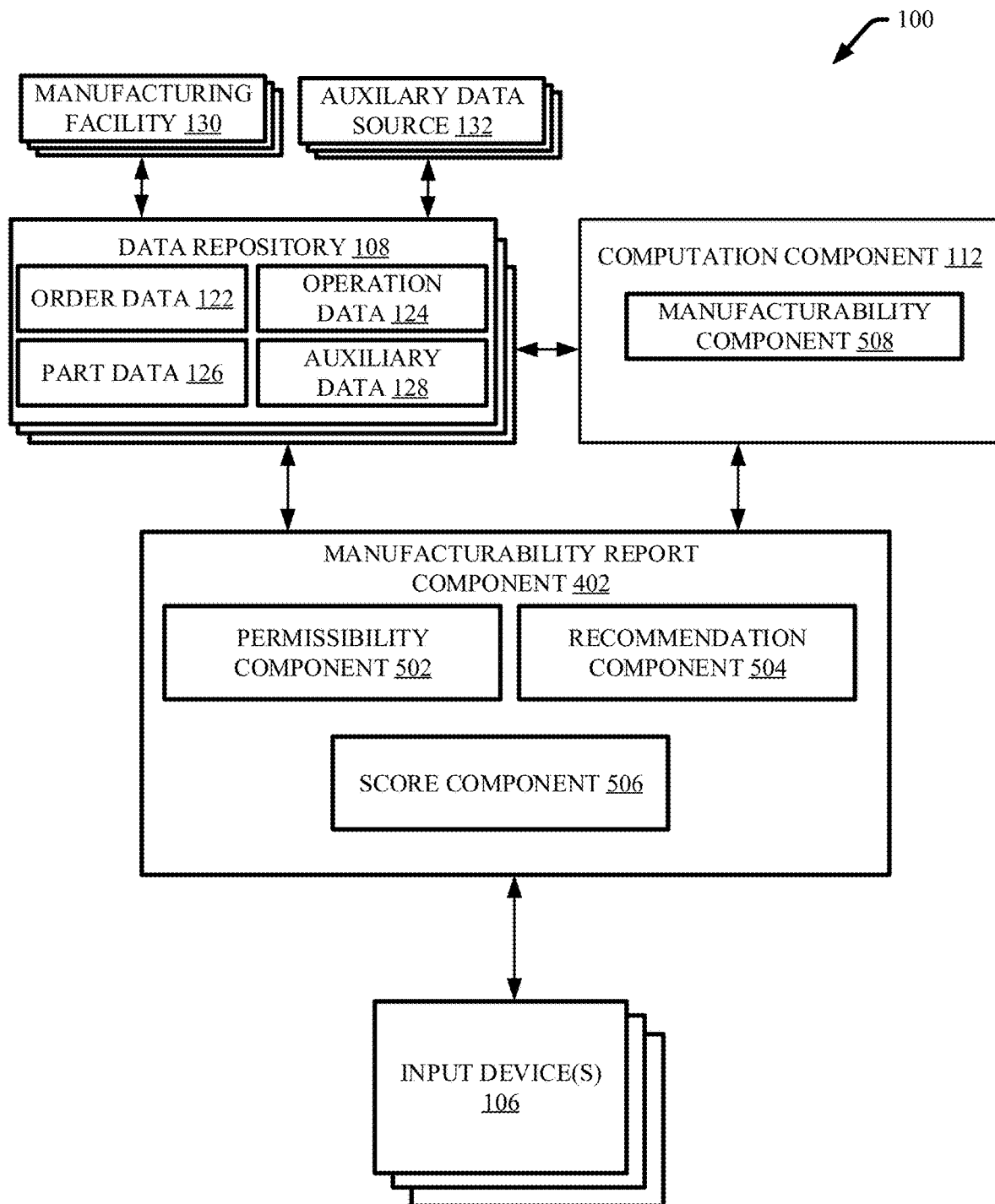
FIG. 5 illustrates a diagram of an example, non-limiting system that can generate and/or display one or more manufacturability warnings and/or recommendations regarding one or more manufacturing quotes in accordance with one or more embodiments described herein.

FIG. 5 illustrates a diagram of the manufacturability report component 402 comprising permissibility component 502, recommendation component 504, and/or score component 506 in accordance with one or more embodiments described herein. Additionally, the computation component 112 can comprise manufacturability component 508. Repetitive description of like elements employed in other embodiments described herein is omitted for the sake of brevity.

In one or more embodiments, the manufacturability report component 402 can generate one or more manufacturability reports 312 to collect manufacturing details regarding one or more manufacturing quotes and/or analyze manufacturability of the digital product design. For example, the one or more input devices 106 can be employed to interact with the one or more manufacturability reports 312 to define one or more manufacturing details (e.g., select manufacturability details from one or more drop down menus). The manufacturing details can be employed in association with one or more selected digital product designs to develop a manufacturing quote. For instance, the one or more input devices 106 can be employed to interact with the one or more manufacturability reports 312 to enter one or more of the following example manufacturability details including, but not limited to: preferred manufacturing materials and/or material properties; preferred manufacturing technique (e.g., 3D printing, such as digital light synthesis "DLS", multi jet fusion "MJF", fused deposition modeling "FDM", selective laser sintering "SLS", a combination thereof, and/or the like); target tolerances (e.g., general tolerance requirements and/or specific tolerances for each feature of a digital product design); desired surface finish (e.g., a general surface finish, and/or specific surface finish for each feature of a digital product design), such as defined by a roughness, porosity appearance, a specific geometry that defines microscopic or mesoscopic shapes of a surface, a texture, a geometric pattern overlaid onto the surface, and/or the like; desired color, color uniformity, and/or other aesthetic requirements; desired photo and/or video logs to be gathered on parts; a combination thereof, and/or the like.

Additionally, the one or more manufacturing details can delineate one or more quality control requirements associated with manufacturing a given digital product design. For example, the one or more manufacturing details can delineate: an inspection type (e.g., visual inspection and/or dimensional metrology), number of parts to be inspected, sampling plan, desired data logging, locations of the manufactured product to inspect for visual defects, criteria for a pass/fail analysis regarding defects, a combination thereof, and/or the like. Further, the one or more manufacturing details can describe desired tests to be performed on the manufactured product, such as mechanical property tests, electrical property tests, color tests, surface finish tests, surface roughness tests, chemical property tests, chemical resistance tests, a combination thereof, and/or the like.

Moreover, the one or more manufacturing details can include post processing instructions such as: assembly instructions, packaging instructions, painting instructions, polishing instructions, heat treatment instructions, a combination thereof, and/or the like. Additionally, the one or more manufacturing details can include: a desired order quantity, desired fulfillment time, a desired fulfillment location (e.g., where to ship the manufactured product), a desired fulfillment date, a preferred shipping method, a combination thereof, and/or the like. Furthermore, the one or more manufacturing details can describe one or more relationships between different parts comprised within a digital product design (e.g., including fit and/or tolerances between respective parts).

As shown in FIG. 5, the manufacturability report component 402 can share the one or more manufacturing details and/or digital product designs with the one or more data repositories 108 and/or computation component 112. In various embodiments, the computation component 112 can include manufacturability component 508, which can analyze the feasibility of given manufacturing quote based on, for example, the digital product design in combination with the one or more manufacturing details in view of the historical data of the one or more data repositories 108.

Different manufacturing materials and/or manufacturing techniques can be capable of manufacturing different product features and/or model geometries. Thereby, a product characterized by the given digital product design may be more compatible with a first combination of manufacturing details than a second combination of manufacturing details. For example, a given digital product design can be manufacturable using a fused deposition modeling additive manufacturing technique in a nylon material, but the same digital product design can be subject to severe manufacturing challenges and/or restraints using a powder bed additive manufacturing technique in the same nylon material. In another example, a digital product design can be manufacturable using a powder bed additive manufacturing technique in a nylon material, but the same digital product design can be subject to severe manufacturing challenges and/or restraints using an aluminum material.

In various embodiments, the manufacturability component 508 can determine the amount of compatibility between a given digital product design and defined manufacturing details. In one or more embodiments, the manufacturability component 508 can further determine the amount of compatibility based on the data of the one or more data repositories 108. For example, the operation data 124 can delineate what manufacturing equipment is available in the one or more manufacturing facilities 130. Thereby, the computation component 508 can determine whether the one or more define manufacturing techniques can be employed with the available equipment. In another example, the auxiliary data 128 can delineate what manufacturing materials are available. Thereby, the computation component 508 can determine whether the one or more defined manufacturing materials are available for execution in the manufacturing techniques.

Additionally, the manufacturability component 508 can analyze the size, shape, and/or geometry of the digital product design, a region of the digital product design in relation to the one or more manufacturing details. Further, the manufacturability component 508 can analyze one or more features and/or a collection of features of the digital product design in relation to the one or more manufacturing details. For instance, the manufacturability component 508 can analyze a specific feature within the digital product design, multiple features within the digital product design, and/or all the features within a digital product design when determining a compatibility between the digital product design and a set of manufacturing details. The manufacturability component 508 can analyze the manufacturability of a specific feature using one or more process models that determine: how material is to be removed or added to create a specific feature; design rules that have been reduced to a mathematical model for a specific type of feature or features; and/or employ one or more lookup tables that contain lists of features that can and cannot be manufactured using a specific manufacturing process, set of processes, and/or material.

In various embodiments, historical data (e.g., such as order data 126 and/or part data 126) included in the one or more data repositories 108 can regard previously manufactured products of similar design and/or manufacturing details. The manufacturability component 508 can analyze the previously manufactured products to determine whether a combination of one or more structural features in the digital product design and one or more manufacturing details can result in a desired product quality.

In a first manufacturability consideration example that can be analyzed by the manufacturability component 508, a digital product design can be subject to manufacturing challenges due to a size of the product in relation to one or more manufacturing details (e.g., such as manufacturing technique and/or material). The manufacturability component 508 can analyze the size of the product (e.g., as defined by the one or more digital product designs) in relation to the size of parts that can be made using one or more manufacturing machines employed in the defined manufacturing technique. For instance, some product geometries can exceed the maximum part size for the one or more manufacturing machines. In another instance, one or more product features can be too small for the one or more manufacturing machines to fabricate. In various embodiments, information regarding the manufacturing machines associated with each manufacturing technique and available at the one or more manufacturing facilities 130 can be stored in the one or more data repositories 108, along with the operational capacities of the manufacturing machines (e.g., stored as operation data 124, which can be collected from the one or more manufacturing facilities 130). Thereby, the manufacturability component 508 can reference the data of the one or more data repositories 108 to determine if the dimensions defined in the digital product design are compatibility with given manufacturing details and/or capacities of the one or more manufacturing facilities 130.

In another manufacturability consideration example that can be analyzed by the manufacturability component 508, one or more features of the digital product design can be at risk for breakage during or after the manufacturing process. For instance, one or more features of the digital product design can be too small, too thin, and/or be subject to stresses and/or strains that can exceed allowable tolerances for the given manufacturing material. The manufacturability component 508 can compare one or more features of the digital product design with known criteria for part breakage based on, for example: size, shape, stress, strain, material stiffness, material strength, material yield properties, applied load, applied stress, internal stress, presence of defects and the size, shape, and location of those defects, fracture toughness, failure modeling, a combination thereof, and/or the like. In one or more embodiments, said criteria can be stored as data within the one or more data repositories 108 (e.g., as part data 126 and/or auxiliary data 128).

In a further manufacturability consideration example that can be analyzed by the manufacturability component 508, with regards to additive manufacturing techniques, product orientation relative to the build direction can affect manufacturability. One or more features of the digital product design can be manufacturable in a first orientation while be subject to manufacturing challenges in a second orientation. Thus, the manufacturability component 508 can analyze the orientation of the product in the digital product design along with the orientation of one or more features of the product (e.g., in relation to feature size) in determining manufacturability. In one or more embodiments, the manufacturability component 508 can test different product orientations and recommend an orientation that provides the most compatibility with the given manufacturing details and/or target results. Information regarding past executions of additive manufacturing techniques with regards to product orientation can be stored in the one or more data repositories 108 and/or referenced by the manufacturability component 508. The manufacturability of specific features in specific orientations can be different for different materials and/or for different manufacturing processes. Thus, the manufacturability component 508 can consider all of these factors or some of these factors to analyze manufacturability. Some combinations of design, process, and material are manufacturable in any orientation, some combinations are manufacturable in one or more specific orientations but not in other orientations, and some combinations are not manufacturable regardless of the orientation. As described herein, the manufacturability component 508 can compare various features of a manufacturing quote to historical data in the one or more data repositories 108 to facilitate determinations regarding whether the given combination of design, manufacturing process, and/or material choses are manufacturable in a desired orientation.

In a further manufacturability consideration example that can be analyzed by the manufacturability component 508, combinations of manufacturing details (e.g., product design, manufacturing technique, manufacturing material, and/or machine settings) can result in one or more defects, imperfections, and/or undesirable surface roughness. In one or more embodiments, the manufacturability component 508 can predict the potential to create defects, imperfections, and/or surface roughness based on physical models of the product fabrication process (which can be characterized and stored as part data 126 in the one or more data repositories 108). In one or more embodiments, the manufacturability component 508 can predict the potential to create defects, imperfections, and/or surface roughness based on a probabilistic analysis of previously manufactured products made with similar manufacturing details (e.g., product design, feature design, manufacturing technique, manufacturing material, machine settings) along with reports (e.g., stored as part data 126 and/or auxiliary data 128) of defects, imperfections, and/or surface roughness of those products.

In a further manufacturability consideration example that can be analyzed by the manufacturability component 508, combinations of manufacturing details (e.g., product design, manufacturing technique, manufacturing material, and/or machine settings) can result in product warpage. In one or more embodiments, the manufacturability component 508 can predict product warpage based on one or more physical models and/or probabilistic analysis of previous products made with similar manufacturing details (e.g., product design, feature design, manufacturing technique, manufacturing material, machine settings) along with reports (e.g., stored as part data 126 and/or auxiliary data 128) of warpage of those products. In one or more embodiments, the manufacturability component 508 can compare the amount of predicted warpage to one or more warpage criteria associated with the manufacturing process and/or one or more tolerances defined in the manufacturing details.

In a further manufacturability consideration example that can be analyzed by the manufacturability component 508, one or more product shapes and/or features can be subject to manufacturing challenges when produced using one or more particular manufacturing processes. To produce a defined shape and/or feature, material may be needed to be added or subtracted from a material surface. For instance, a manufacturing tool can be required to access a region of a product in order to add or subtract material, where the manufacturability component 508 can determine whether the digital product design can accommodate the insertion or presence of the required tool. In one or more embodiments, the dimensions of the manufacturing tool can be stored in the one or more data repositories 108 (e.g., as operation data 124), and the manufacturability component 508 can compare the tool dimensions to one or more clearances defined in the one or more digital product designs. In another instance, material can be supported by other material in order to be added or subtracted, where the manufacturability component 508 can determine whether continuous connections of material are required to manufacture the given product. The manufacturability component 508 can identify a manufacturing challenge where the digital product designs require internal voids or cavities where the chosen manufacturing technique requires the deposition of continuous material. Additionally, the manufacturability component 508 can determine when a chosen manufacturing technique is unable to achieve overhangs and/or undercuts delineated in the digital product design. In one or more embodiments, each manufacturing technique can be associated with a respective list of known feature shapes and/or geometries that can result in manufacturing challenges, where the respective lists can be stored in the data repositories 108 (e.g., as part data 126 and/or auxiliary data 128) and/or referenced by the manufacturability component 508.

In a further manufacturability consideration example that can be analyzed by the manufacturability component 508, one or more product features, while feasible in isolation, can be subject to manufacturing challenges when positioned in close proximity to one or more other product features. The manufacturability component 508 can analyze the geometry, dimensions, size, location, and/or spacing of the various features defined in the digital product design to determine whether the features, as defined, are compatible with each other in the context of the choose manufacturing details (e.g., manufacturing technique and/or materials). For example, when a hole or slot is in close proximity to another hole or slot, the solid material on the manufactured part between those features may not have the correct dimensions due to the specific manner that material is added or removed to form the features. In another example, if a ridge or pillar feature is in close proximity to another ridge or pillar, the distance between those features on the manufactured part may not have the correct dimension due to the way that the specific manner that material is added or removed to form the features. Adding or removing material for multiple proximate features can result in too much material added, not enough material being added, too much material being removed, or not enough material being removed. If the material addition or removal requires the use of a tool, for example a cutting tool or a deposition tool, then the size of the tool or the interaction between the tool and the material may limit the addition or subtraction of material in a way that prevents the accurate formation of proximate features. The process by which the material is added or removed can also result in high temperature, temperature gradients, stress, stress gradients, defect generation, or other changes to the material in a manner that prevents the accurate formation of proximate features. The manufacturability component 508 can analyze the size, shape, and proximity of features, as well as information about the material and processes to evaluate whether proximate features are manufacturable.

In a further manufacturability consideration example that can be analyzed by the manufacturability component 508, one or more product features defined in the digital product design can have a radius dimension that can be subject to manufacturing challenges. In one or more embodiments, the manufacturability component 508 can analyze the edges of the product features to determine whether the radius on the edges will face one or more manufacturing challenges based on the given manufacturing details. For example, each manufacturing technique can be associated with a range of feasible radius dimensions, where the respective radius ranges can be stored in the data repositories 108 (e.g., as part data 126 and/or auxiliary data 128) and/or referenced by the manufacturability component 508.

In a further manufacturability consideration example that can be analyzed by the manufacturability component 508, the digital product design can define one or more holes in the product that can be subject to manufacturing challenges. In one or more embodiments, the manufacturability component 508 can analyze the location, depth, contour, and/or angle of one or more holes defined by the digital product design in relation to one or more of the manufacturing details. For example, a range of feasible hole dimensions can be associated with one or more manufacturing techniques, manufacturing equipment, and/or machine settings, where the respective range of feasible hole dimensions can be stored in the data repositories 108 (e.g., as part data 126 and/or auxiliary data 128) and/or referenced by the manufacturability component 508.

In a further manufacturability consideration example that can be analyzed by the manufacturability component 508, the manufacturability component 508 can analyze the one or more digital product designs for errors in the product modeling. For instance, within the digital product design, the product model can be represented by a group of triangles whose vertices are defined in three dimensions. Each triangle of the model can be positioned adjacent to at least three other triangles of the model. One or more modeling errors can result in gaps between the model triangles. In one or more embodiments, the manufacturability component 508 can analyze the triangle edges of the product model and to determine whether the edges are manifold. The manufacturability component 508 can record and/or report non-manifold edges as one or more errors in the product modeling that can be subject to manufacturing challenges. In another instance, the product model can include triangles configured such that the model includes regions of the product with near zero thickness. In one or more embodiments, the manufacturability component 508 can identify data points lying outside a known triangle and report the identified points as zero-thickness regions that can be subject to manufacturing challenges.

In a further manufacturability consideration example that can be analyzed by the manufacturability component 508, in some additive manufacturing techniques, it is possible to manufacture one part inside another part, or a region of one part inside another part, or a region of one part that extends into a cavity of another part, or parts that are joined together with linkages and/or connection points. In one or more embodiments, the manufacturability component 508 can check the minimum and/or maximum number of identical parts able to fit within the build volume of a specified additive manufacturing technique. For example, the manufacturability component 508 can organize the known build volume into one or more regions. Further, the manufacturability component 508 can place two copies of the part into a region and determines whether the parts overlap in the build. The manufacturability component 508 can then increase the number of copies of the part that are located in the designated region until the number of copies does not fit in the region. Thereby, the manufacturability component 508 can determine the maximum number of parts that can fit in the region.

In a further manufacturability consideration example that can be analyzed by the manufacturability component 508 with respect to additive manufacturing, one or more product features defined in the digital product design can include an empty void in the interior which will contain unwanted material that cannot be removed, or that have ventilation holes of insufficient size or number to remove the unwanted material. In one or more embodiments, the manufacturability component 508 can identify empty voids that require new ventilation holes, larger ventilation holes, or additional ventilation holes.

In various embodiments, the manufacturability component 508 can share the outcome of each manufacturability consideration with the manufacturability report component 402. Further, the manufacturability component 508 can generate one or more warnings based on one or more identified manufacturing challenges. For example, where the manufacturability component 508 determines that a given digital product design can face one or more manufacturing challenges when executed with one or more defined manufacturing details, the manufacturability component 508 can generate one or more warnings. In various embodiments, the one or more warnings can delineate a specific combination of a product design feature and manufacturing detail that can result in the manufacturability challenge. Additionally, the warnings can characterize a severity of the manufacturability challenge. For example, one or more warning may be associated with a first warning level, where the first warning level can indicate that the proposed product design and manufacturing detail combination can result in a manufacturing quote that is feasible but less than desirable. In another example, one or more warnings may be associated with a second warning level, where the second warning level can indicate that the proposed product design and manufacturing detail combination can result in an infeasible manufacturing quote.

In one or more embodiments, the permissibility component 502 can populate the manufacturability report 312 with the various manufacturability considerations analyzed by the manufacturability component 508. Additionally, the permissibility component 502 can populate the manufacturability report 312 with the outcome and/or warnings generated by the manufacturability component 508 in association with each manufacturability consideration. Thereby, one or more entities using the system 100 can view (e.g., via the one or more input devices 106 and/or user interface component 110) a compatibility analysis between the given digital product design and manufacturing details. Further, the one or more entities can decide whether to alter one or more manufacturing details based on one or more warnings generated by the manufacturability component 508 and presented via in the manufacturability report 312 via the permissibility component 502.

In various embodiments, the manufacturability component 508 can further generate one or more recommendations. The recommendations can identify, for example, specific features that should be altered to make the product manufacturable, to avoid potential defects, and/or to achieve desired tolerances. The recommendations can describe, for example, alterations to the one or more manufacturing details and/or digital product design that can enhance compatibility between the digital product design and the one or more manufacturing details. For example, the manufacturability component 508 can generate one or more recommendations based on the generation of one or more warnings associated with one or more of the manufacturability considerations. For instance, the one or more recommendations can regard an alternate manufacturing process, an alternate manufacturing material, an alternate manufacturing technique, an alternate post-processing method, an alteration to one or more dimensions of the product design and/or features, a removal and/or relocation of one or more product features, consolidation of multiple components into a single component, deconsolidation of a component into multiple components, a combination thereof, and/or the like. For instance, where the size of a product feature is outside a permissible range associated with the chosen manufacturing process (e.g., as defined by range data within the one or more data repositories 108), the manufacturability component 508 can generate one or more recommendations to alter the product feature size to dimensions within the permissible range and/or alter the manufacturing process to a process associated with a permissible size range that encompasses the given dimensions. For instance, when the size of a product feature is outside a permissible range associated with the chosen manufacturing process (e.g., as defined by range data within the one or more data repositories 108), the manufacturability component 508 can generate one or more recommendations to choose a different manufacturing process and/or material.

In one or more embodiments, the manufacturability component 508 can generate one or more recommendations to assist in the completion of a manufacturing quote. For example, the one or more entities initializing the manufacturing quote can leave one or more manufacturing details undefined (e.g., a manufacturing technique and/or material can be left undefined). In response to the manufacturing details being left undefined, the manufacturability component 508 can recommend one or more manufacturing details to be included in the manufacturing quote. For example, the manufacturability component 508 can compare the given manufacturability details to previous manufacturing quotes having the one or more given manufacturing details in common to identify similar manufacturing quotes previously executed. Further, the manufacturability component 508 can analyze the identified similar manufacturing quotes to generate recommendations to be employed as the undefined manufacturing details. The recommendations can be generated based on, for example: the most commonly employed manufacturing details, manufacturing details that have been known to exhibit the highest compatibility with the given manufacturing details, manufacturing details that have resulted in the smallest tolerances in previously manufactured products, manufacturing details that can achieve the highest yield from the manufacturing process, manufacturing details that can result in the lowest cost for the manufacturing report, a combination thereof, and/or the like.

In one or more embodiments, the recommendation component 504 can populate the one or more manufacturability reports 312 with one or more recommendations generated by the manufacturability component 508. Further, the recommendation component 504 can position the recommendations within the manufacturability report 312 so as to delineate a correlation between one or more manufacturability considerations and the associate recommendations. Further, the one or more entities can decide how to alter one or more manufacturing details based on one or more recommendations generated by the manufacturability component 508 and presented via in the manufacturability report 312 via the recommendation component 504.

In various embodiments, the manufacturability component 504 can also generate one or more manufacturability scores to quantify the total amount of compatibility between the given digital product design and manufacturing details. For example, the manufacturability score can be a function of a numerical range characterizing the compatibility. For instance, the numerical range be from 0 to 100, where 0 can indicate the lowest amount of compatibility and 100 can indicate the highest amount of compatibility. The manufacturability component 508 can determine a respective score for each manufacturability consideration and can aggregate the plurality of scores to determine the overall manufacturability score. Additionally, the manufacturability considerations can be weighted based on their impact to the manufacturing quote. For example, the amount of compatibility associated with a first manufacturability consideration can have a more profound impact on the execution of the manufacturing quote than the amount of compatibility associated with a second manufacturability; thus, the first manufacturability consideration have been weighted more than the second manufacturability consideration in determining the overall manufacturability score. For instance, whether a chosen material can be employed with a chosen manufacturing technique can have a more profound impact on the execution of the manufacturing quote than color of the material, as the color of the material can be rendered irrelevant if the material cannot be employed.

As the manufacturability component 508 identifies more manufacturing challenges in executing the given manufacturing quote, the degrading feasibility of executing the manufacturing quote can be reflected by the manufacturability score. Thereby, the one or more entities can decide whether to implement the standing version of the manufacturing quote or alter the manufacturing quote in accordance with one or more of the presented warnings and/or recommendations to achieve a more preferred manufacturability score.

Figure 6:
FIGS. 6-11 illustrate diagrams of example, non-limiting manufacturing reports that can be generated by one or more autonomous computer systems to analyze the manufacturability of one or more manufacturing quotes in accordance with one or more embodiments described herein.

FIG. 6 illustrates a diagram of a first example, non-limiting manufacturability report 312a that can be generated by the manufacturability report component 402 based on one or more determinations by the manufacturability component 508 in accordance with one or more embodiments described herein. Repetitive description of like elements employed in other embodiments described herein is omitted for the sake of brevity. As shown in FIG. 6, the first example manufacturability report 312a can include a product depiction area 602, where a three-dimensional model of the product can be present in accordance with the one or more provided digital product designs. In various embodiments, the three-dimensional model of the product can be presented in one or more different viewing options (e.g., a "solid viewing", as shown in FIG. 6).

Also shown in FIG. 6, the first example manufacturability report 312a can include a manufacturability checks region 604 that can present a plurality of manufacturing considerations analyzed by the manufacturability generator 508. Additionally, one or more warnings generated by the manufacturability component 508 can be included in the manufacturability checks region 604 (e.g., populated by the permissibility component 502). For instance, the various manufacturability considerations can be identified by respective titles (e.g., "Partially Unvented Volumes", "Supported Surfaces", "Thin Sections", "Unvented Volumes", "All Passed Checks" shown in FIG. 6). Additionally, a warning symbol 606 can be presented next to manufacturing considerations associated with a warning generated by the manufacturability component 508. Further, a passed symbol 608 can be presented next to manufacturing considerations that did not warrant a warning. In one or more embodiments, the one or more input devices 106 can be employed to select one or more of the warning symbols and/or manufacturability consideration titles to acquire more information regarding the analysis by the manufacturability component 508. In various embodiments, the permissibility component 502 can populate the manufacturability checks region 604 with description regarding each manufacturing consideration analyzed by the manufacturability component 508. Additionally, the manufacturability report component 402 can generate a manufacturing details input section 610 (e.g., as shown by the first example manufacturability report 312a) where one or more input devices 106 can be employed to enter one or more manufacturing details described herein.

Figure 7:
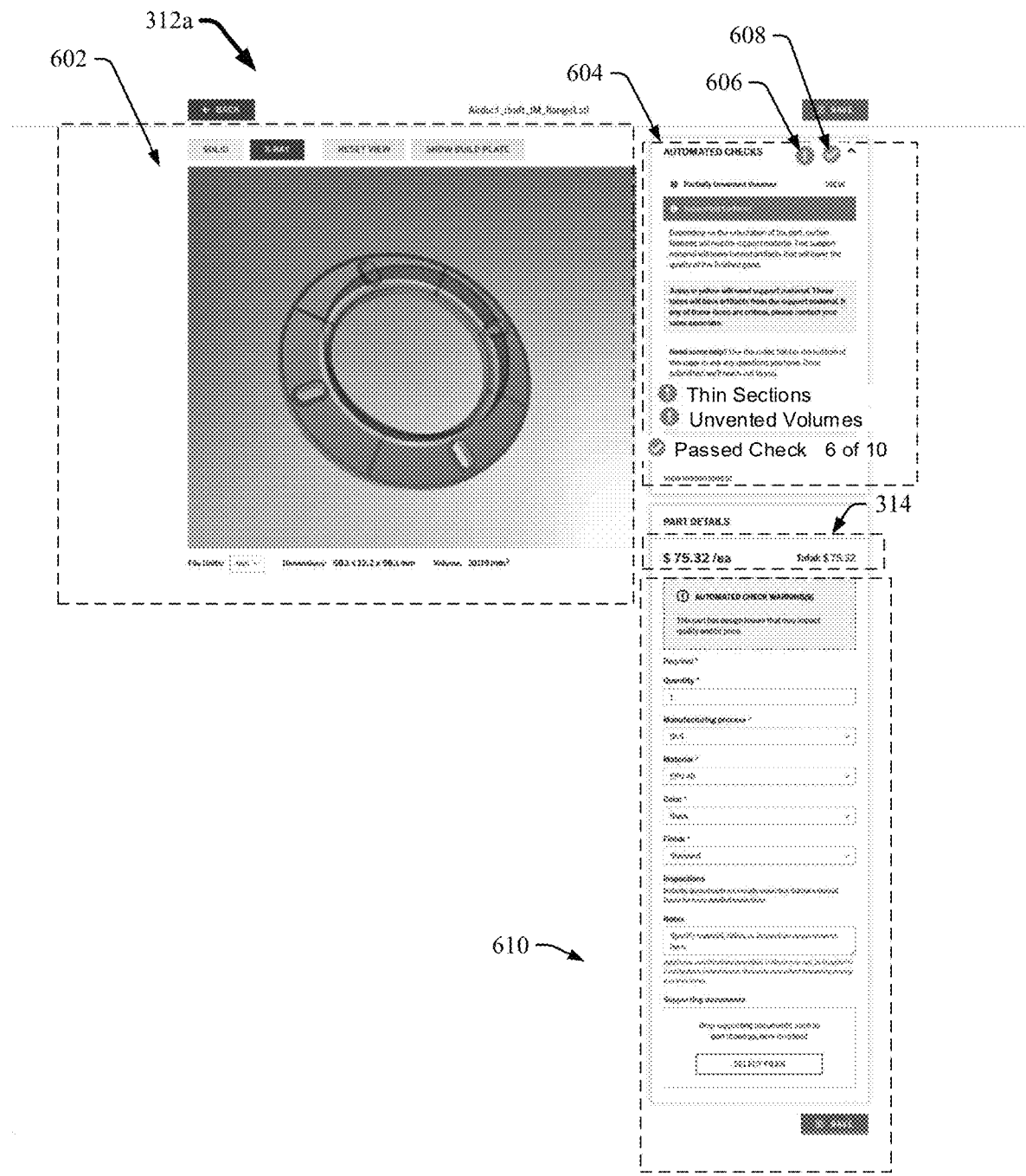

FIG. 7 illustrates another diagram of the first example, non-limiting manufacturability report 312a that can be generated by the manufacturability report component 402 based on one or more determinations by the manufacturability component 508 in accordance with one or more embodiments described herein. Repetitive description of like elements employed in other embodiments described herein is omitted for the sake of brevity. As shown in FIG. 7, the one or more input devices 106 can be employed to interact with the one or more manufacturability reports 312 to present additional data.

As shown in FIG. 7, the one or more input devices 106 can be employed to select one or more of the manufacturability considerations. FIG. 7 depicts an exemplary embodiment in which one of the manufacturability considerations associated with a warning was selected. As such, the permissibility component 502 can generate text conveying the one or more generated warnings to the one or more entities regarding the manufacturability consideration. In various embodiments, the permissibility component 502 can alter one or more presentations of the product model within the product depiction area 602 to illustrate one or more features and/or structures references in one or more texts associated with a manufacturability consideration. For example, in FIG. 7 the permissibility component 502 highlighted one or more surfaces of the product model associated with selected manufacturability consideration and/or generated warning.

Figure 8:
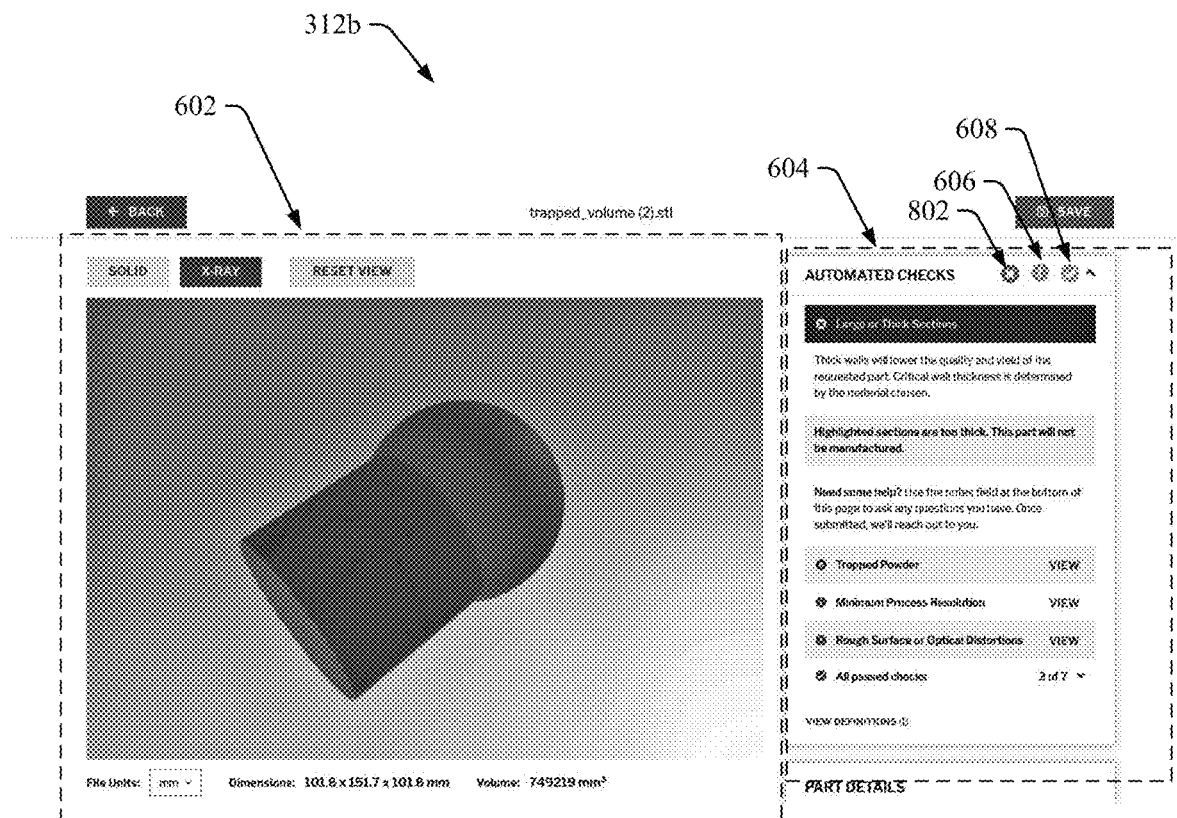

FIG. 8 illustrates another diagram of a second example, non-limiting manufacturability report 312b that can be generated by the manufacturability report component 402 based on one or more determinations by the manufacturability component 508 in accordance with one or more embodiments described herein. Repetitive description of like elements employed in other embodiments described herein is omitted for the sake of brevity. As shown in FIG. 8, the permissibility component 502 can generate one or more second types of warnings 802, which can indicate one or more manufacturing challenges that can render the manufacturing quote infeasible.

For example, the one or more first type of warnings 606 can delineate one or more warnings of manufacturing challenges that can inhibit execution of the manufacturing quote (e.g., diminish the quality of the manufactured product), but the manufacturing quote can still be executable. The one or more second type of warnings 802 can delineate one or more warnings of manufacturing challenges that can render the manufacturing quote inexecutable. For instance, the second type of warnings 802 presented in FIG. 8 delineate that the digital product design includes one or more thick sections of material, that cannot be manufactured with the selected manufacturing material and/or manufacturing technique.

Figure 9:
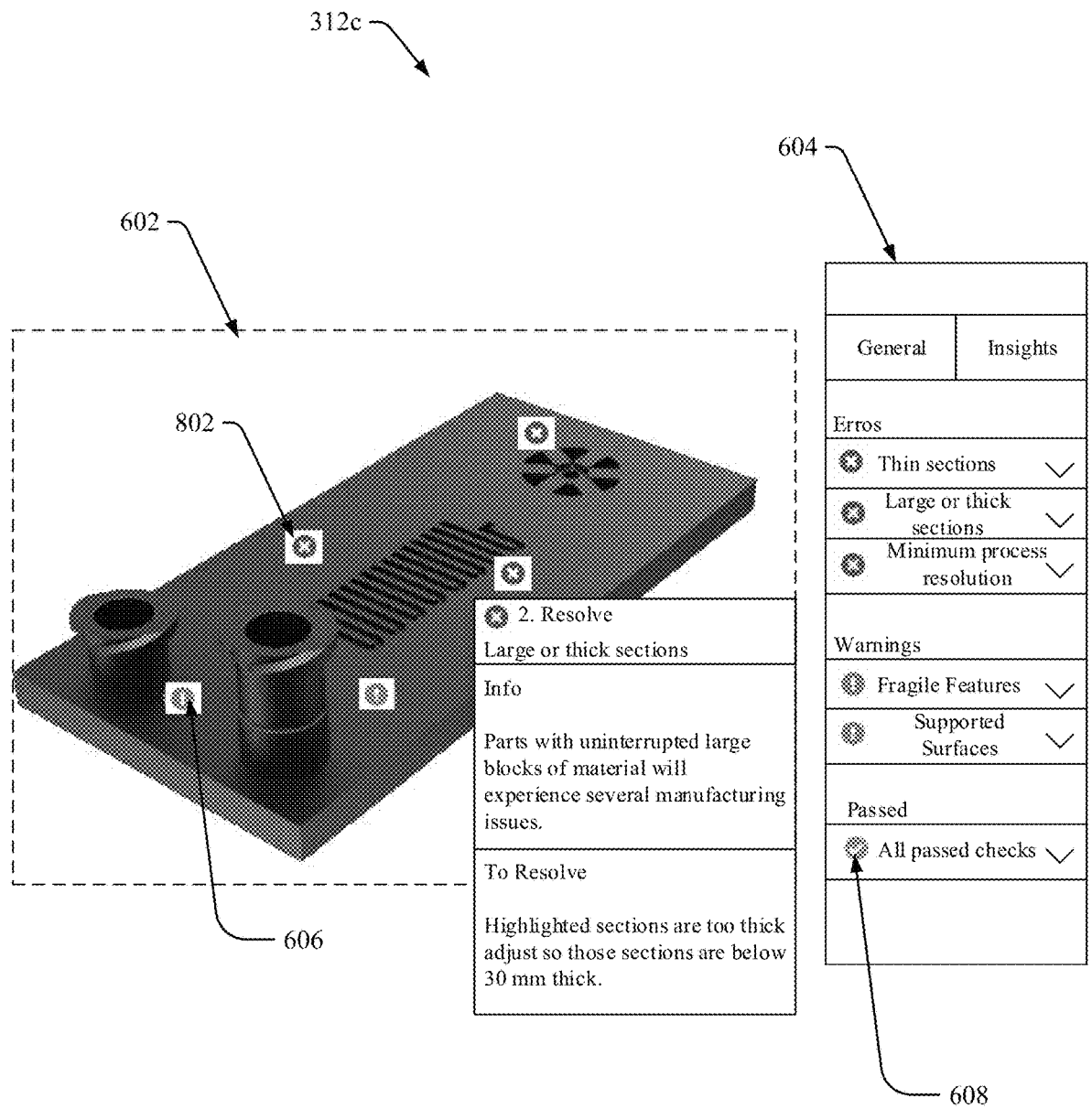

FIG. 9 illustrates a diagram of a third example, non-limiting manufacturability report 312c that can be generated by the manufacturability report component 402 based on one or more determinations by the manufacturability component 508 in accordance with one or more embodiments described herein. Repetitive description of like elements employed in other embodiments described herein is omitted for the sake of brevity. As shown in FIG. 9, the permissibility component 502 can populate the one or more warning symbols (e.g., first type of warnings 606 and/or second type of warnings 802) onto the associate locations of the product model within the product depiction area 602.

In one or more embodiments, the permissibility component 502 can present the second type of warnings 802 as "errors" to be remedied in order to effectuate the manufacturing quote. As shown in FIG. 9, the permissibility component 502 can generate one or more "Info" boxes regarding descriptions of the one or more warnings (e.g., of the "large or thick sections" warning depicted in FIG. 9). Additionally, the recommendation component 504 can present one or more recommendations generated by the manufacturability component 508 regarding the one or more warnings (e.g., describing a recommended resolution to the "large or thick sections" warning depicted in FIG. 9).

Figure 10:
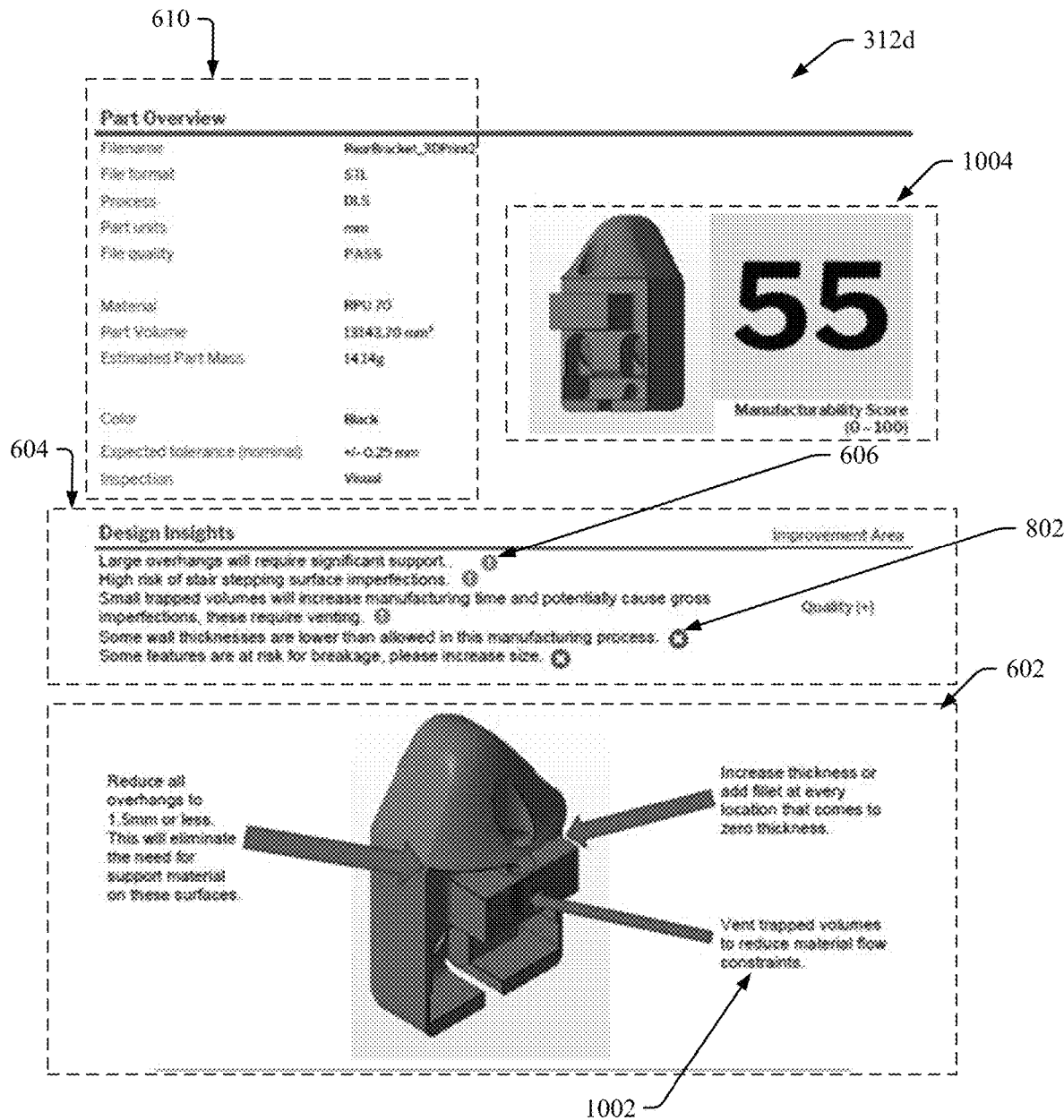

FIG. 10 illustrates a diagram of a fourth example, non-limiting manufacturability report 312d that can be generated by the manufacturability report component 402 based on one or more determinations by the manufacturability component 508 in accordance with one or more embodiments described herein. Repetitive description of like elements employed in other embodiments described herein is omitted for the sake of brevity. As shown in FIG. 10, the recommendation component 504 can populate the one or more recommendations onto the associate locations of the product model within the product depiction area 602. Additionally, the score component 506 can populate the manufacturability report 312 with one or more manufacturability scores generated by the manufacturability component 508 (e.g., such as example manufacturability score 1004 shown in FIG. 10).

Figure 11:
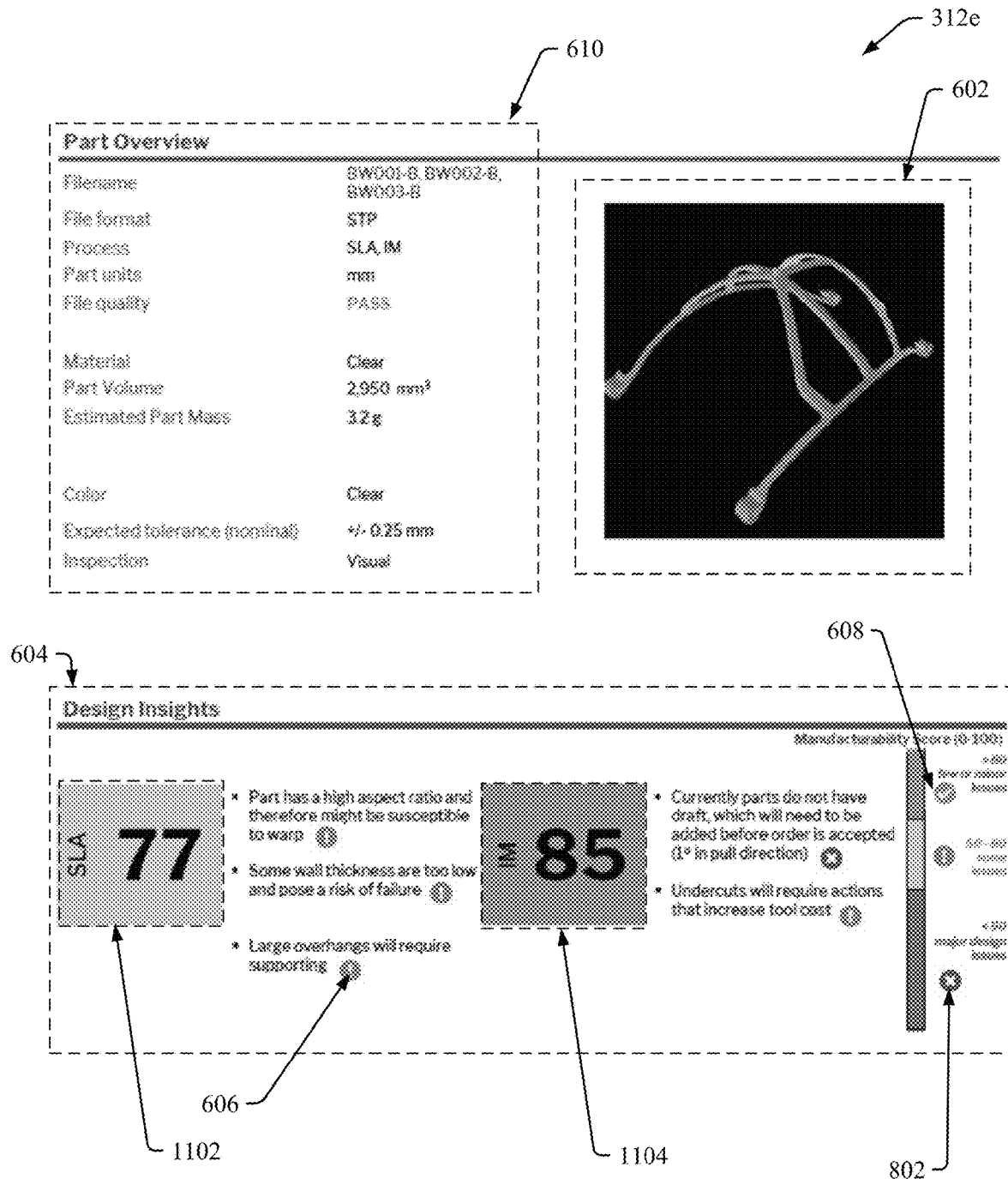

FIG. 11 illustrates a diagram of a fourth example, non-limiting manufacturability report 312e that can be generated by the manufacturability report component 402 based on one or more determinations by the manufacturability component 508 in accordance with one or more embodiments described herein. Repetitive description of like elements employed in other embodiments described herein is omitted for the sake of brevity. As shown in FIG. 11, the score component 506 can populate the manufacturability report 312 with multiple manufacturability scores. For example, the manufacturability component 508 can generate a plurality of manufacturability scores, where each manufacturability score is associated with a different set of manufacturing details in combination with the given digital product design. For instance, FIG. 11 depicts a first example manufacturability score 1102 (e.g., generated by the manufacturability component 508) in which a stereolithography ("SLA") manufacturing technique is employed and a second example manufacturability score 1104 (e.g., also generated by the manufacturability component 508) in which an injection molding ("IM") manufacturing technique is employed. As shown in FIG. 11, altering one or more manufacturing details can affect the compatibility between the digital product design and set of manufacturing details, which can be reflected in the manufacturability score.

Additionally, the score component 506 can depict a score scale (e.g., example score scale 1106 depicted in FIG. 11) in the one or more manufacturability reports 312. For example, the one or more score scales 1106 can delineate one or more thresholds of compatibility that distinguish between types of warnings generated by the manufacturability component 508. For instance, the manufacturability component 508 can determine a score in association with each manufacturing consideration. With regards to the example score scale 1106 shown in FIG. 11, where the score has a value of less than 50, the manufacturability component 508 can generate a second type of warning 802 in association with the manufacturing consideration. Where the score has a value between 50 and 80, the manufacturability component 508 can generate a first type of warning 606 in association with the manufacturing consideration. Where the score has a value greater than 80, the manufacturing component 508 can refrain from generating a warning in association with the manufacturing consideration. In various embodiments, the thresholds of compatibility (e.g., values of 50 and 80 in the example score scale 1106) can vary based on the digital product design, the intended application of the product, and/or one or more manufacturing details (e.g., such as defined tolerances).

Figure 12:
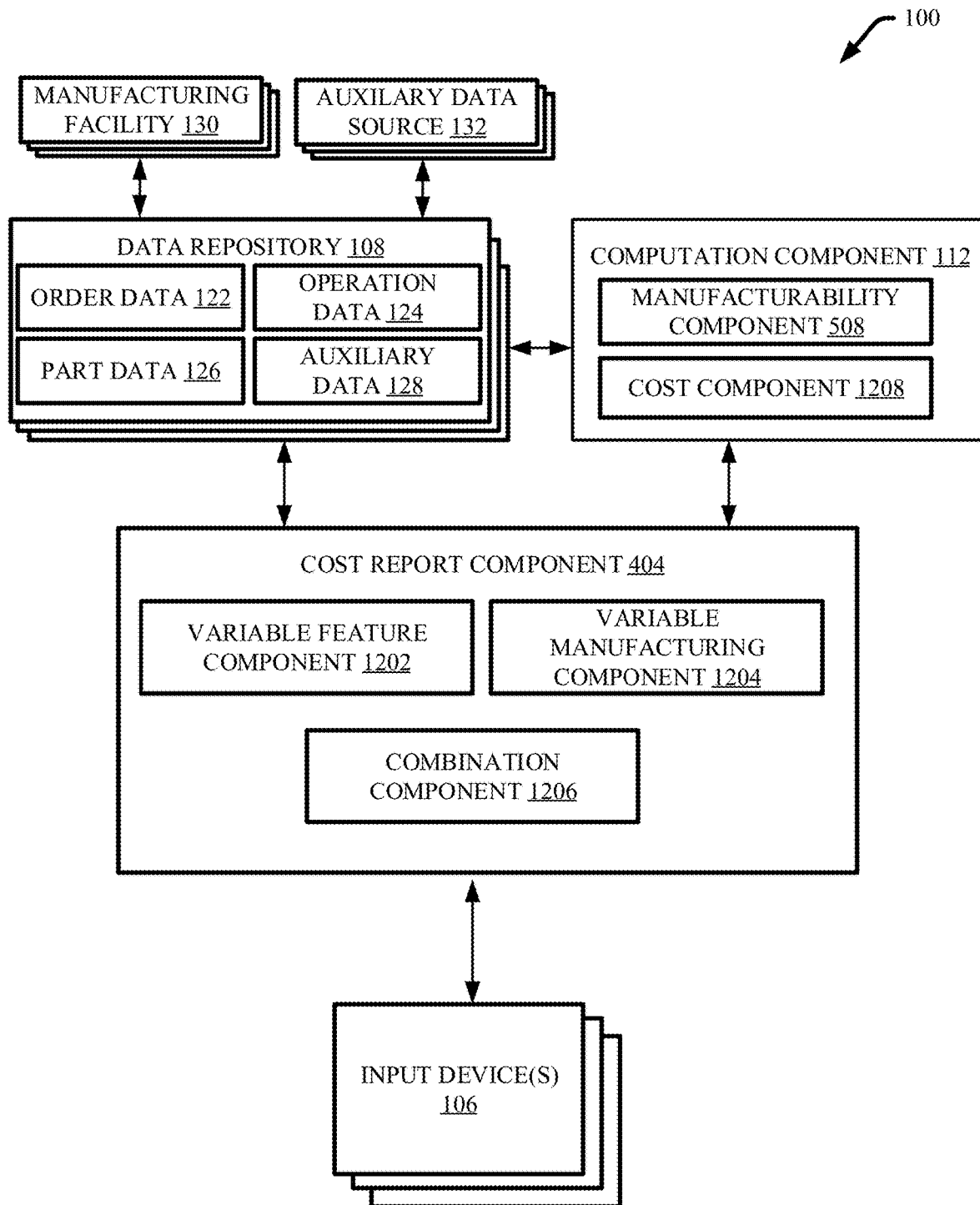
FIG. 12 illustrates a diagram of an example, non-limiting system that can generate and/or display one or more cost determinations regarding one or more manufacturing quotes in accordance with one or more embodiments described herein.

FIG. 12 illustrates a diagram of the cost report component 404 comprising variable feature component 1202, variable manufacturing component 1204, and/or combination component 1206 in accordance with one or more embodiments described herein. Additionally, the computation component 112 can comprise cost component 1208. Repetitive description of like elements employed in other embodiments described herein is omitted for the sake of brevity.

The cost to execute a manufacturing quote (e.g., cost to manufacture a digital product design in combination with one or more defined manufacturing details) can depend on, for example, the product features, the manufacturing details, the number of products being made, a combination thereof, and/or the like. As used herein, "cost curve" can refer to one or more relationships between changes in product design, manufacturing details, and/or product quantity and cost of the manufacturing quote. For instance, in one or more exemplary cost curves, the unit price can decrease as the volume increases. However, the specific relationship between unit price and volume can be unique for each respective product design and/or manufacturing details (e.g., such as manufacturing material, manufacturing process, location of manufacture, combination thereof, and/or the like). In various embodiments, the cost component 1208 can calculate one or more costs associate with executing a manufacturing quote, such as cost curves, with regards to variations in product features, manufacturing details, and/or product quantity.

For example, the cost component 1208 can generate one or more cost curves as a function that can report the price to execute the manufacturing quote at a specific product quantity and/or for multiple product quantities. In various embodiments, the one or more input devices 106 can be employed to define a target product quantity, thereby the cost component 1208 can generate a cost curve that encompasses the target product quantity. The cost characterized by the cost curve can include the cost to execute the manufacturing quote in addition to a defined margin, which can be a fixed percentage of the cost or another defined threshold. In one or more embodiments, the one or more input devices 106 can be employed to define a target cost per unit, thereby the cost component 1208 can generate a cost curve for executing the manufacturing quote and identify a product quantity on the cost curve that can achieve, or nearly achieve, the target cost per unit. Additionally, in one or more embodiments the cost component 1208 can determine a price for executing the manufacturing quote, where the price can be the cost plus the margin minus any applicable discounts.

In various embodiments, cost inputs considered by the cost component 1208 can include, but are not limited to: engineering costs, management and/or administrative costs, equipment costs, labor costs, material costs, transportation costs, storage costs, warehousing costs, energy costs, overhead costs, manufacturing facilities 130 costs, maintenance costs, a combination thereof, and/or the like. In one or more embodiments, one or more of the cost inputs can vary as the product quantity, product features, and/or manufacturing details vary, where the cost component 1208 can determine and/or track said variations of the cost inputs.

In one or more embodiments, the cost component 1208 can determine one or more cost input values based on historical cost data associated with products previously manufactured. For example, the cost component 1208 can analyze order data 126 and/or part 126 associated with previously manufactured products to identify cost inputs and/or trends in the variation of cost inputs. In one or more embodiments, the one or more data repositories 108 can store input costs incurred during the manufacturing of one or more previously manufactured products. For instance, cost component 1208 can identify one or more previously manufactured products with similar product design and/or manufacturing details to provide a basis for the value of one or more cost inputs. For example, the cost component 1208 can analyze historical data in the one or more data repositories 108 to determine a relationship between manufacturing material, manufacturing technique, and product quantity. A similarity score can be calculated by analyzing one or more cost inputs from previously manufactured products and comparing it to another product. If there are several cost inputs, these inputs can be averaged, summed, and/or weighted to calculate a similarity score.

In one or more embodiments, the cost component 1208 can determine the one or more cost input values based further on auxiliary data 128 associated with one or more manufacturing details of the given manufacturability quote. For example, the auxiliary data 128 can include the availability of one or more shipping carriers with regards to the defined shipping route (e.g., from the one or more manufacturing facilities 130 producing the product to the product's destination). In another example, the auxiliary data 128 can include market reports (e.g., international and/or regional) regarding the availability and/or cost of materials, labor, and/or energy. For instance, where the manufacturing process requires a particular material (e.g., water), the cost component 1208 can analyze the auxiliary data 128 for indications regarding whether the manufacturing facility 130 executing the manufacturing quote is located in a region experiencing a supply shortage of the material (e.g., a drought, a general strike, labor shortages, transportation delays, and/or transportation interruptions). Where the cost component 1208 detects one or more indication in the auxiliary data of a material, labor, and/or energy shortage, the cost component 1208 can add a defined amount and/or percentage to the cost determination. In another instance, the cost component 1208 can analyze the auxiliary data 128 for indications of political strife in a region of the manufacturing facility 130.

In various embodiments, the cost component 1208 can identify one or more product feature variations, manufacturing detail variations, and/or product quantity variations that optimize for cost, manufacturing speed, and/or a combination thereof. The cost component 1208 can define the cost of the part as a function of the order quantity by considering, for instance, the batch size, cycle time, cost of machine time, consumables, and/or assumed yield loss. For example, for a given manufacturing quote, the cost component 1208 can generate a recommend an optimal product quantity, and provide an associate cost, based on: a prioritization of the shortest delivery time, a prioritization of the lowest cost, and/or an entity defined balance between cost and delivery time (e.g., as defined via one or more input devices 106).

In one or more embodiments, the cost component 1208 can analyze a given manufacturing quote and determine a number of operations and/or order of operations employed to fabricate the given digital product design in conjunction with the given manufacturing details. Additionally, the cost component 1208 can determine the orientation for each operation to be performed during manufacturing the product by testing the manufacturability of different orientations and selecting a preferred orientation, which may be the orientation that provides the lowest cost and/or highest manufacturability. In one or more embodiments, the cost component 1208 can further determine a batch size for the manufacturing quote, where the batch size can be the smallest product quantity that can be made at one time. For example, manufacturing quote can be organized into single batches or multiple batches. The cost analysis performed by the cost component 1208 can thereby proceed with an integer number of batches, where the number of batches is at least one. The cost component 1208 can thus determine the cost based on product quantities, where the product quantities can be defined by one or more entities via the one or more input devices 106, can be a single batch, and/or can be a predefined quantity (e.g., such as 1, 10, 100, and/or the like).

In one or more embodiments, the cost component 1208 can calculate the total volume of material to be consumed during the manufacturing of a batch as the total material in the batch plus an expected amount of waste material. For example, the amount of waste material can be calculated from one or more known ratios of waste material for a given material and/or manufacturing technique (e.g., based on one or more order data 126 and/or part data 126 included in the one or more data repositories 108). Additionally, the cost component 1208 can calculate the manufacturing time associated in executing the manufacturing quote at various product quantities as a function of material volume, number of operations, time for each operation, product orientation for each operation, product bounding box size, and/or type of material. Further, the cost component 1208 can calculate time and/or labor costs required for manual changeovers of manufacturing equipment, finishing, and/or inspection processes (e.g., based on costs previously incurred in manufacturing products with similar design, features, manufacturing details, manufacturing equipment requirements, finishing details, and/or inspection requirements). In various embodiments, the costs can be known from previous orders that have similar or identical designs, processes, materials, or locations of manufacture. For example, these costs can also be calculated from commercially available software tools that can estimate manufacturing costs. Further, the costs can also be estimated from experience and expert input.

Moreover, the cost component 1208 can calculate the amount of energy to be consumed during the manufacturing process and the cost of the consumed energy. For example, the energy cost can depend on at least the number of operations performed during the manufacturing technique, the type of manufacturing techniques employed (e.g., and thereby the type of manufacturing equipment employed), and/or the location of the manufacturing facility 130 executing the manufacturing quote. For instance, energy costs associated with the geographical region of the manufacturing facility 130 can be included in the auxiliary data 128 of the one or more data repositories 108. Likewise, the types of manufacturing machines employed in each manufacturing process, and the energy consumption of each machine can be included in the operation data 124 of the one or more data repositories 108.

In one or more embodiments, the cost component 1208 can determine the cost of executing the manufacturing quote by adding the total input costs at a given product quantity and multiplying by the total product quantity in accordance with Equation 1 below.

$$\text{cost} = \text{quantity} * \begin{pmatrix} \text{material cost} + \text{machine cost} + \text{waste material cost} + \\ \text{energy cost} + \text{labor cost} \end{pmatrix} + \text{overhead cost} + \text{shipping cost} \quad (1)$$

In various embodiments, the variable feature component 1202 can populate the cost report 314 with one or more cost displays characterizing cost curves that can depict variations in cost as a function of variations in one or more product features. The variable feature component 1202 can generate one or more cost displays that characterize the one or more cost curves as graphs, text, charts, tables, diagrams, bar charts, line graphs, pie charts, a combination thereof, and/or the like. In one or more embodiments, the one or more cost displays generated by the variable feature component 1202 can be interactive (e.g., manipulated) via the one or more input devices 106. For example, the cost component 1208 can determine a relationship between one or more product features included in the digital product design and the cost of the manufacturing quote, and the variable feature component 1202 can present the relationship in the cost report 314. For instance, removing one or more features can alter the material cost, number of manufacturing operations, required manufacturing equipment, energy and/or labor requirements, a combination thereof, and/or the like; thereby altering the total cost of the manufacturing cost. By enabling an entity to analyze the product design as a function of total cost, the entity can finalize a product design that optimizes the intended function in view of one or more cost considerations.

In various embodiments, the variable manufacturing component 1204 can populate the cost report 314 with one or more cost displays characterizing cost curves that can depict variations in cost as a function of variations in one or more manufacturing details. The variable manufacturing component 1204 can generate the one or more cost displays that characterize the one or more cost curves as graphs, text, charts, tables, diagrams, bar charts, line graphs, pie charts, a combination thereof, and/or the like. In one or more embodiments, the one or more cost displays generated by the variable manufacturing component 1204 can be interactive (e.g., manipulated) via the one or more input devices 106. For example, the cost component 1208 can determine a relationship between one or more manufacturing details included in the manufacturing quote and the cost of the manufacturing quote, and the variable manufacturing component 1204 can present the relationship in the cost report 314. For instance, altering one or more manufacturing details can alter the material cost, number of manufacturing operations, required manufacturing equipment, energy and/or labor requirements, shipping costs, a combination thereof, and/or the like; thereby altering the total cost of the manufacturing cost. By enabling an entity to analyze the manufacturing details as a function of total cost, the entity can finalize details of the manufacturing quote that achieve a desirable product in view of one or more cost considerations.

In various embodiments, the combination component 1206 can populate the cost report 314 with one or more cost displays that characterize a combination of cost curves. The combination component 1206 can generate the one or more cost displays that characterize multiple cost curves (e.g., overlayed upon each other) as graphs, text, charts, tables, diagrams, bar charts, line graphs, pie charts, a combination thereof, and/or the like. In one or more embodiments, the one or more cost displays generated by the combination component 1206 can be interactive (e.g., manipulated) via the one or more input devices 106. For example, the cost component 1208 can determine relationships between product quantity, product features, and/or manufacturing details included in the manufacturing quote and the cost of the manufacturing quote, and the combination component 1206 can generate one or more cost displays that combine the defined relationships. By enabling an entity to analyze combinations of manufacturing quote variables as a function of total cost, the entity can finalize details of the manufacturing quote that achieve a desirable product in view of one or more cost considerations.

FIG. 13 illustrates a diagram of a first example, non-limiting cost report 314a that can be generated by the cost report component 404 based on one or more determinations by the cost component 1208 in accordance with one or more embodiments described herein. Repetitive description of like elements employed in other embodiments described herein is omitted for the sake of brevity. As shown in FIG. 13, the first example cost report 314a can include a first example cost display 1301 that can characterize a cost curve of a given manufacturing quote (e.g., price per product) as a function of product quantity.

For example, the cost component 1208 can analyze the price per product of a manufacturing quote at various product quantities (e.g., ranging from 1 to 1,000) to generate a cost curve. Further the cost report component 404 can present the cost curve generated by the cost component 1208 in the first example cost report 314a as the first cost display 1301 (e.g., in a bar graph format). Further, the cost component 1208 can analyze the cost curve to identify an optimal product quantity for the manufacturing quote, where the optimal product quantity can be the minimum product quantity that can be utilized to achieve the lowest price per product. For instance, in the first example cost report 314a, the price per product remains constant once the manufacturing quote includes a product quantity of 25 (e.g., further increasing the product quantity does not further lower the price per product). Thereby, the cost component 1208 can identify the optimal product quantity for the first example cost report 314*a* as 25. The cost report component 404 can further populate the first example cost report 314*a* with one or more recommendation sections 1302 that describe one or more determinations of the cost report 1208, such as the identified optimal product quantity.

In addition, the cost component 1208 can analyze a cost curve to identify one or more cost inputs that contribute the greatest cost to the manufacturing quote and generate one or more recommendations regarding how to reduce the identified cost inputs. This can be accomplished by identifying weighted components of the overall part cost at a given order volume. These components can be classified by fixed and variable costs, machine time, material, labor requirements, set-up requirements. Further, the cost report component 404 can populate the one or more cost reports 314 with the one or more identified cost inputs and/or cost reduction recommendations (e.g., as shown in the first example cost report 314*a*).

FIG. 14 illustrates a diagram of a second example, non-limiting cost report 314*b* that can be generated by the cost report component 404 based on one or more determinations by the cost component 1208 in accordance with one or more embodiments described herein. Repetitive description of like elements employed in other embodiments described herein is omitted for the sake of brevity. As shown in FIG. 14, the second example cost report 314*b* can include a second example cost display 1402 that can characterize a cost curve of a given manufacturing quote (e.g., price per product) as a function of product quantity, and a third example cost display 1404 that can characterize a cost curve of the given manufacturing quote (e.g., material cost) as a function of one or more manufacturing details (e.g., manufacturing material selection).

As shown in FIG. 14, the second example cost display 1402 (e.g., generated by cost component 1208 and depicted in the second example cost report 314*b* by cost report component 404) can be a function of product price versus product quantity, and the largest input costs associated with the second example cost display 1402 can be presented by the cost report component 404 as a pie chart to delineate the input costs' respective contributions to the cost determination. Additionally, the third example cost display 1404 (e.g., generated by cost component 1208 and depicted in the second example cost report 314*b* by at least variable manufacturing component 1204) can be a function of manufacturing material cost versus manufacturing material type. In the second example cost curve 1404, CE 261, EPX 82, RPU 70, DPR 10, UMA 90, EPU 40, EPU 41, and/or SIL 30 can be respective material options.

As described herein, the cost component 1208 can generate one or more cost curves regarding one or more alterations to the manufacturing details of the manufacturing quote. For instance, the third example cost display 1304 can characterize how alternate material selections can impact the cost of the manufacturing quote. In one or more embodiments, the variable manufacturing component 1204 can generate the third example cost display 1304. Further, the variable manufacturing component 1204 can populate generated cost displays (e.g., third example cost display 1304) with information regarding the one or more manufacturing details being altered, where the information can be sourced from the one or more data repositories 108 (e.g., the operation data 124 and/or auxiliary data 128). For instance, the third example cost display 1404 is populated with information describing one or more properties of the various material alternatives (e.g., material strength is conveyed though the size of bubbles representing the respective material alternatives).

FIG. 15 illustrates a diagram of a third example, non-limiting cost report 314*c* that can be generated by the cost report component 404 based on one or more determinations by the cost component 1208 in accordance with one or more embodiments described herein. Repetitive description of like elements employed in other embodiments described herein is omitted for the sake of brevity. As shown in FIG. 15, the third example cost report 314*c* can include a fourth example cost display 1502 that can characterize a cost curve of a given manufacturing quote as a function of product quantity and manufacturing process, and a fifth example cost display 1504 that can characterize various manufacturing detail alternatives.

As shown in FIG. 15, the third example cost report 314*b* can include a cost display that characterizes the combined effect that multiple manufacturing quote variables can have on the cost. For instance, the fourth example cost display 1502 characterizes a first cost curve (e.g., generated by the cost component 1208) in which the cost is a function of product quantity for an injection mold ("IM") manufacturing technique, and a second cost curve (e.g., generated by the cost component 1208) in which the cost is a function of product quantity for a stereolithography ("SLA") manufacturing technique. As shown in the fourth example cost display 1502, the cost associated with the SLA manufacturing technique can remain unaffected by the product quantity, while the cost associated with the IM manufacturing technique can decrease as the product quantity increases. Where the manufacturing quote includes a product quantity of 200 or less, the SLA manufacturing technique can be cheaper. Where the manufacturing quote includes a product quantity of 300 or more, the IM manufacturing technique can be cheaper.

Additionally, the fifth example cost display 1504 can depict various material selections that can alter the manufacturing details of the manufacturing quote. Further, the fifth example cost display 1504 can depict the various material selections as a function of one or more properties (e.g., strength versus stiffness). As shown in FIG. 15, the selected material by the user is compared against alternative material selection options that are available on the selected manufacturing process, or similar materials available through alternative manufacturing methods.

In various embodiments, multiple cost displays generated by the cost report component 404 can be interactive (e.g., via the one or more input devices 106), where interaction with one cost display can affect another cost display. For example, selection of a material in the fifth example cost display 1504 can alter one or more of the cost curves characterized in the fourth example cost display 1502. For instance, the cost curves characterized by the fourth example cost display 1502 can regard selection of Clear material for the SLA manufacturing technique and PP material for the IM manufacturing technique, as shown in FIG. 15. However, selection of alternate materials in the fifth example cost display 1504 can alter one or more of the cost curves characterized in the fourth example cost display 1504. For instance, upon selecting an alternate manufacturing material, the cost component 1208 can update the one or more cost curves characterized in the fourth example cost display 1502 to reflect the effect of changes to the manufacturing details (e.g., changes to the material cost, shipping cost, and/or machine cost).

Figure 16:
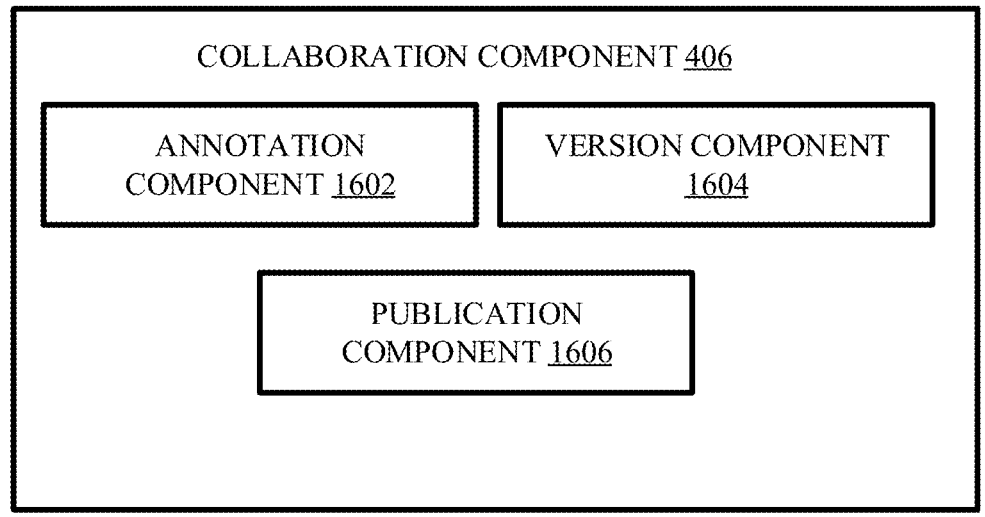
FIG. 16 illustrates a diagram of an example, non-limiting collaboration component that can facilitate collaborative development of one or more manufacturing quotes by a group of entities in accordance with one or more embodiments described herein.

FIG. 16 illustrates a diagram of the example, non-limiting collaboration component 406 further comprising annotation component 1602, version component 1604, and/or publication component 1606 in accordance with one or more embodiments described herein. Repetitive description of like elements employed in other embodiments described herein is omitted for the sake of brevity. In various embodiments, multiple entities can collaborate with each other to develop one or more manufacturing quotes, where the collaboration component 406 can facilitate: communications between the entities, community alterations to the manufacturing quote (e.g., changes to the digital product design and/or manufacturing details), a tracking of past versions of the manufacturing quote (e.g., past versions of the one or more digital product designs), a combination thereof, and/or the like.

In one or more embodiments, the collaboration component 406 can enable entities employing the system 100 to form one or more collaboration groups for information and/or data exchange. The one or more collaboration groups can include, for example: another entity, multiple other entities, an artificial intelligence algorithm, a combination thereof, and/or the like. Entities comprised within the same collaboration group can exchange messages and/or share files. Further, the messages, information, and/or files shared in the collaboration group can be stored (e.g., in the one or more data repositories 108), and the history of this information exchange can be retrieved and viewed later. Where an entity has registered an account in the system 100 via the user interface 110, the account can be enlisted into one or more collaboration groups associated with the entity.

For example, the collaboration component 406 can share digital product designs and/or manufacturing details with entities of the collaboration group. For instance, one or more entities of the collaboration group can receive feedback from group members via the collaboration component 406, and then the entity can modify the digital product design and/or manufacturing details based on this feedback. Often this is can be an interactive process where multiple changes are made. Further, an entity can employ the collaboration component to create different versions of a manufacturing quote where each version has a different digital product design and/or manufacturing details, and members of the collaboration group can provide feedback on the different scenarios before one version is selected.

In another example, an entity in a collaboration group can select one or more previously uploaded digital product designs and/or previously initialized manufacturing quote (e.g., via the order history section 302 and/or part history 310 section), and the collaboration component 406 can share the selected product designs and/or previously initialized manufacturing quote with other entities of the collaboration group. For instance, a first entity of a collaboration group can be seeking advice on how to articulate manufacturing details for a particular order. A second entity of the collaboration group has previously done similar work and can share files and information from the previous order with the first entity via the collaboration component 406. The first entity can receive the information from the second entity via the collaboration component 406 to copy and/or adopt at least a portion of the information to initialize and/or complete the manufacturing details for a manufacturing quote.

In various embodiments, the collaboration component 406 can further generate one or more collaboration displays and/or modify one or more manufacturing reports to present digital product designs and/or information shared in the collaboration team in the form of a 2D model, 3D model, plot, or information overlaid onto a 2D or 3D model. Additionally, the one or more collaboration displays can be interactive via the one or more input devices 106. For example, a first entity in the given collaboration group can employ the collaboration component 406 to generate one or more indicators (e.g., pins) overlaid on one or more designated locations of a product model (e.g., defined by one or more digital product designs). Other entities of the collaboration group can employ the collaboration component 406 to view the collaboration display, and thereby view the product model populated with the generated indicators. As such, the first entity can employ the collaboration component 406 to modify the collaboration display and visually delineate one or more product features of interest. Further, the first entity can employ the collaboration component 406 to generate one or more messages in association with the one or more indicators. The other entities of the collaboration group can employ the collaboration component 406 to view the associate message and/or generate a reply. Thereby, the collaboration component 406 can share messages between the collaboration group members, where the messages can regard one or more identified product features represented on a product model of the digital product design.

In another example, one or more entities of a collaboration group can employ the collaboration component 406 to modify the presentation of a product model (e.g., defined by a digital product design) within one or more collaboration displays accessible to the collaboration group members. For instance, an entity of the collaboration group can employ the collaboration component 406 (e.g., via the one or more input devices 106) to rotate the product model in one or more directions. As the entity rotates the product model in the collaboration display, other collaboration group entities accessing the collaboration display can likewise view the product model rotation. In another instance, an entity of the collaboration group can employ the collaboration component 406 (e.g., via the one or more input devices 106) to render one or more product features of the product model invisible within the collaboration display. As the entity renders the one or more product features invisible in the collaboration display, other collaboration group entities accessing the collaboration display can likewise lose presentation of the product features rendered invisible.

In one or more embodiments, one or more entities can employ the collaboration component 406 to search for other entities (e.g., other registered accounts) with similar profiles. For example, the collaboration component 406 can search for accounts registered in the system 100 that have initialized manufacturing quotes that include: one or more specified manufacturing materials, digital product designs with one or more specified product features, number of orders, a specified product quantity (e.g., a product quantity greater than equal to a defined threshold), a specified geography, the user's organization, one or more target tolerance values, information imported from another software tool and/or from the internet, a combination thereof, and/or the like. In one or more embodiments, the collaboration component 406 can grant a first entity of a collaboration group permission to access the order history 310 of one or more second entities of the collaboration group.

In one or more embodiments, the collaboration component 406 can designate the entity that initiates a collaboration group as the group leader associated with the collaboration group. The group leader can employ the collaboration component 406 to generate and/or send invitations to one or more other entities employing the system 100 to join the collaboration group. Entities can employ the collaboration component 406 to initially generate collaboration groups and/or accept collaboration group invitations to join one or more collaboration groups. Additionally, members of a collaboration group can employ the collaboration component 406 to leave one or more collaboration groups. In various embodiments, the collaboration component 406 can re-designate the group leader to another member of the collaboration group at the majority request of the collaboration group members and/or in response to the group leader leaving the collaboration group. Further, the collaboration component 406 (e.g., via instruction from the one or more of the collaboration group members) can set permissions governing how and/or what type of information can be shared between members of the collaboration group. For example, the collaboration component 406 can designate whether or not collaboration group members can share, for instance: digital product designs, previous manufacturing orders, saved projects, currently developing products, a combination thereof, and/or the like. In various embodiments, the collaboration component 406 can render one or more collaboration displays generated in association with one collaboration group private from other collaboration groups. For example, one or more collaboration group members can employ the collaboration component 406 to generate one or more collaboration displays. The collaboration component 406 can grant access to the one or more collaboration displays to the members of the collaboration group. Further, the collaboration component 406 can deny access to the one or more collaboration display to entities not associated with the collaboration group.

In one or more embodiments, the annotation component 1602 can populate one or more collaboration displays generated by the collaboration component 406 with annotations made by one or more members of the given collaboration group. For example, the one or more annotations can be populated into the one or more collaboration displays as text, images, video, audio, a combination thereof, and/or the like. In one or more embodiments, the annotation component 1602 can further position the one or more annotations in one or more locations of the collaboration display designated by the collaboration group member associated with the annotation. In various embodiments, the collaboration group member associated with the annotation can employ the annotation component 1602 to set one or more viewing permissions regarding the annotation. For example, the annotation component 1602 can render the annotation visible to one or more first entities viewing the collaboration display and invisible to one or more second entities viewing the collaboration display. Further, one or more collaboration group members can employ the annotation component 1602 to delete one or more annotations from the collaboration display.

As the collaboration group members employ the collaboration component 406, interact with the one or more collaboration displays, and/or interact with each other; multiple versions of the collaboration displays, product models, digital product designs, manufacturing details, and/or manufacturing quotes can be generated by the various features and/or components of the system 100. In various embodiments, the version component 1604 can store the various versions for review, retrieval, and/or tracking (e.g., by tracking component 406).

For example, one or more members of the collaboration group can generate one or more alternate digital product designs based on one or more manufacturability warnings generated by the manufacturability component 508 and/or communications (e.g., messages, discussions, annotations) shared between collaboration group members via the collaboration component 406. Where the alternate digital product design is uploaded to the initialized manufacturing quote of the collaboration group, the version component 1604 can identify the alternate digital product design as a new version of the digital product design associated with the manufacturing quote. Thus, alterations to the design of the product can result in multiple versions of the digital product design associated with the manufacturing quote. The version component 1604 can assign one or more version identifiers (e.g., version numbers and/or titles) to each version of the digital product design and store the various versions of the digital product design in the one or more data repositories 108 (e.g., as order data 126) for subsequent retrieval and/or review by one or more of the collaboration group members. Additionally, the version component 1604 can store the one or more manufacturing details, manufacturability warnings, and/or manufacturing recommendations generated in association with the respective version of the digital product design. Further, the version component 1604 can populate a product depiction area 602 of the one or more collaboration displays with the latest version of the product model, as defined by the latest version of the digital product design. Thereby, the members of the collaboration group can view the latest version of the digital product design at any given moment during the manufacturing quote initialization process.

In another example, one or more members of the collaboration group can alter one or more manufacturing details based on one or more manufacturing recommendations generated by the manufacturability component 508 and/or communications (e.g., messages, discussions, annotations) shared between collaboration group members via the collaboration component 406. Where alternate manufacturing details are selected to initialize the manufacturing quote of the collaboration group, the version component 1604 can identify the altered set of manufacturing details as a new version of the set of manufacturing details associated with the manufacturing quote. Thus, alterations to the manufacturing details can result in multiple versions of the set of manufacturing details associated with the manufacturing quote. The version component 1604 can assign one or more version identifiers (e.g., version numbers and/or titles) to each version of the set of manufacturing details and store the various versions of the set of manufacturing details in the one or more data repositories 108 (e.g., as order data 126) for subsequent retrieval and/or review by one or more of the collaboration group members. Further, the version component 1604 can populate the collaboration display with the latest set of manufacturing details and/or update a manufacturability check region 604 with one or more manufacturability warnings and/or recommendations generated by the manufacturability component 508 with regards to the latest set of manufacturing details. Thereby, the members of the collaboration group can view the latest version of the set of manufacturing details at any given moment during the manufacturing quote initialization process.

In various embodiments, the publication component 1606 can publish one or more digital product designs, manufacturing details, and/or initialized manufacturing quotes to an electronic platform. For example, the electronic platform can be a public platform accessible to one or more entities employing the system 100 via the one or more networks 104 and/or input devices 106. In a further example, the electronic platform can be an electronic marketplace, where the one or more digital product designs and/or manufacturing details can be published (e.g., via the publication component 1606) by one or more first entities employing the system 100 to one or more second entities employing the system 100. In a further example, the electronic platform can be owned, maintained, and/or operated by one or more entities associated with the collaboration group that managed development of the digital product design and/or manufacturing details. For instance, the collaboration group can comprise a plurality of employees of a shared employer, and the publication component 1606 can publish one or more digital product designs and/or manufacturing details to an electronic platform (e.g., a website, network, and/or database) owned, maintained, and/or operated by the employer.

In one or more embodiments, the publication component 1606 can set permissions regarding portions of a manufacturing quote available for publication. For instance, one or more entities associated with a manufacturing quote can employ the publication component 1606 to publish a defined portion of the manufacturing quote (e.g., publish the digital product design, the manufacturing details, the manufacturability report 312, the cost report 314, and/or a combination thereof). In one or more embodiments, digital product designs and/or manufacturing details developed during initialization of the manufacturing quote can be shared with, or offered for sale to, one or more third party entities (e.g., an entity not associated with the development of the given digital product design, manufacturing details, and/or manufacturing quote).

Although FIG. 16 depicts the publication component comprised within the collaboration component 406, the architecture of the system 100 is not so limited. For example, the publication component 1606 can be generally comprised within the user interface component 110. For instance, one or more single entities employing the system 100 can utilize the publication component 1606 and/or one or more collaboration groups employing the system 100 can utilize the publication component 1606.

FIG. 17 illustrates a diagram, of an example, non-limiting collaboration display 1700 that can be generated by the collaboration component 406 in accordance with one or more embodiments described herein. Repetitive description of like elements employed in other embodiments described herein is omitted for the sake of brevity. In various embodiments, the one or more collaboration displays generated by the collaboration component 406 can be one or more manufacturing reports 312 and/or cost reports 314 supplemented with one or more features of the collaboration component 406 (e.g., features such as multi-entity accessibility via the collaboration group, collaborative modification and/or manipulation amongst the collaboration group, collaborative annotations and/or file sharing, a combination thereof, and/or the like). For example, a collaboration display generated by the collaboration component 406 can be a previously generated manufacturing report 312 rendered accessible to the members of a collaboration group, where the manufacturing report 312 can be further augmented by one or more members of the collaboration group in a community effort via the collaboration component 406. In another example, a collaboration display generated by the collaboration component 406 can regard a new manufacturing quote initialized by one or more members of the collaboration group, where the collaboration component 406 can generate the collaboration display by aggregating outputs from the manufacturability report component 402, cost report component 404, manufacturing component 508, and/or cost component 1208 regarding the new manufacturing quote. Thus, the one or more collaboration displays generated by the collaboration component 406 can include the various features of the manufacturability report component 402, cost report component 404, manufacturing component 508, and/or cost component 1208 described herein.

For example, one or more entities of the collaboration group can enter and/or modify one or more manufacturing details relating to a product featured by the collaboration display via an input section (e.g., exemplified by input section 610) of the collaboration display. Additionally, the collaboration display can include a product depiction area (e.g., exemplified by product depiction area 602) that can feature a product model defined by one or more digital product designs provided by one or more members of the collaboration group. In addition, the one or more collaboration displays can include one or more manufacturability check regions (e.g., exemplified by manufacturability check region 604).

As shown in FIG. 17, the example collaboration display 1700 can be accessible by a collaboration group comprising three entities (e.g., represented in the example collaboration display 1700 via respective icons): a first entity 1702, a second entity 1704, and/or a third entity 1706. The collaboration component 406 can represent the members of the collaboration group (e.g., the first entity 1702, second entity 1704, and/or third entity 1706) via respective icons and/or labels (e.g., the first entity 1702 can be represented by label "Entity 1", the second entity 1704 can be represented by label "Entity 2", and/or the third entity 1706 can be represented by label "Entity 3").

In various embodiments, the collaboration component 406 can generate one or more message display sections 1708 in the collaboration display (e.g., as shown in the example collaboration display 1700). The message display section 1708 can be populated by the annotation component 1602 with one or more annotations and/or messages generated (e.g., via the one or more input devices 106) by respective members of the collaboration group. As shown in FIG. 17, the message display section 1708 can further filter the one or more annotations and/or messages (e.g., the message display section 1708 can include all annotations and/or messages of the collaboration group or annotations and/or messages associated with a particular entity of the collaboration group). FIG. 17 depicts a plurality of example annotations 1710 regarding a product characterized by the product model (e.g., as defined by one or more digital product designs) shown in the product depiction area 602. As shown in FIG. 17, the example annotations 1710 can be included in the message display section 1708 and/or on designated locations of the product model. For example, the example annotations 1710 can each include the identity of the entity associated with the given annotation, a time stamp 1712 indicating the date and/or time the example annotation 1710 was created, and/or a message 1714. Also shown in FIG. 17, the one or more entities can direct the one or more example messages 1714 to one or more other entities of the collaboration group (e.g., by employing the label of the specified entity with the "@" symbol).

The example collaboration display 1700 further exemplified that the annotation component 1602 can populate the one or more collaboration displays with one or more annotation indicators (e.g., example annotation indicators 1716). Further, the annotation component 1602 can position the one or more annotation indicators (e.g., example annotation indicators 1716) on one or more targeted locations of the product model (e.g., as show in FIG. 17). For example, the one or more annotation indicators can correlate one or more annotations to a targeted product feature depicted by the product model. For instance, the example collaboration display 1700 includes a plurality of example first annotation indicators 1716*a* that can correlate one or more positions on the product model to one or more messages 1714 included in the message section 1708. In another example, the one or more annotation indicators can correlate one or more entities (e.g., collaboration group members) to a targeted product feature depicted by the product model (e.g., to assign one or more roles and/or tasks to the entity with regards to the product feature). For instance, the example collaboration display 170 includes a plurality of second annotation indicators 1716*b* that can correlate one or more positions on the product model to one or more entities of the collaboration group.

In various embodiments, the entities within a collaboration group can view a collaboration display generated by the collaboration component 406 concurrently and/or simultaneous via one or more user interface components 110 and/or respective input devices 106. For example, the example collaboration display 1700 shown in FIG. 17 can be viewed concurrently and/or simultaneously by the first entity 1702, the second entity 1704, and/or the 1706. Further, one or more interactions with the collaboration display (e.g., annotation generation and/or population) can be viewed concurrently and/or simultaneously via the one or more user interface components 110 and/or respective input devices 106. For example, one or more of the example annotations 1710 shown in FIG. 17 can be viewed by each of the first entity 1702, the second entity 1704, and/or the third entity 1706 as the one or more example annotations are formed.

Figure 18:
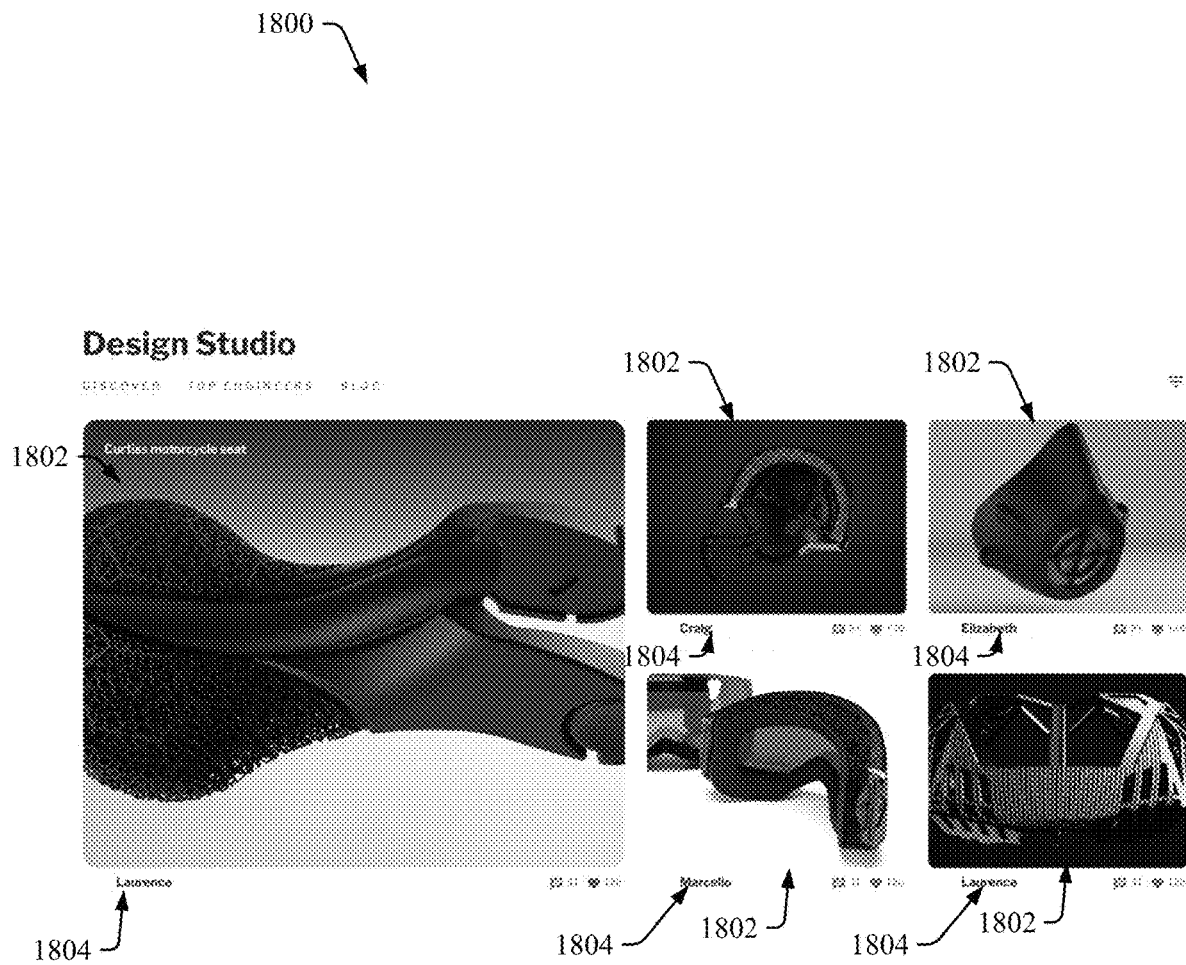
FIG. 18 illustrates a diagram of an example, non-limiting electronic platform that can include one or more published digital product designs and/or manufacturing quotes in accordance with one or more embodiments described herein.

FIG. 18 illustrates a diagram of an example, non-limiting electronic platform 1800 that can be populated with one or more digital product designs, manufacturing details, and/or manufacturing quotes by the publication component in accordance with one or more embodiments described herein. Repetitive description of like elements employed in other embodiments described herein is omitted for the sake of brevity. For example, FIG. 18 depicts various digital product designs published, by the publication component 1606, to the electronic platform 1800 (e.g., titled "Design Studio" in FIG. 18). For instance, the example electronic platform 1800 can include a plurality of example publications 1802, where one or more distinct entities 1804 (e.g., identifiable via respective titles and/or labels, such as "Laurence", "Craig", "Elizabeth", and/or "Marcello" shown in FIG. 18) can employ the publication component 1606 to populate the example electronic platform 1800.

As shown in FIG. 18, the example publications 1802 can be published in association with the distinct entity 1804 that created the digital product design and can be viewable by other third parties. In one or more embodiments, the published digital product designs can be one or more digital product designs developed by the entity based on one or more manufacturing reports 312 and/or cost reports 314 generated by the system 100. Further, the electronic platform (e.g., example electronic platform) can enable entities to comment on, share, express interest in, purchase, and/or order the one or more publications. Where one or more third parties viewing the electronic platform selects one or more of the publications 1802, the example electronic platform 1800 can facilitate an exchange of information between the respective distinct entity 1804 and the interested third party. In one or more embodiments, the example electronic platform 1800 can categorize the example publications 1802 based on: exclusivity, publication date, origin, distinct entity 1804 association, featured status, a combination thereof, and/or the like.

Figure 19:
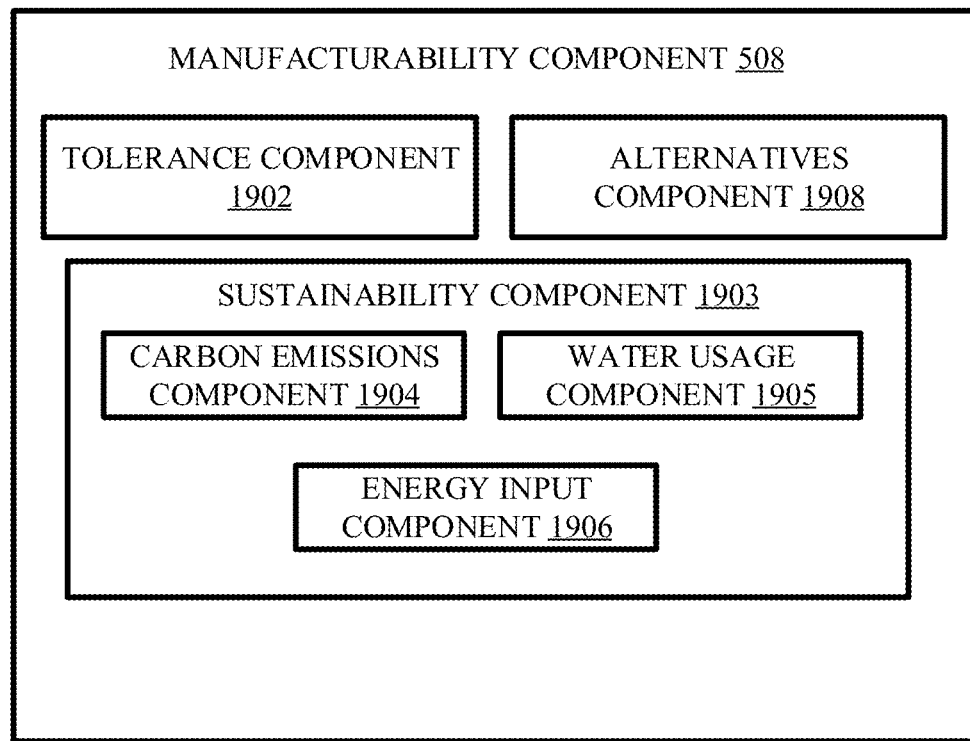
FIG. 19 illustrates a diagram of an example, non-limiting manufacturing component that can generated one or more calculations regarding tolerance values, environmental impact, and/or manufacturing alternatives associated with one or more manufacturing quotes in accordance with one or more embodiments described herein.

FIG. 19 illustrates a diagram of the example, non-limiting manufacturability component 508 further comprising tolerance component 1902, sustainability component 1903, and/or alternatives component 1908 in accordance with one or more embodiments described herein. Repetitive description of like elements employed in other embodiments described herein is omitted for the sake of brevity.

In various embodiments, the tolerance component 1902 can determine expected tolerances for each product feature defined by the digital product design. The tolerance can be the allowable difference between the feature size specified in the digital product design and the manufactured feature size. The difference between the designed feature size and the manufactured feature size can be attributed to the physical process by which material is added or removed during manufacturing. Example considerations that can affect the tolerance evaluation can include, but are not limited to: the interaction between the manufacturing material and the manufacturing tool that adds or removes the material; the transport of the material as it is added or subtracted; the temperature distribution in the material before, during, and after material addition or subtraction; the presence or absence of features that are manufactured using non-standard tooling; a combination thereof, and/or the like.

In one or more embodiments, the product features can be defined in one of two different ways. First, one or more entities can identify target product features by selecting (e.g., via the one or more input devices 106) specific points on the digital product design (e.g., within the product depiction area 602) that define a line, plane, curve, or other geometric shape in one dimension, two dimensions, or three dimensions. Second, the tolerance component 1902 can automatically detects the associate features in the digital product design to identify geometric shapes in one dimension, two dimensions, or three dimensions. Once the product features are identified, the one or more entities can select (e.g., via the one or more input devices 106 interacting with one or more manufacturing reports 312) specific product features and the tolerance component 1902 can report expected tolerance for the selected features. Alternatively, the tolerance component 1902 can determine expected tolerances for each product features defined in the digital product design. Additionally, the one or more entities can enter (e.g., via the one or more input devices 106 interacting with, for example, the input section 610 of a manufacturability report 312) one or more target tolerance values for one or more designated product features, whereupon the tolerance component 1902 can determine whether the target tolerance values can be achieved. In various embodiments, the determinations of the tolerance component 1902 can be populated into the one or more manufacturability reports 312 via the manufacturability report component 402 (e.g., as text, images, graphs, a combination thereof, and/or the like).

In one or more embodiments, the tolerance component 1902 can calculate expected tolerance values based on the one or more manufacturing details, such as the given manufacturing technique and/or manufacturing material. For example, the tolerance component 1902 can employ one or more physics-based computer models regarding material processing and process conditions to predict feature sizes. The one or more physics-based computer models can be used along with one or more machine learning models. For instance, the one or more physics-based computer model can characterize product feature size based on material flow and/or temperature distribution in the product feature. In another example, the tolerance component 1902 can reference a table of design rules to predict product feature sizes. For instance, one or more reference tables can be stored in the one or more data repositories 108 as, for example, operation data 126. The one or more reference tables can correlate respective manufacturing techniques to respective product feature sizes based on one or more conditions of the manufacturing process (e.g., such as material selection, temperature, pressure, a combination thereof, and/or the like). In a further example, the tolerance component 1902 can identify previously manufactured products with similar product features and/or manufacturing processes establish a basis for the tolerance calculation. For instance, the tolerance component 1902 can expect product features of similar size, manufacturing process, and/or manufacturing conditions to achieve similar tolerance values (e.g., within a standard deviation range). Thereby, the tolerance component 1902 can reference, for example, the order data 126 and/or part data 126 of the one or more data repositories 108 to identify previously manufactured products with product features of similar size and/or properties manufactured by similar manufacturing details (e.g., such as manufacturing technique, material selection, and/or manufacturing conditions).

In one or more embodiments, the tolerance component 1902 can update one or more tolerance calculations in response to an alteration to one or more of the manufacturing details. Further, in various embodiments, the tolerance component 1902 can prepare multiple tolerance determinations, each with regards to a respective manufacturing detail or combination of manufacturing details, to compare the effect of one or more alterations to the manufacturing details on the tolerances of the manufactured product.

In various embodiments, the sustainability component 1903 can determine one or more environmental impact metrics associated with manufacturing a product design. For example, the one or more environmental impact metrics can be a function of the details of the manufacturing quote, such as a product feature included in the product design and/or a manufacturing characteristic. In one or more embodiments, the environmental impact metrics can at least one of carbon emissions, water usage, and/or energy input associated with a manufacturing quote based on the digital product design and manufacturing details (e.g., such as manufacturing technique, manufacturing material, production location (e.g., geographical location of the manufacturing facility 130 executing the manufacturing quote), fulfillment location, and shipping method). For example, the sustainability component 1903 can comprise a carbon emissions component 1904 that can determine an amount of carbon emissions generated by a manufacturing process in accordance with the manufacturing quote (e.g., utilizes one or more selected manufacturing characteristics to manufacture the product design with the one or more product features). Also, the sustainability component 1903 can comprise a water usage component 105 that can determine an amount of water used by a manufacturing process in accordance with the manufacturing quote (e.g., utilizes one or more selected manufacturing characteristics to manufacture the product design with the one or more product features). Further, the sustainability component 1903 can comprise an energy input component 1906 that can determine an amount of energy used by a manufacturing process in accordance with the manufacturing quote (e.g., utilizes one or more selected manufacturing characteristics to manufacture the product design with the one or more product features). For instance, the energy input component 1906 can calculate the energy content for each part or product based on energy requirements to: procure the raw materials, transportation costs of raw materials, convert the raw materials into the intended product, operate the manufacturing facility 130, operate the warehouse where raw materials are stored, transport the product to the desired location, a combination thereof, and/or the like. In various embodiments, the determinations of the sustainability component 1903 can be populated into the one or more manufacturability reports 312 via the manufacturability report component 402 (e.g., as text, images, graphs, a combination thereof, and/or the like).

Data regarding the various carbon emissions, water requirements, and/or energy requirements associated with each available manufacturing detail can be stored in the one or more data repositories 108 (e.g., as operation data 124 and/or auxiliary data 128). For example, energy consumption, water consumption, and/or carbon output at the one or more manufacturing facilities 130 can be monitored (e.g., via one or more sensors located at the one or more manufacturing facilitates 130) and stored in the one or more data repositories 108 as operation data 124. In another example, raw material extraction and/or manufacturing facility 130 operations can consume water. The water consumption can also be monitored and stored in the one or more data repositories 108 as operation data 124.

In various embodiments, the sustainability component 1903 analyze the one or more data repositories 108 for one or more previously manufactured products with similar product features and/or manufacturing details to determine the carbon emission, water, and/or energy calculations. For instance, the sustainability component 1903 can reference, for example, the order data 126, operation data 124, and/or auxiliary data 128 of the one or more data repositories 108 to identify previously manufactured products manufactured in same manufacturing facilities 130 and/or fabricated with similar manufacturing details (e.g., similar manufacturing processes and/or manufacturing materials) to identify carbon, water, and/or energy requirements associated with the manufacturing quote. In various embodiments, the sustainability component 1903 can reference carbon emissions, water usage, and/or energy input associated with one or more previously manufactured product designs. For example, the sustainability component 1903 can reference one or more previously manufactured product designs based on one or more similarity scores determined by the computation component 112 (e.g., determined using one or more machine learning models) in accordance with one or more embodiments described herein.

In one or more embodiments, the sustainability component 1903 can update one or more carbon, water, and/or energy calculations in response to an alteration to one or more of the manufacturing details. Further, in various embodiments, the sustainability component 1903 can prepare multiple carbon, water, and/or energy determinations, each with regards to a respective manufacturing detail or combination of manufacturing details, to compare the effect of one or more alterations to the manufacturing details on the calculated environmental impact. Additionally, in one or more embodiments the sustainability component 1903 can determine an amount of carbon offset credits that can mitigate the carbon emissions associated with execution of the manufacturability quote. Additionally, in one or more embodiments the sustainability component 1903 can determine an amount of water offset credits that can mitigate the water consumption associated with execution of the manufacturability quote. The sustainability component 1903 can present multiple options for carbon offsets and/or water offsets that may allow the user to review and select from different options for net carbon emissions, net water consumption, cost, and time to fulfillment.

In one or more embodiments the sustainability component 1903 can calculate the environmental impact metrics for a specific set of choices for the product design and/or manufacturing characteristics (e.g., such as manufacturing process, material, or fulfillment mode). For example, one or more entities can upload a CAD model, desired manufacturing process, desired material, and/or desired time for delivery or transportation mode. The input data can also indicate the number of units to be made and/or whether they are to be stored in a warehouse. Each of these manufacturing characteristics, independently and/or in combination, can affect the carbon emissions, water usage, and/or energy input associated with the production and fulfillment of the product design. The sustainability component 1903 can consider each of these elements in turn to calculate a total carbon emissions, water usage, and/or energy input.

To calculate carbon emissions associated with manufacturing the one or more product designs, the carbon emissions component 1904 can: first calculates the energy input to the manufacturing process; then can calculate the carbon emissions associated with that energy input. For instance, the energy input component 1906 can calculate the energy required to produce the given product design and/or manufacturing characteristic selections. Different manufacturing processes and/or types of manufacturing equipment can require different energy inputs, and the specific energy utilization depends on how the process or equipment is used to produce a specific part geometry. The energy input to a manufacturing process can be found from lookup tables or mathematical models (e.g., stored in the one or more data repositories 108). The energy input can also be found from software tools and/or data that may be available outside the computation component 112 and accessible over the internet. The energy input to manufacture the product design and/or execute a given manufacturing quote can also be estimated by searching the one or more data repositories 108 that contains data about the energy input of the process or similar processes to manufacture similar product designs, product features, and/or manufacturing characteristics. The one or more data repositories 108 can contain information about energy input from data generated by machines and processes in the one or more manufacturing facilities 130 that previously manufactured product designs. In various embodiments, the energy input component 1906 can search the one or more data repositories 108 to find the most similar previously manufactured product designs (e.g., based on one or more similarity scores). The energy input component 1906 can also use statistical methods or machine learning methods to estimate the energy inputs from similar product designs that were made previously and for which data is available in the one or more data repositories 108.

The energy input component 1906 can also calculate energy inputs other than the specific manufacturing characteristics selected. The energy inputs for one or more manufacturing characteristics (e.g., manufacturing process) can also include, but are not limited to: the energy inputs to extract and/or refine the raw materials, energy required to transport the raw materials to the factory, the energy required to operate the one or more manufacturing facilities 130, a combination thereof, and/or the like. Different types of manufacturing materials can come from different sources and have different energy inputs in their expression and/or refinement. For example, polymers can be made from oil products and/or can also be made from plants or trees. Metals can be extracted with a mining process and then refined or combined with other metals before use in a manufacturing process. Thereby, respective manufacturing material preparation and/or development processes can be associated with different energy inputs. In some cases, the energy inputs for a material will be known and communicated by the vendor that sells the material. In other cases, the energy input can be calculated from public sources or mathematical models. In addition to material extraction and refinement, there is also an energy input associated with transporting the material to the factory, and potentially storing the material in a warehouse. The transportation and storage energy components depend upon the distance the material was transported and the method of transport. The energy input for materials extraction, processing, transportation, and storage that can be calculated from mathematical models and/or found in the one or more data repositories 108.

Once the energy input is calculated, the carbon emissions can be calculated. The carbon emissions can be a function of energy input, where the manufacturing facility 130 is located, and/or the method of energy generation used to power the manufacturing facility 130. For example, some geographies have energy provided by nuclear power and some geographics have energy provided by coal power. Other types of power generation include natural gas, oil, solar, and wind power. These and other methods of power generation have different levels of carbon emissions per energy generated. The carbon emissions per energy generated may also depend upon the specific technologies used in specific power generation locations, for example some coal plants have technologies that remove particulates from the smoke generated from burning coal. The carbon emissions component 1904 can use mathematical models and data tables of carbon emissions that account for the location of the electricity generation and the specific technologies used to generate power in that location. The carbon emissions for each step in the process can be added together to calculate the total carbon emissions associated with manufacturing the one or more product designs.

In addition to the environmental impact from carbon emissions, manufacturing can impact the environment through water usage. Water can be used during material extraction, refinement, and power generation. In addition, water can be used in some manufacturing processes. The water usage component 1905 can calculate water consumption in a manner like the calculation of the energy input. For example, the water usage component 1905 can consider each of the steps in the processes for material extraction, refinement, transport, and manufacturing, and calculate the water usage for each using data inputs from vendors, mathematical models, third party software, online tools, lookup tables, or other methods. The water usage can also be calculated by searching the one or more data repositories 108 for similar previously manufactured product designs. The water usage component 1905 can use statistical methods and/or machine learning methods to calculate water usage based on water usage data from previously manufactured parts. The water usage for each step in the process can be added together to calculate the total water consumption associated with manufacturing a product design.

In various embodiments, the energy input, carbon emissions, and water usage can be presented to the one or more entities through via the user interface component 110. In one or more embodiments, the sustainability component 1903 can be an associate component of the manufacturability component 508 and/or the cost component 1208. Further, the sustainability component 1903 can communicate with the associate components of the user interface component 110 to facilitate inclusion of the environmental impact metrics in the one or more manufacturability reports and/or cost reports. For instance, the one or more cost report can include calculations along with a detailed breakdown of specific components used to determine the environmental impact metrics. The sustainability component 1903 can also generate a display showing how the energy input, carbon emissions, and/or water usage can change as a function of the quantity of the product design to be manufactured. The one or more environment impact metrics can also be shown alongside cost information and/or fulfillment information. The cost, time to produce and deliver, and environment impact metrics can each depend upon the number of parts to be made; however, the impact of number of parts to be made may be different for each of these factors. For example, the cost per part to manufacture may decrease by a large amount when the number of parts increases, while the carbon emissions per part may decrease by only a small amount. For example, the cost per part to manufacture may decrease by a small amount when the transportation method changes, while the carbon emissions per part may change by a large amount. The user interface component 110 can display this scaling information to show the user the functional relationships between the number of parts to be manufactured and the cost, the environmental impacts, and the transportation and fulfillment options. For example, the user interface component 110 can generate one or more displays (e.g., included in the one or more manufacturability reports and/or cost reports) showing a plot of carbon emissions vs number of parts overlaid with a plot of cost vs number of parts for a particular transportation and fulfillment solution. The user interface can thus help the user to understand the tradeoffs between different manufacturing choices and the impact of these choices on cost, time to fulfill, and environmental impacts.

In one or more embodiments, the sustainability component 1903 can allow the one or more entities to configure one or more potential scenarios to evaluate the environmental impact metrics, cost, and/or fulfillment mode of the different scenarios. For example, the one or more entities can upload two or more CAD files to compare how different product designs would affect the tradeoffs between environmental impact metrics, cost, and/or fulfillment. For instance, the one or more entities can select two or more materials or manufacturing processes to compare how the choice of material would affect the tradeoffs between environmental impact, cost, and/or fulfillment. For example, the one or more entities can organize different scenarios for what factories and geographies production will occur, to analyze the tradeoffs between environmental impact, cost, and/or fulfillment.

Further, the alternatives component 1908 can be employed in several different ways to help the one or more entities understand and/or manage the environmental impact of their manufacturing choices. For example, the alternatives component 1908 can determine if the input data (e.g., product design and/or manufacturing characteristics) provided result in the most sustainable solution. For example, the alternatives component 1908, along with the sustainability component 1903, can generate one or more recommendations for the one or more entities to select alternative material, manufacturing process, fulfillment time, and/or other user inputs that minimize the environmental impact of manufacturing a product design. The alternatives component 1908 can also help the one or more entities to find a balance between emissions, cost, and fulfillment time. For example, the alternatives component 1908 can perform these tasks by searching the one or more data repositories 108 of historical data and finding one or more previously manufactured product designs. The energy inputs, carbon emissions, and water usage, of the previously manufactured product designs can be used to calculate the energy inputs, carbon emissions, and water usage of the given product designs. The computation component 112 (e.g., via the alternatives component 1908) can use statistical methods or machine learning methods to calculate the environmental impact of manufacturing the given product design with the selected manufacturing characteristics from the historical data.

In one or more embodiments, the sustainability component 1903 can provide a recommended mode of transport or fulfillment, location of manufacture, material, manufacturing process, or number of parts to be made in order to minimize the environmental impact. The sustainability component 1903 can also recommend a mode of transport or fulfillment, location of manufacture, material, manufacturing process, or number of parts to be made to reach specific environmental impact targets designated by the user. For example, if the one or more entities has a threshold for carbon emissions per product design unit that is not to be exceeded, the sustainability component 1903 can determine the material, manufacturing process, and other user inputs that will allow that target to be reached when manufacturing the given product design. The alternatives component 1908 (e.g., in conjunction with the sustainability component 1903) can also suggest modifications to the product design that can result in reduced emissions, water usage, or energy input. The product design modifications can be found by searching the historical database for geometries that are similar to the given product design but were made with lower emissions, water usage, or energy input.

There can be fees or taxes associated with carbon emissions, energy consumption, and water usage. The fees or taxes can be different depending on the location of manufacture, method of manufacture, method or mode of transportation, or type of energy used in manufacture. In various embodiments, the cost component 1208 can calculate these fees based on the location of manufacture and other user inputs using mathematical models, lookup tables, third party software, or publicly available data. Also, the cost report component 404 can present the one or more entities with environmental fees and taxes for different manufacturing scenarios and input data sets, to help the one or more entities understand and/or choose between different options. The alternatives component 1908 can suggest location of manufacture or other user inputs that would reduce the fees and taxes associated with specific input data sets (e.g., product designs and selected manufacturing characteristics).

In various embodiments, the user interface component 110 can present to the user the option to purchase a carbon offset. The carbon offset can be purchased through an online brokerage, or carbon offset service, or other carbon offset method. The carbon offset can be less than, equal to, or larger than the carbon emissions expected from manufacturing the user's order. The carbon offset can be configured to allow the user to reach a target emissions impact, which is the net of the manufacturing emissions minus the offset.

In various embodiments, the alternatives component 1908 can identifying one or more alternate manufacturing details available for the manufacturing quote based on the digital product design and/or other manufacturing details. Additionally, the determinations of the alternatives component 1908 can be populated into the one or more manufacturability reports 312 via the manufacturability report component 402 (e.g., as text, images, graphs, a combination thereof, and/or the like). For example, one or more entities initializing the manufacturing quote can evaluate the one or more alternate manufacturing details identified by the alternatives component 1908 to select a combination of manufacturing details that can meet one or more desired quality considerations, cost considerations, desired environmental impact metrics, and/or delivery time considerations. For instance, the one or more entities can evaluate one or more alternate manufacturing materials to select a material that meets the requirements of the digital product design while also optimizing costs and/or meeting one or more requirements related to: delivery time, surface finish, tolerance values, environmental impact metrics, a combination thereof, and/or the like.

In one or more embodiments, alternatives component 1908 can consider various material options and analyze tradeoffs between those different options. For instance, the alternatives component 1908 can generate one or more alternative manufacturing characteristics based on a comparison of the environmental impact metrics determined by the sustainability component 1903 and one or more target environmental impact metrics defined by one or more entities (e.g., via one or more input devices 106). For example, one or more alternate manufacturing details identified by the alternatives component 1908 can impact cost, smallest possible feature size, the manufacturability score, whether the product can be manufactured to within desired tolerance, whether a part can be manufactured using a specific process or machine, part strength, part weight, one or more environmental impact metrics, a combination thereof, and/or the like. For instance, the alternatives component 1908 can identify alternate material choices available for a given manufacturing process, target tolerance, desired finish, delivery time, cost, and/or desired property. In another instance, the alternatives component 1908 can identify alternate manufacturing processes available for a give digital product design, manufacturing material, and/or cost objective. In a further instance, alterative component 1908 can identify alternate manufacturing facilities 130 to execute the manufacturing quote.

In one or more embodiments, the alternatives component 1908 can facilitate the completion of one or more manufacturing quotes by the one or more entities. For example, the one or more entities can define a first manufacturing detail, and the alternatives component 1908 can identify and present (e.g., via one or more manufacturability reports 312) to the entities a list of variants of a second manufacturing detail that are compatible with the first manufacturing detail. The one or more entities can then select (e.g., via the one or more input devices 106) the second manufacturing detail from the list of variants. For instance, the one or more entities can define (e.g., via the one or more input devices 106) a manufacturing process (e.g., define a manufacturing technique) to be employed, and the alternatives component 1908 can identify a list of manufacturing materials compatible with the defined manufacturing process (e.g., compatible with the defined manufacturing technique). The manufacturability report component 402 can further populate the one or more manufacturability reports 312 with the list of manufacturing materials for selection by the one or more entities. In another instance, the one or more entities can define (e.g., via the one or more input devices 106) a manufacturing material to be employed, and the alternatives component 1908 can identify a list of manufacturing processes compatible with the defined manufacturing material. The manufacturability report component 402 can further populate the one or more manufacturability reports 312 with the list of manufacturing processes for selection by the one or more entities.

In one or more embodiments, the one or more entities can define one or more objectives for the alternatives component 1908 to prioritize. For example, where the one or more entities define a cost objective (e.g., lowest cost and/or cost below a target threshold), the alternatives component 1908 can identify one or more alternate manufacturing details that can lower the cost of the manufacturability quote (e.g., alternate manufacturing details that are associated with lower input costs than the manufacturing details currently defined). In another example, where the one or more entities define an objective to prioritize material strength (e.g., manufacture a product with the highest material strength and/or material strength above a target threshold), the alternatives component 1908 can identify one or more alternate manufacturing materials that can have higher strength properties than the currently selected manufacturing material.

Figure 20:
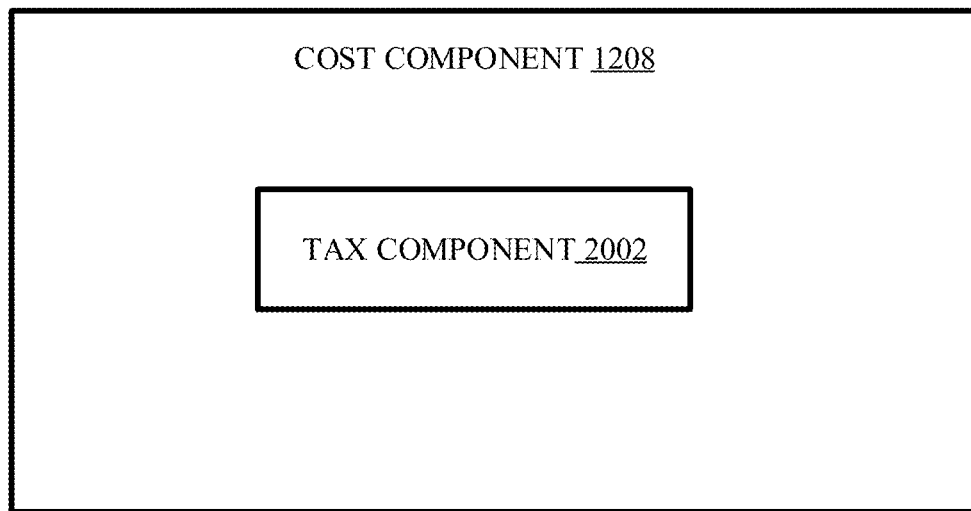
FIG. 20 illustrates a diagram of an example, non-limiting cost component that can generated one or more tax calculations regarding one or more manufacturing quotes in accordance with one or more embodiments described herein.

FIG. 20 illustrates a diagram of the example, non-limiting cost component 1208 further comprising tax component 2002 in accordance with one or more embodiments described herein. Repetitive description of like elements employed in other embodiments described herein is omitted for the sake of brevity. In various embodiments, the tax component 2002 can calculate tax and tariff values based on the location of the one or more manufacturing facilities 130 (e.g., as defined in the operation data 124 of the data repositories 108) executing the manufacturing quote and/or where the manufactured product will be shipped.

In various embodiments, the tax component 2002 can determine multiple tax and/or tariff values, where each tax and/or tariff value can be associated with respective manufacturing facility 130. Further the cost report component 404 can populate the one or more cost reports 314 with the tax and/or tariff values determined by the tax component 2002 such that one or more entities can select a manufacturing facility 130 for executing the manufacturing quote based on the tax implications.

In one or more embodiments, the tax component 2002 can calculate the tax where the product is to be fulfilled (e.g., a value added tax) based on the location of the manufacturing facility 130 producing the product and/or any tariff for export/import. For example, the tax rates for different geographies and/or tariff rules can be stored in one or more reference tables of the data repositories 108 (e.g., as operation data 124 and/or auxiliary data 128) and accessed by the tax component 2002. For products requiring assembly, the tax component 2002 can calculate the tax and/or tariff values based on the location where the assembly is consolidated into a single product using additive manufacturing. Additionally, the tax component 2002 can search the one or more data repositories 108 to identify past manufacturing quotes with similar characteristics (e.g., executed at similar locations and/or utilized similar manufacturing details, such as manufacturing materials). The cost report component 404 can thereby populate the cost report with the tax and/or tariff values associated with the similar, previously executed manufacturing quotes to generate a comparison of how the current manufacturing quote relates to past manufacturing quotes with regards to tax and/or tariff costs incurred.

Figure 21:
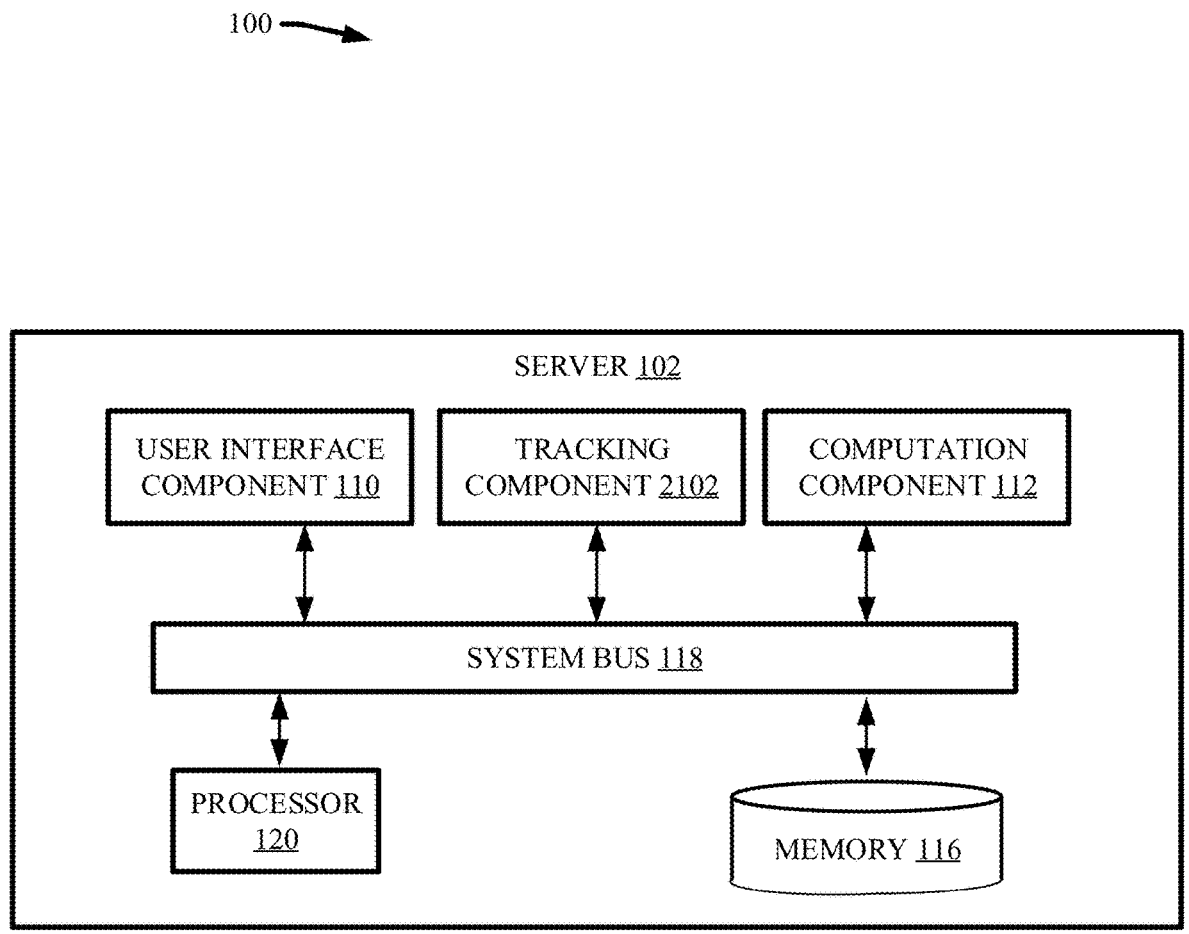
FIG. 21 illustrates a diagram of an example, non-limiting system that can track the development, execution, and/or fulfillment of one or more manufacturing quotes in accordance with one or more embodiments described herein.
Figure 22:
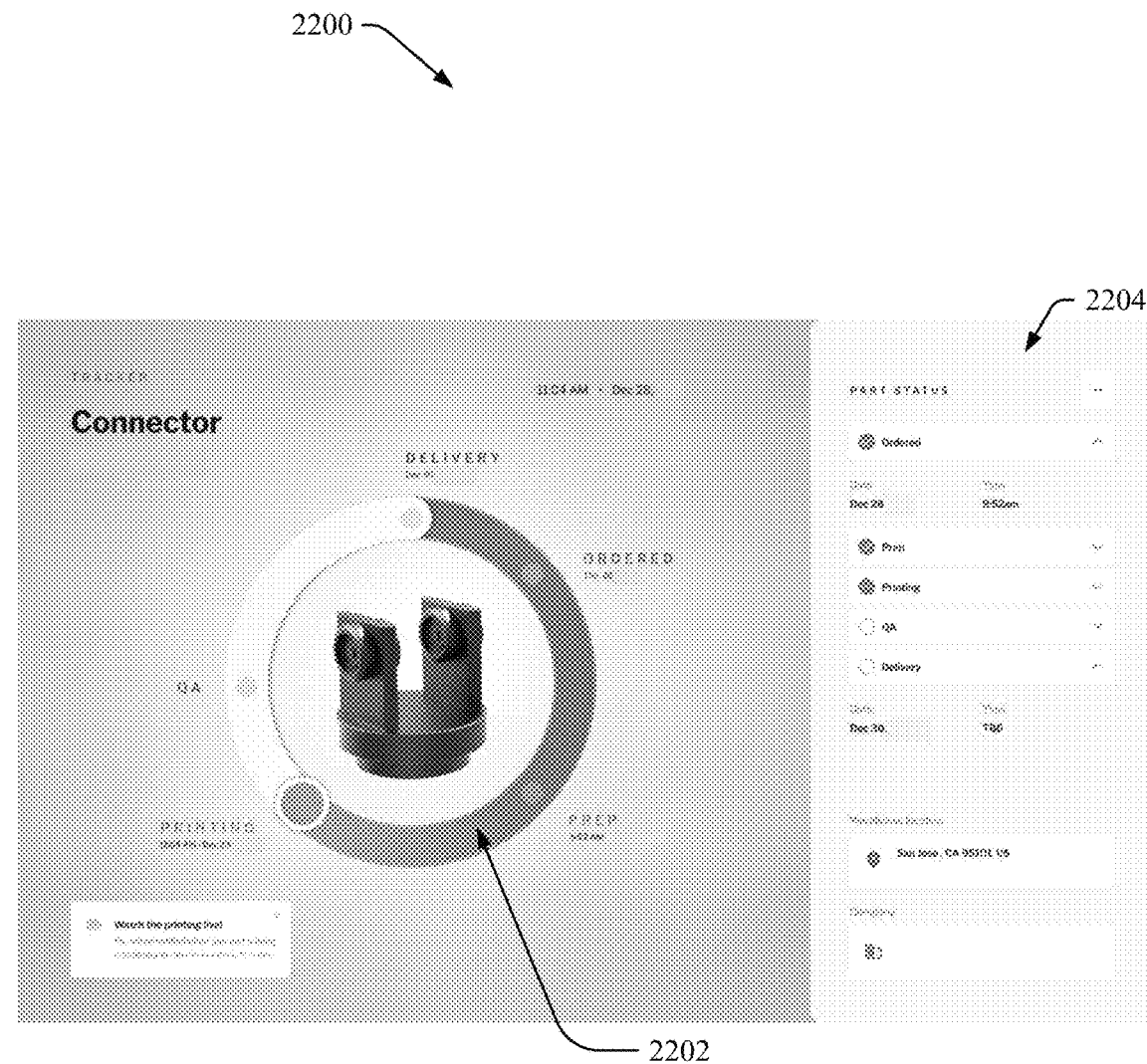
FIG. 22 illustrates a diagram of an example, non-limiting tracking display that can present the status and/or progress of one or more initialized manufacturing quotes in accordance with one or more embodiments described herein.
Figure 23:
FIG. 23 illustrates a diagram of an example, non-limiting virtual warehouse that can be populated with one or more previously developed digital product designs and/or manufacturing quotes in accordance with one or more embodiments described herein.

FIG. 21 illustrates a diagram of the example, non-limiting system 100 further comprising tracking component 2102 in accordance with one or more embodiments described herein. Also, FIGS. 22 and 23 illustrate diagrams of an example, non-limiting tracking display 2200 and an example, non-limiting virtual warehouse 2300 that can be generated by the tracking component 2102 in accordance with one or more embodiments described herein. Repetitive description of like elements employed in other embodiments described herein is omitted for the sake of brevity.

In various embodiments, the tracking component 2102 can generate one or more tracking displays regarding the progress of a manufacturing quote and/or the lead time associated with a manufacturing quote. In one or more embodiments, one or more tracking displays generated by the tracking component 2102 can display lead times associated with a manufacturing quote as a function of one or more manufacturing details and/or shipping profiles.

In one or more embodiments, the tracking component 2102 can track and/or record any of the outputs of the manufacturability report component 402, cost report component 404, collaboration component 406, and/or computation component 112. For example, the tracking component 2102 can track information related to a given manufacturing quote for review by one or more entities employing the system 100. For instance, the tracking component 2102 can track all the information collected and/or generated by the system 100 during the initialization and/or execution of a manufacturing quote, include but not limited: supplied digital product designs, and/or various versions thereof employed during the development of the manufacturing quote; selected manufacturing details, and/or various versions thereof employed during the development of the manufacturing quote; manufacturing reports 312 (e.g., generated manufacturability warnings and/or scores, generated manufacturing recommendations, a combination thereof, and/or the like); cost reports 314 (e.g., cost determinations, cost curves, cost comparisons, manufacturing detail alternatives, tax determinations, a combination thereof, and/or the like); collaboration displays (e.g., including message logs, generated annotations, shared files); sensor data collected by the manufacturing facilities 130 during execution of the manufacturing process defined by the manufacturing quote; shipment tracking data pertaining to the location of the product once manufactured; a combination thereof, and/or the like.

In one or more embodiments, once a manufacturing quote is executed, the tracking component 2102 can track the progress of the product during the manufacturing process. For example, one or more sensors comprised within the one or more manufacturing facilities 130 can collect tracking data regarding the progress of the manufacturing process such as, but not limited to: the location of the partially completed product within the manufacturing facility 130; the type of manufacturing machine recently employed in execution of the manufacturing quote; the stage of the manufacturing process recently employed in execution of the manufacturing quote; a combination thereof, and/or the like. For instance, the one or more sensors of the manufacturing facilities 130 can capture images and/or video of the product during and/or after manufacturing. As described herein, data measured, generated, and/or collected via the sensors of the manufacturing facilities 130 can be stored in the one or more data repositories 108 as operation data 126, and thereby be accessible to the tracking component 2102.

In a further example, the tracking component 2102 can collect inspection data describing the results of one or more quality assurance inspections performed during and/or after the manufacturing process. For instance, the inspection data can be in the form of inspection reports that can include textual descriptions and/or captured images of one or more features of the manufactured product (e.g., such as measured dimensions, chemical properties, and/or physical properties of the manufactured product). The inspection reports can be stored in the one or more data repositories 108 as operation data 126, and thereby accessible to the tracking component 2102. Additionally, the tracking component 2102 can aggregate the tracked data into an order history that describes the history of the manufactured product from the first steps of initializing the manufacturing quote, to executing the manufacturing quote, to delivering the manufactured product. In various embodiments, the tracking component 2102 can populate one or more tracking displays with the tracked information, inspection data, and/or order history, where the one or more tracking displays can present the information via, for example, text, images, audio, video, graphs, plots, charts, tables, a combination thereof, and/or the like.

In various embodiments, the tacking component 2102 can track the products, orders, and/or projects associated with a given entity employing the system 100. For example, products tracked by the tracking component 2102 can be products manufactured by the entity via the system 100. In another example, orders tracked by the tracking component 2102 can be manufacturing quotes initialized and/or executed by the entity (e.g., including manufacturability reports 312 and/or cost reports 314). In a further example, projects tracked by the tracking component 2102 can be one or more groups of projects and/or orders, where the grouping can be set by the one or more entities via the user interface component 110 and/or one or more input devices 106. For instance, the tracking component 2102 can generate a product library that can include, for example: a list of products manufactured by the entity, a list of products included in one or more orders, a list of products included in one or more projects, a list of products associated with a collaboration group, a combination thereof, and/or the like. In a further instance, the tracking component 2102 can generate an order library that can include, for example: a list of orders that comprise one or more designated products, a list of orders by designated entity, a list of orders by project, a list of orders by collaboration group, a combination thereof, and/or the like. In a further instance, the tracking component 2102 can generate a project library that can include, for example: a list of projects comprising a designated product, a list of projects by entity, a list of projects by collaboration group, a combination thereof, and/or the like. Further the tracking component 2102 can store the one or more product libraries, order libraries and/or project libraries in the one or more data repositories 108 (e.g., as order data 126 and/or part data 126).

Further, the tracking component 2102 can track the activity of one or more members of a collaboration group within the system 100. For example, the tracking component 2102 can generate statistics on or an aggregate view of member activity for a given collaboration group. For instance, the tracking component 2102 can track the activity of a single member or multiple members of a collaboration group. Further, the tracking component 2102 can generate one or more tracking displays that include member activity over a defined period of time (e.g., a defined period of days, months, and/or years). Additionally, the tracking component 2102 can track the activity of the collaboration group as a whole. For example, the tracking component 2102 can track and/or record a list of products (e.g., previously manufactured and/or currently being manufactured), orders, manufacturability reports 312 (e.g., previously manufactured and/or currently being manufactured), and/or cost reports 314 associated with the collaboration group.

Additionally, the tracking component 2102 can generate one or more tracking displays regarding a collaboration group that can describe, for example: the number of active members; the number of registered members, statistics on member activity; member profiles (e.g., training and/or education level of a given member, including certificates); member associations with one or more manufacturing materials, machines, processes, projects, and/or digital product designs; a combination thereof, and/or the like.

In one or more embodiments, the tacking component 2102 can generate one or more tracking displays that can report on the number of products and/or manufacturing quotes associated with a given entity and/or collaboration group and are in production. Further, one or more tracking displays generated by the tracking component 2102 can report on a product yield for a given manufacturing quote, set of manufacturing quotes, given project, set of projects, and/or given collaboration group.

For example, the tracking component 2102 can further determine an anticipated fulfillment date for the initialized manufacturing quote. For example, tracking component 2102 can determine the anticipated fulfillment date as a function of multiple manufacturing phases associated with execution of the manufacturing quote, including, but not limited to: an order processing phase, a manufacturing instructions setup phase, a manufacturing queue phase, a tool setup phase, a production phase, a post-processing phase, an assembly quality phase, and/or a shipping phase. FIG. 22 shows an example tracking display 2200 that can be generated by the tracking component 2102 regarding the anticipated fulfillment date and/or the production status of the given manufacturing quote. In various embodiments, the example tracking display 2200 can be shared with the one or more entities associated with the manufacturing quote via the user interface component 110 and/or the one or more input devices 106.

As shown in FIG. 22, the example tracking display 2200 can delineate the progress of the manufacturing quote execution via completed manufacturing phases (e.g., those manufacturing phases highlighted by the progress bar 2202) and future manufacturing phases (e.g., those manufacturing phases yet to be highlighted by the progress bar 2202). Additionally, the example tracking display 2200 can include a description area 2204, which can include one or more descriptions of the respective manufacturing phases and/or information tracked and/or collected by the tracking component 1606 with regards to the manufacturing quote's progression through the respective manufacturing phase.

In one or more embodiments, the tracking component 2102 can generate a virtual warehouse associated with a given entity and/or collaboration group, where the entity and/or collaboration group can browse and/or select from to initialize a manufacturing report and/or re-execute a past manufacturing report. FIG. 23 shows an example virtual warehouse 2300 that can be generated by the tracking component 16086. In various embodiments, the example virtual warehouse 2300 can be shared with the one or more entities associated with the manufacturing quote via the user interface component 110 and/or the one or more input devices 106.

For example, the virtual warehouse (e.g., example virtual warehouse 2300) can be a database (e.g., stored on the one or more data repositories 108) of previously employed digital product designs, manufacturing details, and/or manufacturing quotes associated with the entity and/or collaboration group. As shown in the FIG. 23, the virtual warehouse (e.g., example virtual warehouse 2300) can include one or more product models of the store digital product designs to facilitate one or more searches. In various embodiments, the one or more entities and/or collaboration groups associated with a given virtual warehouse can employ the tracking component 2102 to search for previously employed digital product designs that include one or more product features and/or meet one or more intended functions. In another example, the one or more entities and/or collaboration groups associated with a given virtual warehouse can employ the tracking component 2102 to search for previously employed sets of manufacturing details that can achieved a designated product at a designated price threshold and/or on a designated schedule.

In one or more embodiments, the tracking component 2102 can track the number of manufacturing quotes executed by an entity, the number of re-orders of a manufacturing quote by the entity, the frequency of re-orders, when the re-orders where placed, the fulfillment speed associated with executing one or more past manufacturing quotes, and/or the current status of one or more re-ordered manufacturing quotes. Additionally, the tracking component 2102 can analyze the re-order activity associated with one or more entities to predict the occurrence of one or more re-orders in the future. For example, the tracking component 2102 can plot the occurrence, number, and/or frequency of re-orders as a function of time to identify one or more trends and/or patterns in the ordering activity of one or more entities.

In various embodiments, one or more entities employing the system 100 can own one or more manufacturing machines located in the one or more manufacturing facilities 130. The tracking component 2102 can track the status of the one or more manufacturing machines owned by a given entity. For example, the tracking component 2102 can track the number of times the manufacturing machine is used, the number of hours the machine has been in operation, the total energy input to the machine, the total energy output from the machine, the number of times the machine has been repaired and/or maintained, the expected lifetime of the manufacturing machine, one or more maintenance recommendations regarding the manufacturing machine, a combination thereof, and/or the like. The tracking component 2102 can receive input from internal sensors installed on the manufacturing machine, or from external sensors installed inside one or more manufacturing facilities 130, or from both.

FIG. 24 illustrates a flow diagram of an example, non-limiting computer-implemented method 2400 that can be employed by the system 100 to perform one or more manufacturability analyses regarding one or more manufacturing quotes in accordance with one or more embodiments described herein. Repetitive description of like elements employed in other embodiments described herein is omitted for the sake of brevity. In various embodiments, the system 100 can employ the computer-implemented method 2400 to analyze the environmental impact associated with executing one or more manufacturing quotes. The computer-implemented method 2400 can be performed by system 100 and/or the various associate components thereof in accordance with the various embodiments described herein.

At 2402, the computer-implemented method 2400 can comprise receiving (e.g., via the one or more networks 104 and/or input devices 106), by a system 100 operatively coupled to a processor 120, one or more product designs as input data. As described herein, the one or more product designs can be received in a digital format (e.g., the one or more product designs can be one or more computer models, such as CAD files). Further, the one or more product designs can delineate various product features of a product targeted for manufacturing.

At 2404, the computer-implemented method 2400 can comprise generating (e.g., via user interface component 110 and/or computation component 112), by the system 100, a plurality of manufacturing characteristics for selection. For example, the one or more manufacturing characteristics can delineate the various manufacturing considerations described in various embodiments described herein (e.g., such as manufacturing materials, manufacturing techniques, manufacturing requirements, and/or the like). A manufacturing characteristic can be selected (e.g., via the one or more input devices 106) from the plurality of manufacturing characteristics and added to the input data. For instance, one or more entities can utilize the user interface component 110 to define details of a manufacturing quote in accordance with the various embodiments described herein.

At 2406, the computer-implemented method 2400 can comprise executing (e.g., via computation component 112), by the system 100, one or more machine learning models to determine a similarity score that can characterize an amount of similarity between the product design and a plurality of previously manufactured product designs. For example, details regarding the previously manufactured product designs can be stored in one or more data repositories 108 in accordance with various embodiments described herein. In various embodiments, similarities between the product features (e.g., dimensions, applications, compositions, finishes, tolerances, and/or the like) and/or manufacturing characteristics (e.g., manufacturing locations, manufacturing processes, manufacturing equipment requirements, material selection, and/or the like) of the previously manufactured product designs and the given product design can be characterized (e.g., quantified) by the similarity score.

At 2408, the computer-implemented method 2400 can comprise determining (e.g., via carbon emissions component 1904), by the system 100, an amount of carbon emissions generated by a manufacturing process that utilizes the manufacturing characteristic to manufacture the product design. At 2410, the computer-implemented method 2400 can comprise determining (e.g., via water usage component 1905), by the system 100, an amount of water used by the manufacturing process based on the product design and the manufacturing characteristic. At 2412, the computer-implemented method 2400 can comprise determining (e.g., via energy input component 1906), by the system 100, an amount of energy used by the manufacturing processes based on the product design and/or the manufacturing characteristic. At 2414, the computer-implemented method 2400 can comprise comparing (e.g., via sustainability component 1903), by the system 100, the amount of carbon emissions, water usage, and/or energy input to a target environmental impact metric. For example, the target environmental impact metric can be defined via the one or more input devices 106, and/or can delineate a desired threshold for carbon emissions, water usage, energy input, and/or combination thereof. At 2416, the computer-implemented method 24000 can comprise generating (e.g., via alternatives component 1908), by the system 100, one or more alternative manufacturing characteristics based on the comparison. In various embodiments, the one or more alternative manufacturing characteristics can result in manufacturing the product design with lower amounts of carbon emissions, water usage, and/or energy input to meet the one or more target environmental impact metrics.

FIG. 25 illustrates a flow diagram of an example, non-limiting computer-implemented method 2500 that can be employed by the system 100 to perform one or more cost analyses regarding one or more manufacturing quotes in accordance with one or more embodiments described herein. Repetitive description of like elements employed in other embodiments described herein is omitted for the sake of brevity. In various embodiments, the system 100 can employ the computer-implemented method 2500 to facilitate collaboration between multiple entities in developing a product design and/or manufacturing quote. The computer-implemented method 2500 can be performed by system 100 and/or the various associate components thereof in accordance with the various embodiments described herein.

At 2502, the computer-implemented method 2500 can comprise receiving (e.g., via the one or more networks 104, input devices 106, and/or user interface component 110), by a system 100 operatively coupled to a processor 120, one or more product designs from a first entity from a plurality of entities as input data. At 2504, the computer-implemented method 2500 can comprise receiving (e.g., via the one or more networks 104, input devices 106, and/or user interface component 110), by the system 100, one or more annotations from one or more second entities from the plurality of entities as a contribution to the input data. Further, the one or more annotations can be generated by the one or more second entities based on a manufacturing consideration associated with manufacturing the product design via a defined manufacturing process. For example, the one or more second entities can generate one or more annotations regarding a possible change to one or more product features included in the product design and/or manufacturing characteristics associated with the manufacturing process.

At 2506, the computer-implemented method 2500 can comprise generating (e.g., via annotation component 1602), by the system 100, one or more displays of the one or more annotations positioned onto a display of the product design. In various embodiments, the one or more annotations can regard a product feature included in the product design. Further, the one or more annotations can be positioned onto the product feature presented in the display of the product design (e.g., as exemplified in at least FIG. 17). At 2508, the computer-implemented method 2500 can comprise tracking (e.g., via version component 1604), by the system 100, one or more edits made to the product design by one or more entities from the plurality of entities. For example, the one or more edits can originate from the one or more annotations generated by the one or more second entities. At 2510, the computer-implemented method 2500 can comprise storing (e.g., via tracking component 2102), by the system 100, one or more versions of the product design in a library of historic product designs associated with the plurality of entities. In various embodiments, the library can be embodied as one or more virtual warehouses, where the plurality of entities can store and retrieve product designs developed via one or more edits performed in consideration of one or more annotations generated by various entities from the plurality of entities. Thereby, the plurality of entities can collaborate with each other to develop the one or more product designs stored in the one or more virtual warehouses. At 2512, the computer-implemented method 2500 can comprise adding (e.g., via publication component 1606), by the system 100, the product design to one or more digital catalogs that can be publicly or privately accessible by one or more other third-party entities via an electronic platform. For example, the publication component 1606 can publish the product design via one or more commercial, public platforms (e.g., as exemplified in at least FIGS. 9 and/or 18).

Figure 26:
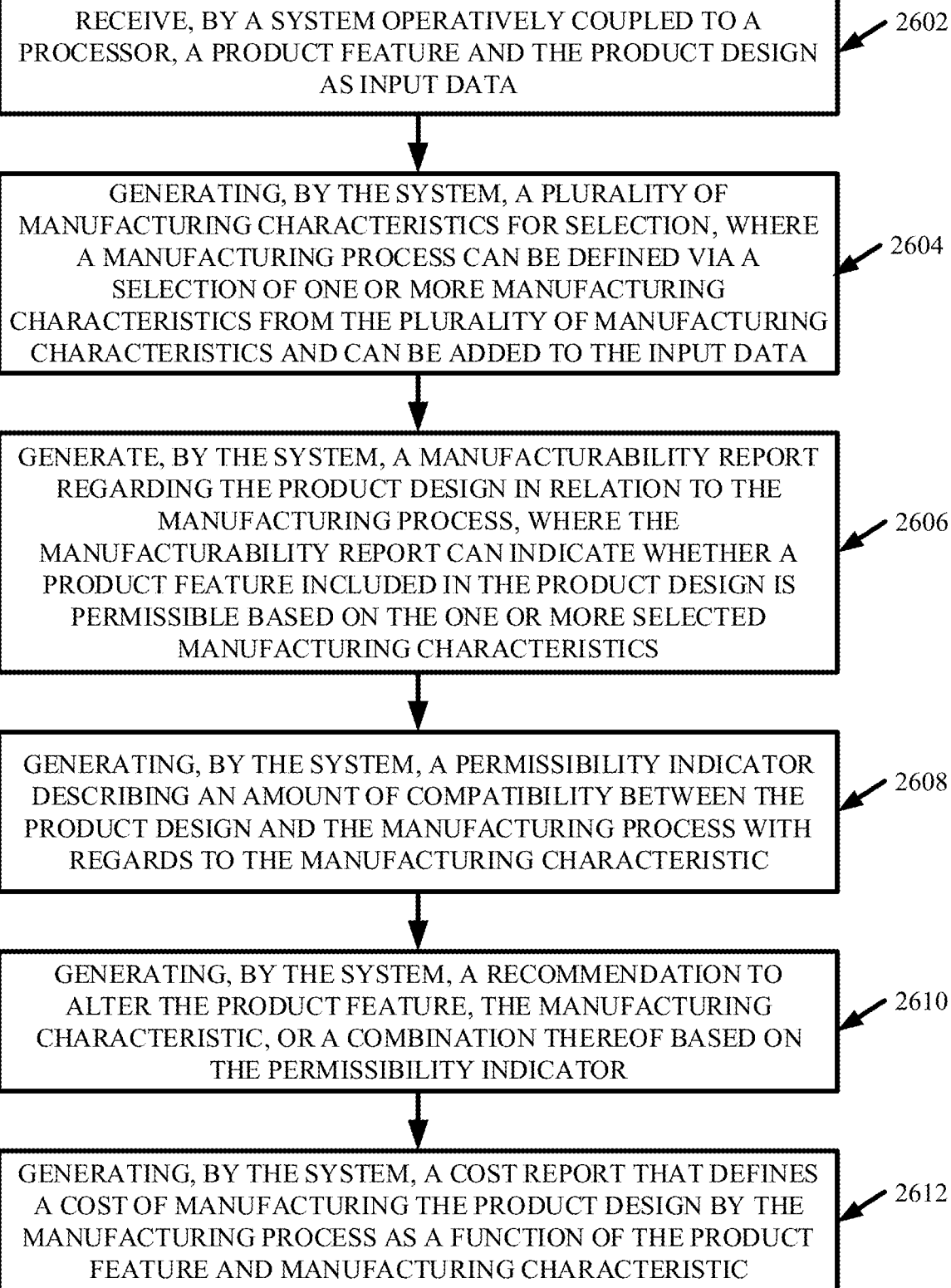
FIG. 26 illustrates a flow diagram of an example, non-limiting computer-implemented method regarding the generation of one or more collaboration displays that can facilitate the development of one or more manufacturing quotes by a multi-member collaboration group in accordance with one or more embodiments described herein.

FIG. 26 illustrates a flow diagram of an example, non-limiting computer-implemented method 2600 that can be employed by the system 100 to facilitate multi-entity collaborations to develop one or more manufacturing quotes in accordance with one or more embodiments described herein. Repetitive description of like elements employed in other embodiments described herein is omitted for the sake of brevity. In various embodiments, the system 100 can employ the computer-implemented method 2600 to generate one or more manufacturability reports, cost reports, and/or associate recommendations regarding the manufacturing of a given product design. The computer-implemented method 2600 can be performed by system 100 and/or the various associate components thereof in accordance with the various embodiments described herein.

At 2602, the computer-implemented method 2600 can comprise receiving (e.g., via the one or more networks 104, input devices 106, and/or interface component 110), by a system 100 operatively coupled to a processor 120, a product feature and/or product design as input data. At 2604, the computer-implemented method 2600 can comprise generating (e.g., via manufacturability component 508 and/or manufacturability report component 402), by the system 100, a plurality of manufacturing characteristics for selection (e.g., via the one or more input devices 106). A manufacturing process can be defined via a selection of the one or more manufacturing characteristics from the plurality of manufacturing characteristics and can be added to the input data. For example, an entity can employ one or more input devices 106 to select one or more manufacturing characteristics, and thereby define various considerations of the manufacturing process (e.g., such as manufacturing technique, manufacturing locations, material selection, finish selection, tolerance selection, quantity selection, a combination thereof, and/or the like in accordance with the various embodiments described herein).

At 2606, the computer-implemented method 2600 can comprise generating (e.g., via manufacturability component 508 and/or manufacturability report component 402), by the system 100, one or more manufacturability reports regarding the product design in relation to the manufacturing process. In various embodiments, the one or more manufacturability reports can indicate whether a product feature included in the product design is permissible based on the one or more selected manufacturing characteristics. For example, at 2608, the computer-implemented method 2600 can comprise generating (e.g., via permissibility component 502), by the system 100, one or more permissibility indicators describing an amount of compatibility between the product design and the manufacturing process with regards to the manufacturing characteristic. At 2610, the computer-implemented method 2600 can comprise generating (e.g., via recommendation component 504), by the system 100, one or more recommendations to alter the product feature, the manufacturing characteristic, and/or a combination thereof based on the permissibility indicator generated at 2608.

Further, at 2612, the computer-implemented method 2600 can comprise generating (e.g., via cost component 1208 and/or cost report component 404), by the system 100, one or more cost reports that can define a cost of manufacturing the product design by the manufacturing process as a function of the product feature and manufacturing characteristic. In various embodiments, the one or more cost reports can characterize various costs associated with manufacturing the product design, where product features can be varied to affect the cost and/or manufacturing characteristics can be varied to affect the cost. In accordance with various embodiments described herein, generating the one or more cost reports at 2612 can include generating recommendations and/or alternatives that an entity may employ to reach a target cost objective (e.g., to manufacture the product design in accordance with a given budget).

Figure 27:
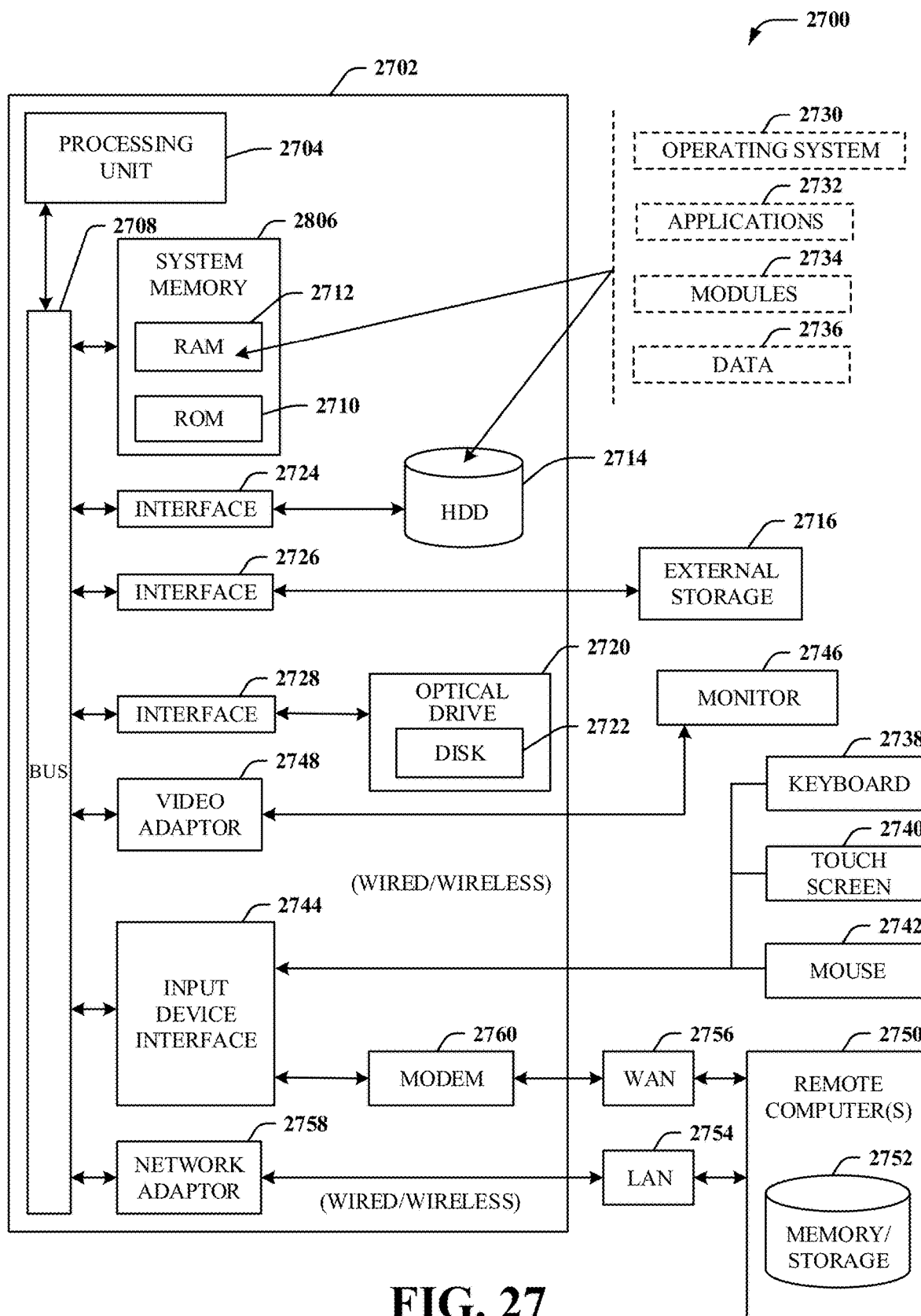
FIG. 27 illustrates a block diagram of an example, non-limiting operating environment in which one or more embodiments described herein can be facilitated.

In order to provide additional context for various embodiments described herein, FIG. 27 and the following discussion are intended to provide a general description of a suitable computing environment 2700 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, and/or the like, that perform particular tasks or implement particular abstract data types. Moreover, those skilled in the art will appreciate that the inventive methods can be practiced with other computer system configurations, including single-processor or multi-processor computer systems, minicomputers, mainframe computers, Internet of Things ("IoT") devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices. For example, in one or more embodiments, computer executable components can be executed from memory that can include or be comprised of one or more distributed memory units. As used herein, the term "memory" and "memory unit" are interchangeable. Further, one or more embodiments described herein can execute code of the computer executable components in a distributed manner, e.g., multiple processors combining or working cooperatively to execute code from one or more distributed memory units. As used herein, the term "memory" can encompass a single memory or memory unit at one location or multiple memories or memory units at one or more locations.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data, or unstructured data.

Computer-readable storage media can include, but are not limited to, random access memory ("RAM"), read only memory ("ROM"), electrically erasable programmable read only memory ("EEPROM"), flash memory or other memory technology, compact disk read only memory ("CD-ROM"), digital versatile disk ("DVD"), Blu-ray disc ("BD") or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 27, the example environment 2700 for implementing various embodiments of the aspects described herein includes a computer 2702, the computer 2702 including a processing unit 2704, a system memory 2706 and a system bus 2708. The system bus 2708 couples system components including, but not limited to, the system memory 2706 to the processing unit 2704. The processing unit 2704 can be any of various commercially available processors. Dual microprocessors and other multi-processor architectures can also be employed as the processing unit 2704.

The system bus 2708 can be any of several types of bus structure that can further interconnect to a memory bus (with or without a memory controller), a peripheral bus, and a local bus using any of a variety of commercially available bus architectures. The system memory 2706 includes ROM 2710 and RAM 2712. A basic input/output system ("BIOS") can be stored in a non-volatile memory such as ROM, erasable programmable read only memory ("EPROM"), EEPROM, which BIOS contains the basic routines that help to transfer information between elements within the computer 2702, such as during startup. The RAM 2712 can also include a high-speed RAM such as static RAM for caching data.

The computer 2702 further includes an internal hard disk drive ("HDD") 2714 (e.g., EIDE, SATA), one or more external storage devices 2716 (e.g., a magnetic floppy disk drive ("FDD") 2716, a memory stick or flash drive reader, a memory card reader, a combination thereof, and/or the like) and an optical disk drive 2720 (e.g., which can read or write from a CD-ROM disc, a DVD, a BD, and/or the like). While the internal HDD 2714 is illustrated as located within the computer 2702, the internal HDD 2714 can also be configured for external use in a suitable chassis (not shown). Additionally, while not shown in environment 2700, a solid state drive ("SSD") could be used in addition to, or in place of, an HDD 2714. The HDD 2714, external storage device(s) 2716 and optical disk drive 2720 can be connected to the system bus 2708 by an HDD interface 2724, an external storage interface 2726 and an optical drive interface 2728, respectively. The interface 2724 for external drive implementations can include at least one or both of Universal Serial Bus ("USB") and Institute of Electrical and Electronics Engineers ("IEEE") 1394 interface technologies. Other external drive connection technologies are within contemplation of the embodiments described herein.

The drives and their associated computer-readable storage media provide nonvolatile storage of data, data structures, computer-executable instructions, and so forth. For the computer 2702, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 2712, including an operating system 2730, one or more application programs 2732, other program modules 2734 and program data 2736. All or portions of the operating system, applications, modules, and/or data can also be cached in the RAM 2712. The systems and methods described herein can be implemented utilizing various commercially available operating systems or combinations of operating systems.

Computer 2702 can optionally comprise emulation technologies. For example, a hypervisor (not shown) or other intermediary can emulate a hardware environment for operating system 2730, and the emulated hardware can optionally be different from the hardware illustrated in FIG. 27. In such an embodiment, operating system 2730 can comprise one virtual machine ("VM") of multiple VMs hosted at computer 2702. Furthermore, operating system 2730 can provide runtime environments, such as the Java runtime environment or the .NET framework, for applications 2732. Runtime environments are consistent execution environments that allow applications 2732 to run on any operating system that includes the runtime environment. Similarly, operating system 2730 can support containers, and applications 2732 can be in the form of containers, which are lightweight, standalone, executable packages of software that include, e.g., code, runtime, system tools, system libraries and settings for an application.

Further, computer 2702 can be enable with a security module, such as a trusted processing module ("TPM"). For instance with a TPM, boot components hash next in time boot components, and wait for a match of results to secured values, before loading a next boot component. This process can take place at any layer in the code execution stack of computer 2702, e.g., applied at the application execution level or at the operating system ("OS") kernel level, thereby enabling security at any level of code execution.

A user can enter commands and information into the computer 2702 through one or more wired/wireless input devices, e.g., a keyboard 2738, a touch screen 2740, and a pointing device, such as a mouse 2742. Other input devices (not shown) can include a microphone, an infrared ("IR") remote control, a radio frequency ("RF") remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 2704 through an input device interface 2744 that can be coupled to the system bus 2708, but can be connected by other interfaces, such as a parallel port, an IEEE 1394 serial port, a game port, a USB port, an IR interface, a BLUETOOTH® interface, and/or the like.

A monitor 2746 or other type of display device can be also connected to the system bus 2708 via an interface, such as a video adapter 2748. In addition to the monitor 2746, a computer typically includes other peripheral output devices (not shown), such as speakers, printers, a combination thereof, and/or the like.

The computer 2702 can operate in a networked environment using logical connections via wired and/or wireless communications to one or more remote computers, such as a remote computer(s) 2750. The remote computer(s) 2750 can be a workstation, a server computer, a router, a personal computer, portable computer, microprocessor-based entertainment appliance, a peer device or other common network node, and typically includes many or all of the elements described relative to the computer 2702, although, for purposes of brevity, only a memory/storage device 2752 is illustrated. The logical connections depicted include wired/wireless connectivity to a local area network ("LAN") 2754 and/or larger networks, e.g., a wide area network ("WAN") 2756. Such LAN and WAN networking environments are commonplace in offices and companies, and facilitate enterprise-wide computer networks, such as intranets, all of which can connect to a global communications network, e.g., the Internet.

When used in a LAN networking environment, the computer 2702 can be connected to the local network 2754 through a wired and/or wireless communication network interface or adapter 2758. The adapter 2758 can facilitate wired or wireless communication to the LAN 2754, which can also include a wireless access point ("AP") disposed thereon for communicating with the adapter 2758 in a wireless mode.

When used in a WAN networking environment, the computer 2702 can include a modem 2760 or can be connected to a communications server on the WAN 2756 via other means for establishing communications over the WAN 2756, such as by way of the Internet. The modem 2760, which can be internal or external and a wired or wireless device, can be connected to the system bus 2708 via the input device interface 2744. In a networked environment, program modules depicted relative to the computer 2702 or portions thereof, can be stored in the remote memory/storage device 2752. It will be appreciated that the network connections shown are example and other means of establishing a communications link between the computers can be used.

When used in either a LAN or WAN networking environment, the computer 2702 can access cloud storage systems or other network-based storage systems in addition to, or in place of, external storage devices 2716 as described above. Generally, a connection between the computer 2702 and a cloud storage system can be established over a LAN 2754 or WAN 2756 e.g., by the adapter 2758 or modem 2760, respectively. Upon connecting the computer 2702 to an associated cloud storage system, the external storage interface 2726 can, with the aid of the adapter 2758 and/or modem 2760, manage storage provided by the cloud storage system as it would other types of external storage. For instance, the external storage interface 2726 can be configured to provide access to cloud storage sources as if those sources were physically connected to the computer 2702.

The computer 2702 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, and/or the like), and telephone. This can include Wireless Fidelity ("Wi-Fi") and BLUETOOTH® wireless technologies. Thus, the communication can be a predefined structure as with a conventional network or simply an ad hoc communication between at least two devices.

What has been described above include mere examples of systems, computer program products and computer-implemented methods. It is, of course, not possible to describe every conceivable combination of components, products and/or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a memory that stores computer executable instructions; and
a processor, operably coupled to the memory, and that executes the computer executable instructions stored in the memory, wherein execution of the computer executable instructions causes the processor to:
access a current product design, wherein the current product design comprises an electronic computer-aided design file illustrating a geometry of the current product design;
identify a plurality of registered collaborator accounts by assigning, to previous product designs via execution of a trained model, similarity scores that respectively indicate how geometrically similar or dissimilar those previous product designs are with respect to the current product design, wherein the plurality of registered collaborator accounts are associated with whichever of the previous product designs have similarity scores that satisfy a threshold; and
share the current product design along with an annotation amongst the plurality of registered collaborator accounts as part of a manufacturing process, wherein the annotation is generated by a first registered collaborator account from the plurality of registered collaborator accounts based on a manufacturing consideration associated with manufacturing the current product design via a defined manufacturing process.

2. The system of claim 1, wherein the current product design is provided by a second registered collaborator account from the plurality of registered collaborator accounts as input data, and wherein the annotation is provided by the first registered collaborator account as a contribution to the input data.

3. The system of claim 2, wherein execution of the computer executable instructions further causes the processor to:
generate a display of the annotation positioned onto a display of the current product design, wherein the annotation regards a product feature included in the current product design, and wherein the annotation is positioned onto the product feature presented in the display of the current product design.

4. The system of claim 3, wherein the processor causes the display of the annotation to be visible to whichever of the plurality of registered collaborator accounts have viewing permissions, and wherein the processor causes the display of the annotation to be invisible to whichever of the plurality of registered collaborator accounts lack viewing permissions.

5. The system of claim 3, wherein execution of the computer executable instructions further causes the processor to:
track one or more edits made to the current product design by one or more registered collaborator accounts from the plurality of registered collaborator accounts, wherein each edit of the one or more edits results in a different version of the current product design.

6. The system of claim 5, wherein the processor generates a display of a plurality of versions of the current product design, and wherein the display of the plurality of versions is accessible to the plurality of registered collaborator accounts.

7. The system of claim 5, wherein execution of the computer executable instructions further causes the processor to:
store a version of the current product design in a library of historic product designs associated with the plurality of registered collaborator accounts.

8. The system of claim 1, wherein execution of the computer executable instructions further causes the processor to:
add the current product design to a digital catalog that is publicly or privately accessible by one or more electronic accounts via an electronic platform.

9. A computer-implemented method, comprising:
accessing, by a system operatively coupled to a processor, a current product design, wherein the current product design comprises an electronic computer-aided design file illustrating a geometry of the current product design;
identifying, by the system, a plurality of registered collaborator accounts by assigning, to previous product designs via execution of a trained model, similarity scores that respectively indicate how geometrically similar or dissimilar those previous product designs are with respect to the current product design, wherein the plurality of registered collaborator accounts are associated with whichever of the previous product designs have similarity scores that satisfy a threshold; and
sharing, by the system, the current product design along with an annotation amongst the plurality of registered collaborator accounts as part of a manufacturing process, wherein the annotation is generated by a first registered collaborator account from the plurality of registered collaborator accounts based on a manufacturing consideration associated with manufacturing the current product design via a defined manufacturing process.

10. The computer-implemented method of claim 9, wherein:
the current product design is provided by a second registered collaborator account from the plurality of registered collaborator accounts as input data; and
the annotation is provided by the first registered collaborator account as a contribution to the input data.

11. The computer-implemented method of claim 10, further comprising:
generating, by the system, a display of the annotation positioned onto a display of the current product design, wherein the annotation regards a product feature included in the current product design, and wherein the annotation is positioned onto the product feature presented in the display of the current product design.

12. The computer-implemented method of claim 11, further comprising:
tracking, by the system, one or more edits made to the current product design by one or more registered collaborator accounts from the plurality of registered collaborator accounts, wherein each edit of the one or more edits results in a different version of the current product design.

13. The computer-implemented method of claim 12, further comprising:
storing, by the system, a version of the current product design in a library of historic product designs associated with the plurality of registered collaborator accounts entities.

14. The computer-implemented method of claim 9, further comprising:
adding, by the system, the current product design to a digital catalog that is publicly or privately accessible by one or more electronic accounts second entities via an electronic platform.

15. A non-transitory computer program product for facilitating a manufacturing and development platform, the non-transitory computer program product comprising a computer readable storage medium having program instructions embodied therewith, the program instructions executable by a processor to cause the processor to:
access, by the processor, a current product design, wherein the current product design comprises an electronic computer-aided design file illustrating a geometry of the current product design;
identify, by the processor, a plurality of registered collaborator accounts by assigning, to previous product designs via execution of a trained model, similarity scores that respectively indicate how geometrically similar or dissimilar those previous product designs are with respect to the current product design, wherein the plurality of registered collaborator accounts are associated with whichever of the previous product designs have similarity scores that satisfy a threshold; and
share, by the processor, the current product design along with an annotation amongst the plurality of registered collaborator accounts as part of a manufacturing process, wherein the annotation is generated by a first registered collaborator account from the plurality of registered collaborator accounts based on a manufacturing consideration associated with manufacturing the current product design via a defined manufacturing process.

16. The non-transitory computer program product of claim 15, wherein the program instructions further cause the processor to:

receive, by the processor, the current product design from a second registered collaborator account from the plurality of registered collaborator accounts as input data; and receive, by the processor, the annotation from the first registered collaborator account as a contribution to the input data.

17. The non-transitory computer program product of claim 16, wherein the program instructions further cause the processor to:

generate, by the processor, a display of the annotation positioned onto a display of the current product design, wherein the annotation regards a product feature included in the current product design, and wherein the annotation is positioned onto the product feature presented in the display of the current product design.

18. The non-transitory computer program product of claim 17, wherein the program instructions further cause the processor to:

track, by the processor, one or more edits made to the current product design by one or more registered collaborator accounts from the plurality of registered collaborator accounts, wherein each edit of the one or more edits results in a different version of the current product design.

19. The non-transitory computer program product of claim 18, wherein the program instructions further cause the processor to:

store, by the processor, a version of the current product design in a library of historic product designs associated with the plurality of registered collaborator accounts entities.

20. The non-transitory computer program product of claim 15, wherein the program instructions further cause the processor to:

add, by the processor, the current product design to a digital catalog that is publicly or privately accessible by one or more electronic accounts via an electronic platform.

\* \* \* \* \*